United States Patent [19]

McMillen et al.

[11] Patent Number: 5,321,813
[45] Date of Patent: Jun. 14, 1994

[54] RECONFIGURABLE, FAULT TOLERANT, MULTISTAGE INTERCONNECT NETWORK AND PROTOCOL

[75] Inventors: Robert J. McMillen, Encinitas; M. Cameron Watson, Los Angeles; David J. Chura, Redondo Beach, all of Calif.

[73] Assignee: Teradata Corporation, El Segundo, Calif.

[21] Appl. No.: 694,110

[22] Filed: May 1, 1991

[51] Int. Cl.⁵ .............................................. G06F 13/00
[52] U.S. Cl. ...................................... 395/200; 370/60; 370/94.1
[58] Field of Search ........................ 370/60, 60.1, 94.1, 370/95.1; 395/200, 275

[56] References Cited

U.S. PATENT DOCUMENTS

| | | | |
|---|---|---|---|
| 4,829,227 | 5/1989 | Turner | 370/60 |
| 4,962,497 | 10/1990 | Ferenc et al. | 370/60.1 |
| 5,119,370 | 6/1992 | Terry | 370/60.1 |

OTHER PUBLICATIONS

Leiserson-IEEE Transactions on Computers-vol. C-34, No. 10, Oct. 1985.
Final Report—Numerical Aerodynamic Simulation Facility—Burroughs Corp. Mar. 1979.

*Primary Examiner*—Robert L. Richardson
*Attorney, Agent, or Firm*—Merchant, Gould, Smith, Edell, Welter & Schmidt

[57] ABSTRACT

A multistage interconnect network (MIN) capable of supporting massive parallel processing, including point-to-point and multicast communications between processor modules (PMs) which are connected to the input and output ports of the network. The network is built using interconnected switch nodes arranged in $2 \lceil \log_b N \rceil$ stages, wherein b is the number of switch node input/output ports, N is the number of network input/output ports and $\lceil \log_b N \rceil$ indicates a ceiling function providing the smallest integer not less than $\log_b N$. The additional stages provide additional paths between network input ports and network output ports, thereby enhancing fault tolerance and lessening contention.

153 Claims, 35 Drawing Sheets

8x8 SWITCH NODE 16

STAGE 0

STAGE 1

| FIG. 4A | FIG. 4C |
|---|---|
| FIG. 4B | FIG. 4D |

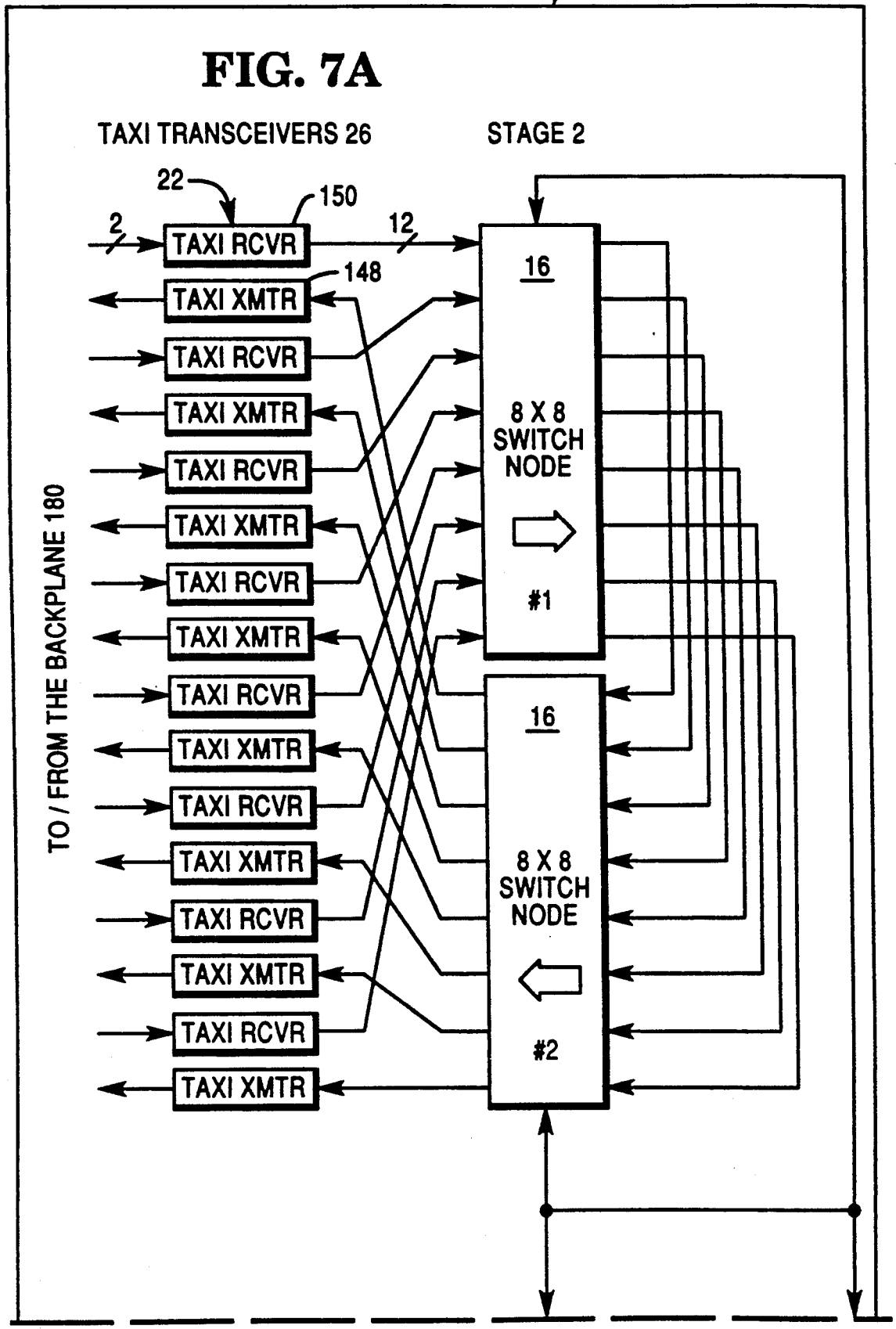

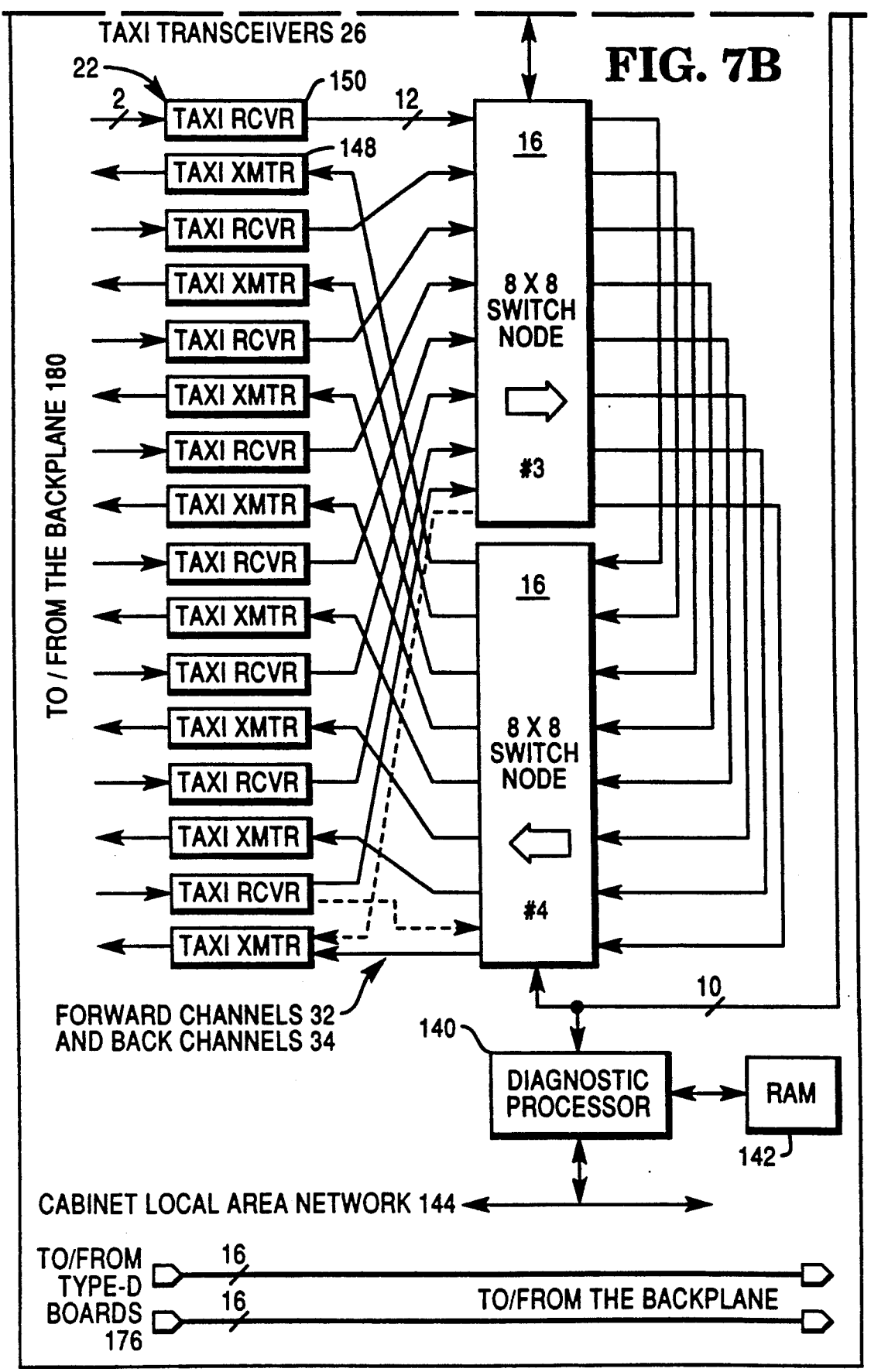

(≤64 PORTS)

CMA/A 182
CIRCUIT SWITCHING

EIGHT, 16-CABLE BUNDLES

WIRES EMBEDDED IN THE BACKPLANE 180

RECONFIGURABLE, FAULT TOLERANT, MULTISTAGE INTERCONNECT NETWORK AND PROTOCOL

TABLE OF CONTENTS

BACKGROUND OF THE INVENTION
SUMMARY OF THE INVENTION
BRIEF DESCRIPTION OF THE DRAWINGS
DETAILED DESCRIPTION OF THE PREFERRED EMBODIMENT
  1. GENERAL DESCRIPTION
  2. NETWORK TOPOLOGY
  3. SWITCH NODES
  4. NETWORK CONTROLLERS
  5. DIAGNOSTIC PROCESSORS
  6. PACKAGING
  7. TYPE-A BOARD
  8. TYPE-B BOARD
  9. TYPE C-BOARD
  10. COMMUNICATION MODULE ASSEMBLY
  11. SIMPLIFIED CABLING
  12. SWITCH NODE ADDRESSING
  13. AUTOMATIC PROCESSOR ID ASSIGNMENT
  14. DYNAMIC CONFIGURATION
  15. SIMPLIFIED BACKPLANE ROUTING
  16. CONNECTION PROTOCOL
  17. DISCONNECTION PROTOCOL
  18. MONOCAST LOAD BALANCING
  19. MONOCAST NON-BLOCKING
  20. MONOCAST BLOCKING
  21. MONOCAST BLOCKING WITHOUT LOAD BALANCING
  22. MONOCAST PIPELINE
  23. MONOCAST NON-PIPELINE
  24. CONTROLLER SOFTWARE
  25. SUPERCLUSTERS
  26. MULTICAST
  27. FORWARD CHANNEL COMMANDS
  28. BACK CHANNEL REPLIES
  29. NETWORK APPLICATIONS
  30. CONCLUSION
CLAIMS
ABSTRACT
TABLE I
TABLE II
TABLE III
TABLE IV
TABLE V

BACKGROUND OF THE INVENTION

1. Field of the Invention

This invention relates in general to computer networks, and in particular to a scalable multi-stage interconnect network 14 for multiprocessor computers.

2. Description of Related Art

Parallel processing is considered an advantageous approach for increasing processing speeds in computer systems. Parallel processing can provide powerful communications and computer systems which can handle complex problems and manipulate large databases quickly and reliably.

One example of parallel processing can be found in U.S. Pat. No. 4,412,285, issued Oct. 25, 1983, to Neches et al., incorporated by reference herein. This patent describes a system using a sorting network to intercouple multiple processors so as to distribute priority messages to all processors.

Further examples of parallel processing can be found in U.S. Pat. No. 4,445,171, issued Apr. 24, 1984, to Neches, U.S. Pat. No. 4,543,630, issued Sep. 24, 1985, to Neches, and U.S. Pat. No. 4,814,979, issued Mar. 21, 1989, to Neches, all of which are incorporated by reference herein. These patents describe a multiprocessor system which intercouples processors with an active logic network having a plurality of priority determining nodes. Messages are applied concurrently to the network in groups from the processors and are sorted, using the data content of the messages to determine priority, to select a single or common priority message which is distributed to all processors with a predetermined total network delay time.

Communication within parallel processing systems such as those described above is typically classified as either tightly coupled wherein communication occurs through a common memory or loosely coupled wherein communication occurs via switching logic and communications paths. Various topologies and protocols for loosely coupled processors have been proposed and used in the prior art. These topologies tend to be grouped into two categories: static and dynamic.

Static topologies provide communication paths between processors which cannot be reconfigured. Examples of static topologies include linear arrays, rings, stars, trees, hypercubes, etc.

Dynamic topologies permit dynamic reconfiguration of communication paths between processors using switching elements within the network. Examples of dynamic topologies include single stage networks and multistage interconnect networks (MINs).

A single stage network has one stage of switching elements such that information can be re-circulated until it reaches the desired output port. A MIN has a plurality of switching element stages capable of connecting any input port of the network to any output port.

In general, MINs consist of several stages of switching elements or switch nodes that are wired together according to a regular pattern. Typically, each switch node is a small crossbar switch that usually has an equal number of inputs and outputs, e.g., a b×b switch node. Prior art MINs typically consist of $\log_b N$ stages, wherein b is the number of input/output ports of a switch node, and N is the number of input/output ports of a network. Typically, such MINs are therefore constructed from the smallest number of links and switch nodes that allows any network input port to be connected to any network output port.

Prior attempts at implementing MINs suffer from several disadvantages. One disadvantage arises because each network input/output port pair typically has only one way to be connected, thereby making the MIN susceptible to internal contention. Internal contention occurs when two paths require the same link even though the paths may or may not be to the same network output port.

Another disadvantage is lessened reliability due to the number and complexity of components. If a fault occurs, it is often difficult to determine where the problem lies. Further, it may be impossible to reconfigure the system to exclude the failed component or service the system without shutting it down, thereby leaving the system inoperable until the problem is corrected.

Another disadvantage is complex, expensive, and time-consuming manufacturing and installation requirements. For large network configurations, cabling may be unmanageable due to the logistics of making sure every component is correctly cabled and plugged into the correct connector.

Still another disadvantage involves diminishing bandwidth. The bandwidth available to each processor tends to decrease as the system size grows.

SUMMARY OF THE INVENTION

To overcome the limitations in the prior art described above, and to overcome other limitations that will become apparent upon reading and understanding the present specification, the present invention discloses a multistage interconnect network (MIN) capable of supporting massive parallel processing, including point-to-point and multicast communications between processor modules (PMs) which are connected to the input and output ports of the network. The network is built using interconnected $b \times b$ switch nodes arranged in $\lceil \log_b N \rceil + 1$ (or more) stages, wherein b is the number of input/output ports of a switch node, N is the number of input/output ports of a network, and $\lceil \log_b N \rceil$ indicates a ceiling function providing the smallest integer not less than $\log_b N$. The additional stages provide additional paths between network input ports and network output ports, thereby enhancing fault tolerance and lessening contention.

The present invention provides numerous advantages. One advantage is reliability. The system is designed to keep working even when components fail by automatically reconfiguring itself when a fault is detected.

Still another advantage is serviceability. The error reporting method isolates faults to prevent them from propagating throughout the network.

Still another advantage is manufacturability. For large system configurations, cabling could be very unmanageable. However, the design of the present invention, along with flexible cable connection rules, make the problem tractable for large systems and nonexistent for small systems.

Still another advantage is simple installation. Any processor can be plugged into any available receptacle. This eliminates a source of errors by dropping the need to make sure every cable is plugged into the correct connector. All other systems we know of have this cabling constraint.

Still another advantage is high performance per processor. The high connectivity topology, extra stages of switch nodes, back-off capability, pipelining operation, back channel, and multicast window features combine to provide a high speed connection capability for each processor regardless of the number of processors in the system. In other systems, the bandwidth available to each processor tends to decrease as the system size grows.

BRIEF DESCRIPTION OF THE DRAWINGS

Referring now to the drawings in which like reference numbers represent corresponding parts throughout:

FIGS. 7(a) and 7(b) describe a Type-B board used in the network;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes ma be made without departing from the scope of the present invention.

1. GENERAL DESCRIPTION

Figure 1A:
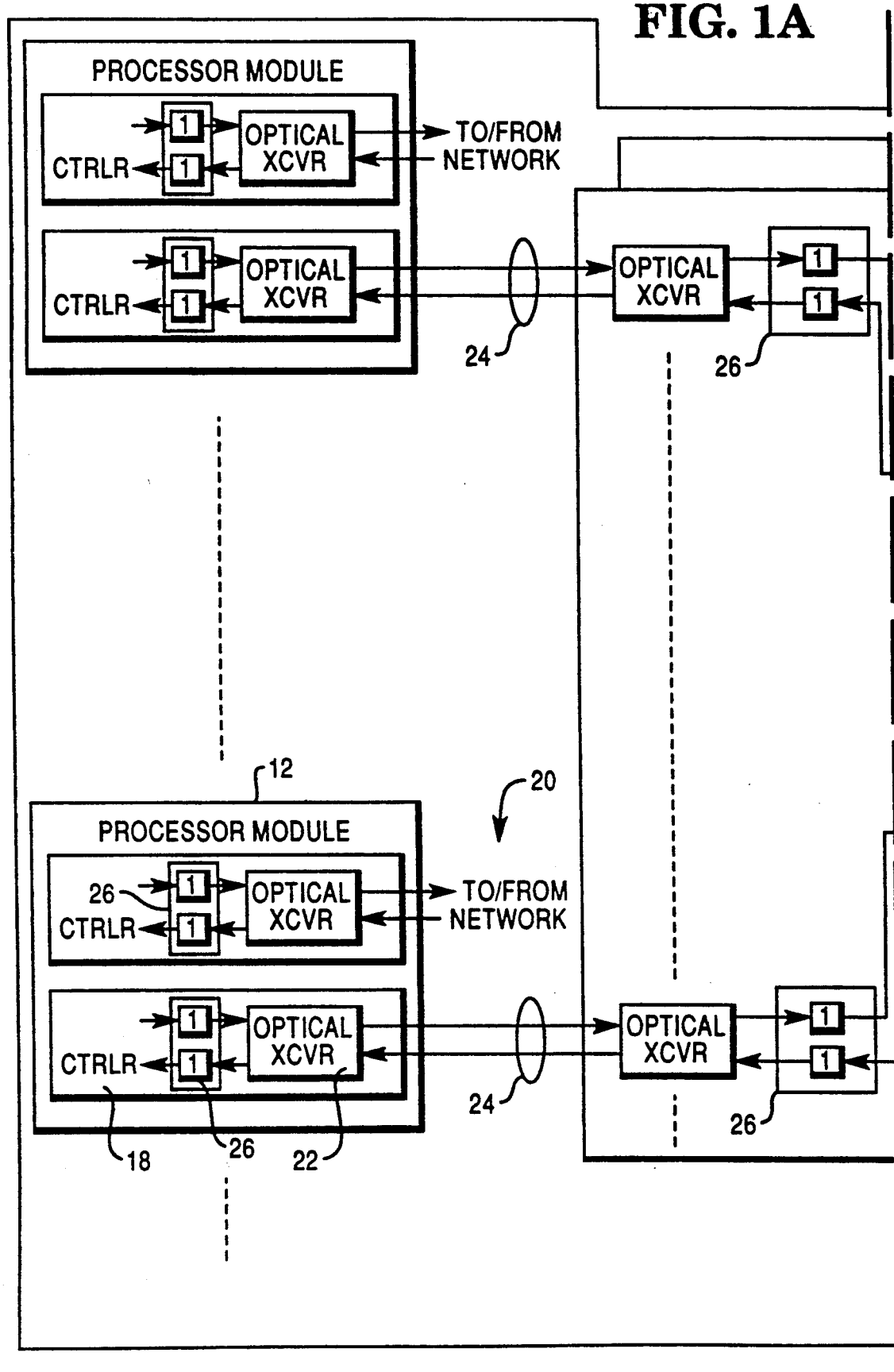
FIGS. 1(a) and 1(b) illustrate the components of the present invention, which comprises a general purpose multiprocessor computer system capable of massive parallel processing.
Figure 1B:
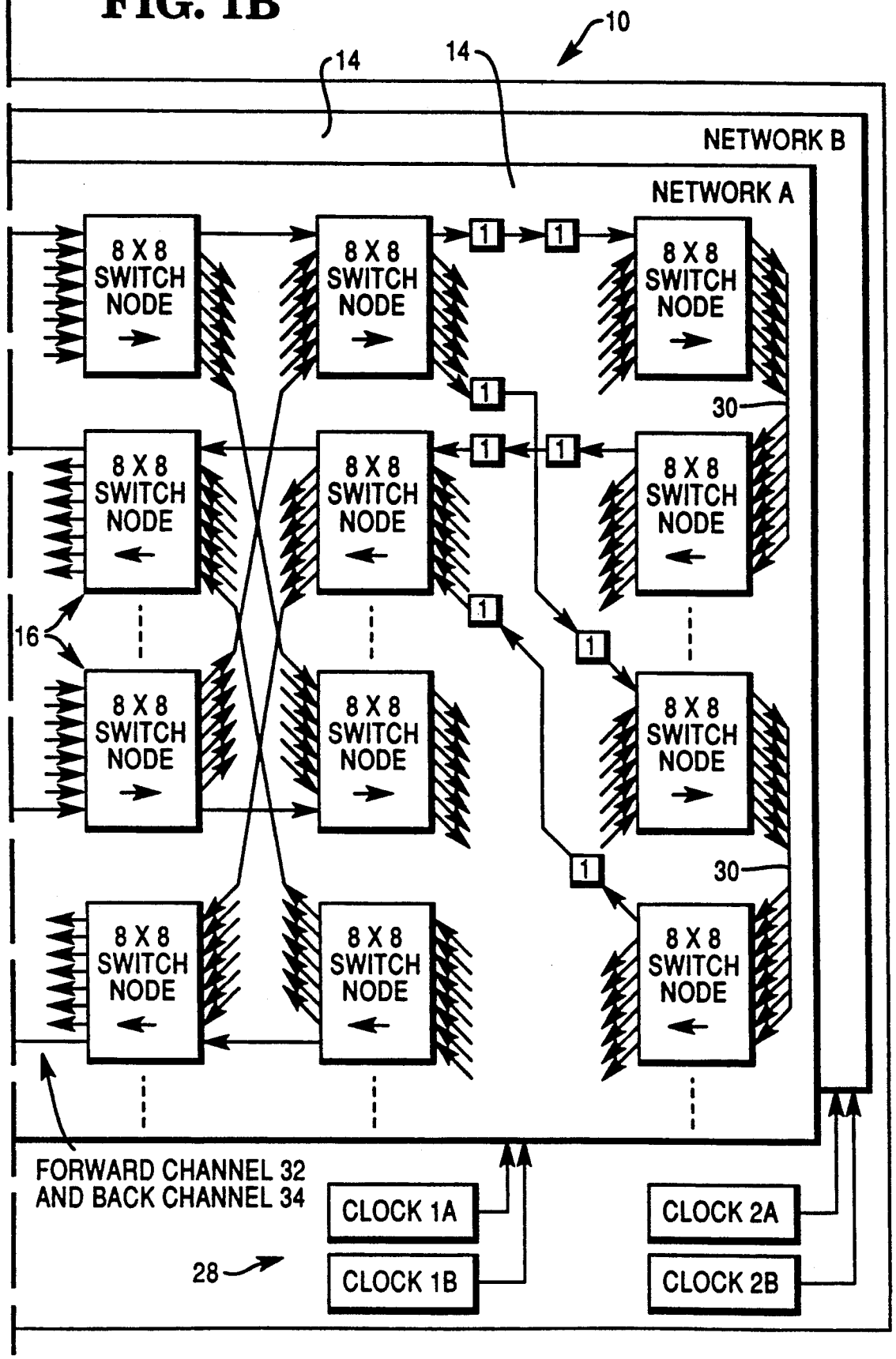

FIG. 1 illustrates the components of the present invention, which comprises a general purpose multiprocessor computer system 10 capable of massively parallel processing. The components illustrated in FIG. 1 include processor modules (PMs) 12, networks 14, switch nodes 16, controllers 18, network I/O ports 20, optical transceivers 22, optical fibers 24, Transparent Asynchronous Transceiver Interface (TAXI) transceivers 26, redundant master clocks 28, bounce-back points 30, forward channels 32, and back channels 34.

The PMs 12 are common platform processor modules which communicate with each other by means of redundant networks 14. However, it is envisioned that the network 14 of the present invention could be used for communications purposes in a large number of different applications. Thus, those skilled in the art will recognize that any number of agents of various types, e.g., memory devices, peripheral devices, etc., could be substituted for the PMs 12 shown.

The system 10 may use redundant networks 14 (labeled network A and network B in FIG. 1) for enhanced fault tolerance and increased bandwidth. If one of the networks 14 is not available, then another network 14 can take over, to allow for graceful degradation of the system 10 in the presence of malfunctions. Software executed by the PMs 12 handles the added complexity of redundant networks 14 and automatically load levels between operative networks 14. The software also supports fault detection and switching in the event of a failure of one of the networks 14.

Each network 14 is a multistage interconnect network 14 (MIN) that employs active logic switch nodes 16. In the preferred embodiment, the switch nodes 16 have eight input ports which can be connected to any of eight output ports to effectuate the switching functions. (In the following description, the term "switch node 16 I/O port" is often used to refer to a pair of corresponding, i.e., similarly numbered, input and output ports of a switch node 16.) A plurality of switch nodes 16 are interconnected together in a plurality of stages to provide the paths between the network input ports and the network output ports. (In the following description, the term "network I/O port 20" is often used to refer to a pair of corresponding, i.e., similarly numbered, input and output ports of a network 14. Typically, a network I/O port 20 will interface to one PM 12, although this is not required to practice the present invention.)

In the preferred embodiment, there are more than $\lceil \log_b N \rceil$ stages in the network 14, wherein b is the number of I/O ports of a switch node 16, N is the number of network I/O ports 20, and $\lceil \log_b N \rceil$ indicates a ceiling function providing the smallest integer not less than $\log_b N$. (Typically, a switch node 16 will have the same number of input ports and output ports, although this is not required to practice the present invention. If the number of input ports and output ports is not identical, then the above equation would become $\log_{(a,b)} N$, wherein a is the number of switch node 16 input ports and b is the number of switch node 16 output ports.) The additional stages provide additional communication paths between any network input port and network output port, thereby enhancing fault tolerance and lessening contention.

Each network 14 is logically full-duplex. The bandwidth of the network 14 is not limited by the bandwidth of any particular switch node. In fact, the bandwidth of the network 14 increases as the number of network I/O ports 20 increases due to the increased number of paths between switch nodes 16. Functionally, the network 14 provides a plurality of possible interconnection paths for a circuit, from a sending PM 12 to a set (one or more) of receiving PMs 12.

Each network 14 automatically detects and reports any errors that occurred during operation, even if there is no traffic. The network 14 is able to detect and isolate errors automatically without propagating them, which improves serviceability. The network 14 can be automatically reconfigured when a fault is detected, without interrupting the operation of the system 10, and minimizing performance degradation after reconfiguration.

Communications between the PMs 12 are conducted in two basic modes: point-to-point and multicast. In point-to-point communications, a PM 12 transmits a connect command to another PM 12. The connect command travels through a forward channel 32 in the network 14 to the receiving PM 12. The receiving PM 12 returns a reply to the sending PM 12 through a back channel 34. Once the connection is made to the receiving PM 12, the sending PM 12 transmits its messages, and then terminates the connection when the transmission is done. The network 14 will support many of such point-to-point communications, between different pairs of PMs 12 at the same time. In the absence of conflicts, all PMs 12 could communicate at the same time.

In the second, or multicast, mode of communications, a single PM 12 can broadcast a message to all of the other PMs 12 or a predefined group of PMs 12. The predefined groups of PMs 12 are called "superclusters" and multicast commands within different superclusters can occur simultaneously. The sending PM 12 transmits its multicast command which propagates through the forward channel 32 to all of the PMs 12 or the group of PMs 12. The PMs 12 that receive multicast messages reply to them by transmitting, for example, their current status through the back channel 34. The network 14 can function to combine the replies in various ways.

Each PM 12 has at least one separate controller 18 for interfacing to each network 14. There is no limit on the number of controllers 18 that connect a PM 12 to a network 14 if additional bandwidth is desired. Transparent Asynchronous Transceiver Interface (TAXI) transceivers 26 are used to serialize and de-serialize data for transmission between the controllers 18 and the network 14 over optical fiber 24. The TAXI transceivers 26 convert parallel data into a high speed serial form that encodes clock information into the data stream, and vice versa. The controller 18 outputs a forward channel 32 consisting of eight bits of data plus a single bit parity, and a one bit back channel 34 associated with the receive channel to the TAXI transceiver 26. The controller 18 receives a forward channel 32 consisting of eight bits of data plus a single bit of parity and a one bit back channel 34 associated with the transmit channel from the TAXI transceiver 26. The TAXI transceiver 26 converts the 10 bits of parallel data into bit serial data. The TAXI transceiver 26 converts the bit serial data back into 10 bits of parallel data and recovers the clock. The back channels 34 are only one bit so they can interface to the TAXI transceivers 26 with the forward channels 32, thus providing more efficient packaging.

2. NETWORK TOPOLOGY

Figure 2:
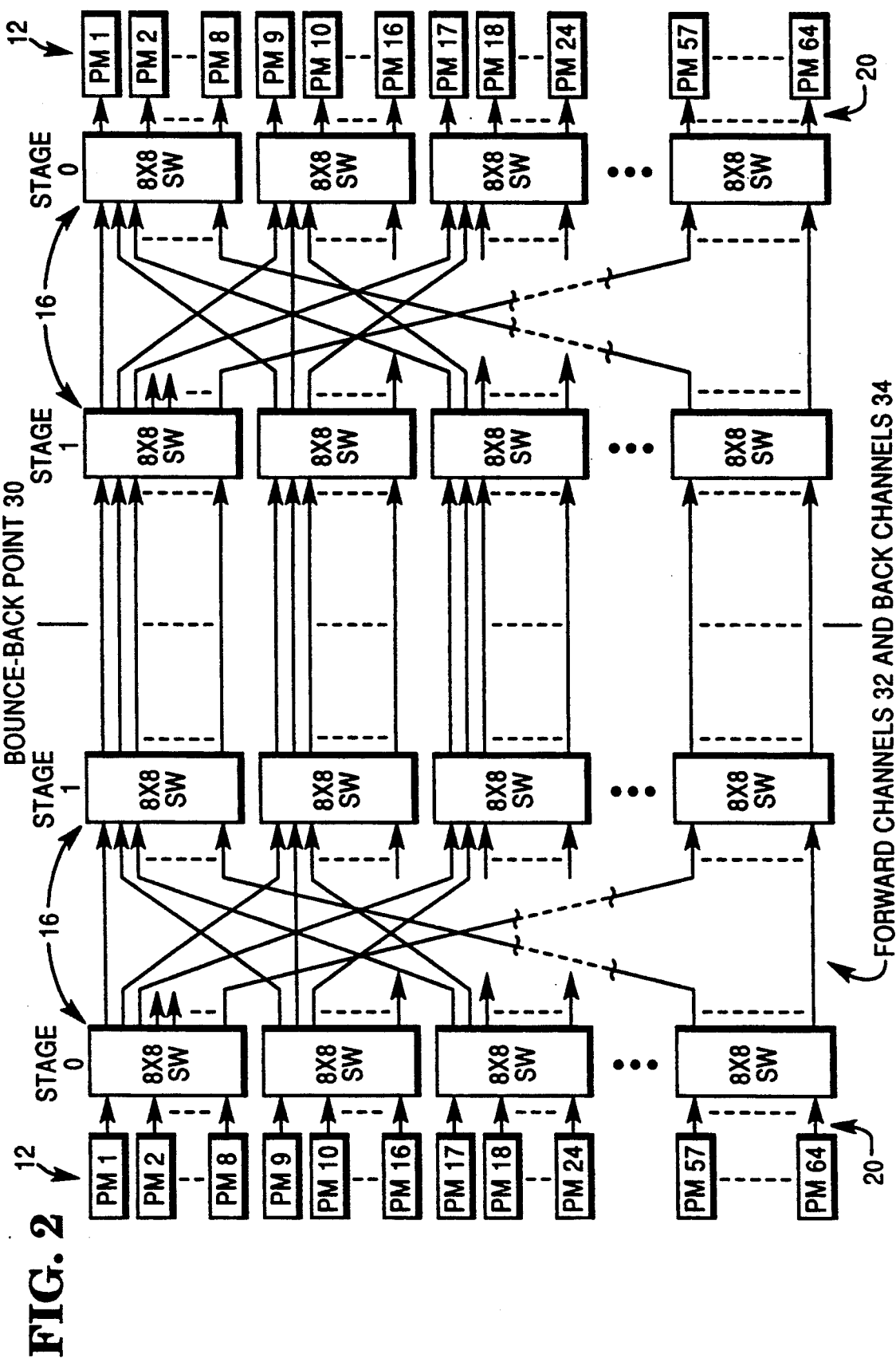
FIG. 2 provides one example illustrating how the switch nodes are interconnected to implement a network.

FIG. 2 provides one example illustrating how the switch nodes 16 are interconnected to implement a network 14. In the preferred embodiment, the 8×8 switch nodes 16 are arranged in 2 ⌈$\log_8 N$⌉ stages, wherein N is the number of network I/O ports 20 and ⌈$\log_8 N$⌉ indicates a ceiling function providing the smallest integer not less than $\log_8 N$. Thus, for a network 14 having 8 or less network I/O ports 20, there are 2 $\log_8 8=2$ stages; for a network 14 having between 9 and 64 network I/O ports 20, there are 2 $\log_8 64=4$ stages; for a network 14 having between 65 and 512 network I/O ports 20, there are 2 $\log_8 512=6$ stages; and for a network 14 having between 513 and 4096 network I/O ports 20, there are 2 $\log_8 4096=8$ stages. The additional stages provide additional communication paths between any network input port and network output port, thereby enhancing fault tolerance and lessening contention.

As indicated in FIG. 2, the stage numbers increment from left to right beginning at 0, until a "bounce-back point" 30 is reached, at which point the stage numbers decrement from left to right back to 0. The bounce-back point 30 indicates the point where the stages of the network 14 are physically folded. Folding the network 14 allows corresponding switch nodes 16 in similarly numbered stages on either side of the bounce-back point 30 to be located adjacent to each other to simplify packaging and to minimize signal path lengths (especially to/from the PMs 12). The folded network 14 is illustrated by FIG. 1, and FIGS. 6, 7, and 8 described further hereinafter in conjunction with Type-A, -B, and -C boards.

Each 8×8 switch node 16 used in the preferred embodiment has eight input ports and eight output ports, wherein each port interfaces to a 9-bit (8-bits of data and 1 bit of parity) forward channel 32 and a 1-bit back channel 34. (For the sake of brevity and clarity, however, FIG. 2 represents each forward channel 32 and back channel 34 pair with a single line, wherein the direction of the forward channel 32 is indicated by an arrow and the direction of the back channel 34 is opposite the arrow).

Within any 8×8 switch node 16, any input port can be connected to any output port by the function of the logic within the switch node 16. Up to eight PMs 12 may be applied to the eight input ports of each switch node 16 in the "left" stage 0 switch nodes 16 on the left side of the bounce-back point 30 in FIG. 2; these are the network input ports. Each of the output ports from the "left" stage 0 switch nodes 16 communicate bidirectionally with a different one of the "left" stage 1 switch nodes 16 on the left side of the bounce-back point 30 in FIG. 2, so that any one of the "left" stage 0 switch nodes 16 can communicate with any one of the "left" stage 1 switch nodes 16. (For the sake of brevity and clarity, however, FIG. 2 shows only a portion of the interconnections between switch nodes 16). Each of the output ports from the "left" stage 1 switch nodes 16 communicate bidirectionally with a corresponding "right" stage 1 switch node 16 on the right side of the bounce-back 30 point in FIG. 2. Each of the output ports from the "right" stage 1 switch nodes 16 communicate bidirectionally with a different one of the "right" stage 0 switch nodes 16 on the right side of the bounce-back point 30 in FIG. 2, so that any one of the "right" stage 1 switch nodes 16 can communicate with any one of the "right" stage 0 switch nodes 16; these are the network output ports. Thus, any PM 12 connected to a "left" stage 0 switch node 16 can communicate with any PM 12 connected to a "right" stage 0 switch node 16 by appropriate switching of the stage 0 and stage 1 switch nodes 16.

The pattern of interconnections between the stage 0 and stage 1 switch nodes 16 in FIG. 2 is termed a Universal Wiring Pattern (UWP). This pattern is "universal" because the interconnections between different stages in any size network 14 consists of one or more copies of the UWP. (Note that the pattern of interconnections between similarly numbered stages, i.e., across the bounce-back point 30, is not a UWP, but instead consists of a "straight" interconnection wherein the output ports of a switch node 16 communicate bidirectionally only with the input ports of a corresponding switch node.)

For a network 14 of size $N=8^n$, $n>1$, wherein n indicates the number of stages in the network and N indicates the number of network I/O ports 20 and thus the number of PMs 12 that can be attached thereto, the number of copies of the UWP between each stage is $8^{n-2}$.

For 8 or less network I/O ports 20 (n=1), there is only one stage and thus no UWP.

For 9 to 64 network I/O ports 20 (n=2), there is one ($8^{2-2}$) copy of the UWP between each pair of stages.

For 65 to 512 network I/O ports 20 (n=3), there are eight ($8^{3-2}$) copies of the UWP between each pair of stages. In the preferred embodiment, the patterns do not overlap between Stages 0 and 1; the patterns are stretched out and overlap between Stages 1 and 2.

For 513 to 4096 network I/O ports 20 (n=4), there are 64 ($8^{4-2}$) copies of the UWP between each pair of stages. In the preferred embodiment, the patterns do not overlap between Stages 0 and 1; the patterns are stretched out and overlap between Stages 1 and 2; the patterns do not overlap between Stages 2 and 3.

The UWP is a function of the switch node 16 size and is generated by a permutation function that identifies which ports to connect between switch nodes 16 in different stages. Mathematical properties of these interconnections simplify cabling in the network 14.

Because 8×8 switch nodes 16 are used, the number of network I/O ports 20 is $N=8^n$, n ∈ {1, 2, 3, ... }, and there are n Stages numbered from 0 to n−1. The switch nodes 16 in each Stage are numbered from top to bottom from 0 to N/8−1. The input/output ports of the switch nodes 16 in each Stage can be numbered from top to bottom from 0 to N−1, which are the ports' Levels. The ports on each side of a given switch node 16 are numbered from 0 to 7 from top to bottom.

There are two ways to reference a specific input/output port on a specific switch node 16. The first method is by (Stage: Level) and the second is by the triplet (Stage: Switch-Node-Number: Switch-Node-Port-Number). For example, in a network 14 of N=512 network I/O ports 20 (n=3), let S be the Stage number and X be the Level number, wherein X is an arbitrary number, $0 \leq X < N$, represented using octal digits as:

$x_{n-1} \ldots x_1x_0$, where $0 \leq x_i < 8$ and $0 \leq i < n$. Therefore, (S: $x_2x_1x_0$) is the reference by the first method and (S: $x_2x_1:x_0$) is the reference by the second method.

It can be shown that the pattern of connections between each Stage is completely specified by permuting the digits of the Level number. In the general case, for all X, $0 \leq X < N$, the total set of switch node 16 output ports numbered (S: $x_{n-1} \ldots x_1x_0$) are connected to the switch node 16 input ports (S+1: PERMUTE$^n_S$ {$x_{n-1} \ldots x_1X_0$}). The permutation function is subscripted with an "S" to indicate that the function is associated with a specific Stage, and typically, is different in each Stage. The "n" superscript refers to the number of Stages in the network 14.

For a network 14 of 8 or less network I/O ports 20 (n=1) there is no permutation function, because only two Stage 0 switch nodes 16 are used.

For a network 14 of between 9 and 64 network I/O ports 20 (n=2) there is only one possible permutation function between Stage 0 and Stage 1: PERMUTE$^2_0$ {$x_1x_0$} = $x_0x_1$. To see how this works, examine FIG. 3. The Level numbers are shown at the ports on the extreme left and right sides of FIG. 3. Consider the second output from switch node 16 #3 in Stage 0, i.e., (0:3:1). It is at Level $25_{10}$ which is $31_8$. To calculate which input it should be connected to in Stage 1, reverse the octal digits to obtain $13_8$ which is Level $11_{10}$. This process can be repeated for each Level from 0 to 63 to obtain a table enumerating the connections.

For a network 14 of between 65 and 512 network I/O ports 20 (n=3), two permutation functions are needed: PERMUTE$^3_0$ {$x_2x_1x_0$} = $x_2x_0x_1$ and PERMUTE$^3_1$ {$x_2x_1x_0$} = $x_1x_0x_2$. To see the effect of this sequence of permutation functions, examine its effect on the octal number $210_8$. This number is chosen to illustrate where the digits are mapped at each Stage in the network 14. $21\underline{0}$ is mapped by PERMUTE$^3_0$ to $20\underline{1}$ and that is then mapped by PERMUTE$^3_1$ to $01\underline{2}$. The permutation function is chosen so that each digit number (e.g., 0, 1, and 2) appears in the least significant position once. Clearly, these permutation functions meet the condition (notice the underlined digit). This condition guarantees that every network I/O port 20 will have a path to every other network I/O port 20. Another PERMUTE$^3_1$ function that could be used with the given PERMUTE$^3_0$ function is PERMUTE$^3_1$ {$x_2x_2x_0$} = $x_0x_1x_2$. This would produce the mappings 210 to 201 to 102 which meets the constraint. If either PERMUTE$^3_1$ function were exchanged with the PERMUTE$^3_0$ function, the respective inverse networks 14 would be obtained.

The topology specified by PERMUTE$^3_0$ and PERMUTE$^3_1$ should be thought of as the virtual network 14 topology. Due to the mapping capabilities of the switch nodes 16, discussed further hereinafter, the physical cabling will not necessarily match this topology. The network 14, however, behaves as though it does have this topology.

Figure 3:
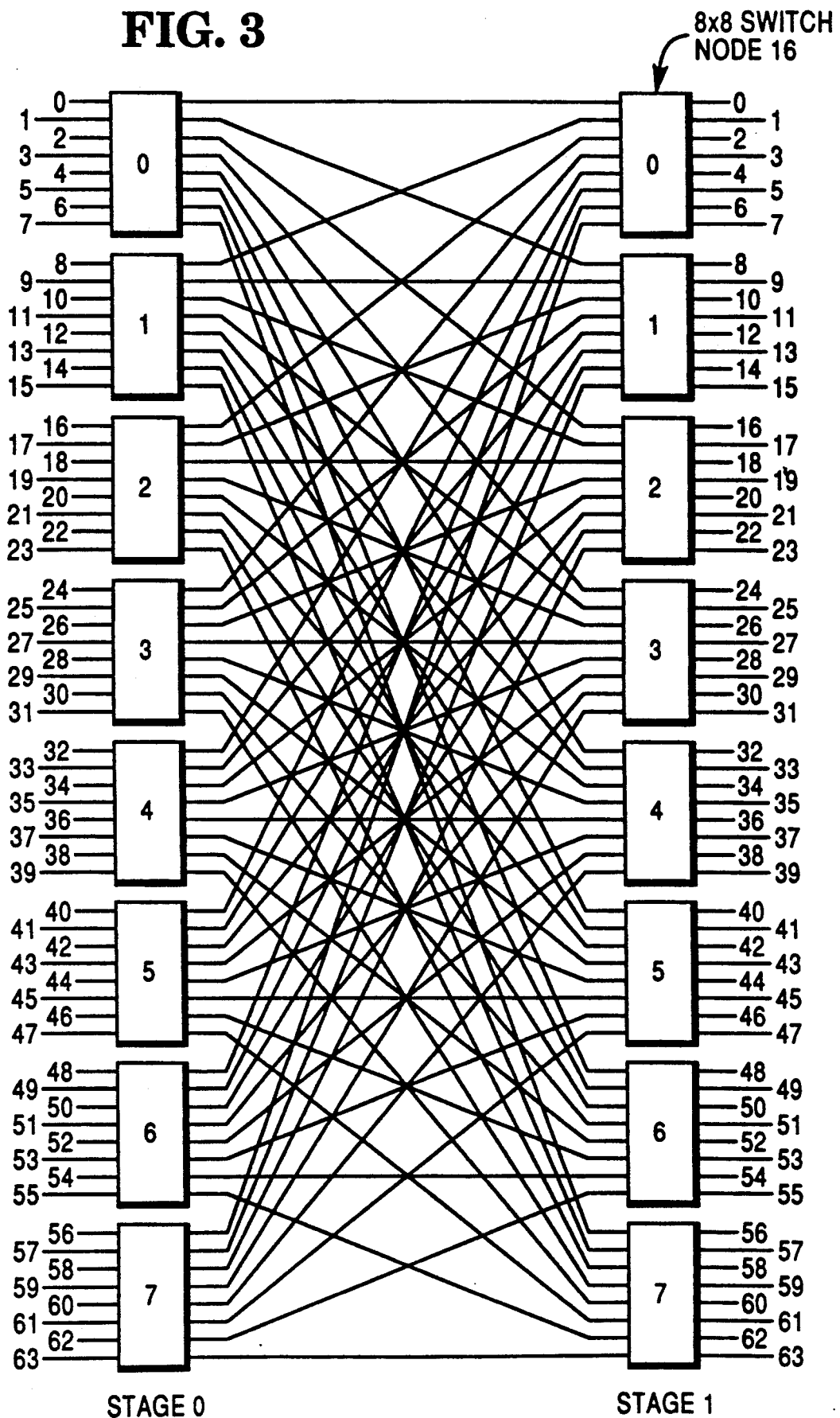
FIG. 3 illustrates the permutation function between stage 0 and stage 1 for a network, having between 9 and 64 network I/O ports.

In the preferred embodiment, it is also necessary to consider the topology of a network 14 of 4096 network I/O ports 20 (n=4). This requires three permutation functions: PERMUTE$^4_0$ {$x_3x_2x_1x_0$} = $x_3x_2x_0x_1$, PERMUTE$^4_1$ {$x_3x_2x_1x_0$} = $x_1x_0x_3x_2$, and PERMUTE$^4_2$ {$x_3x_2x_1x_0$} = $x_3x_2x_0x_1$. This sequence of permutation functions maps octal $3210_8$ to $3201_8$ to $0132_8$ to $0123_8$. Again, notice that each digit appears in the least significant position once. The reason this set of functions is chosen is because PERMUTE$^4_0$ and PERMUTE$^4_2$ leave the most significant two digits undisturbed. The physical consequence of this is to minimize the cable length in those two Stages. In the worst case, the distance between an output from one Stage to the input of the next Stage can be no greater than 64 Levels. For example, examination of FIG. 3 shows the worst case length to be from Level 7 to Level 56. Note that a network 14 of 4096 network I/O ports 20 would contain 64 copies of FIG. 3 in Stages 0 and 1 and another 64 copies would make up Stages 2 and 3. PERMUTE$^4_1$ would specify the interconnection between the two sets of 64 subnetworks.

3. SWITCH NODES

Figure 4A:
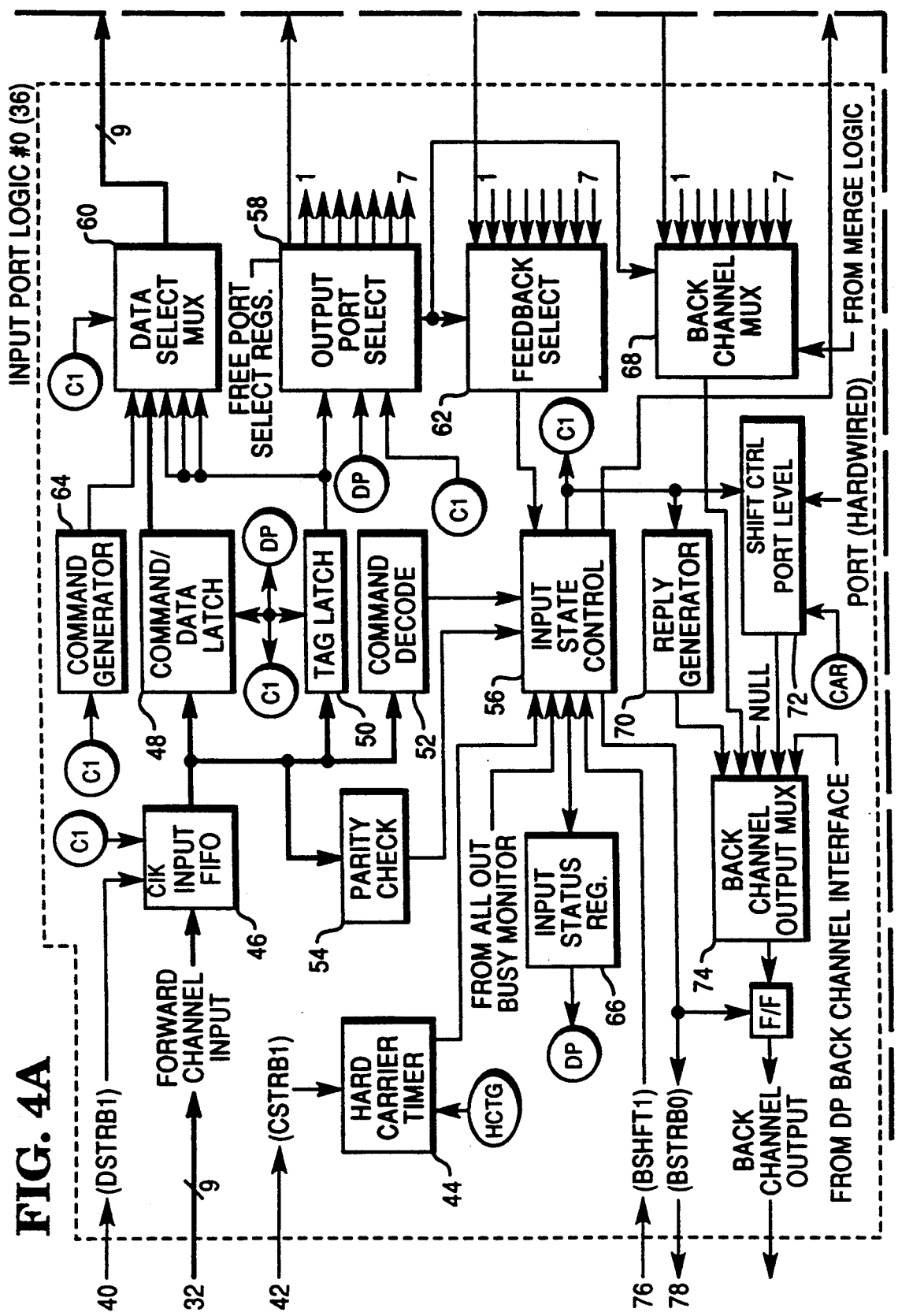
FIGS. 4 and 4(a) thru 4(d) describe the components of an $8 \times 8$ switch node according to the present invention.
Figure 4B:
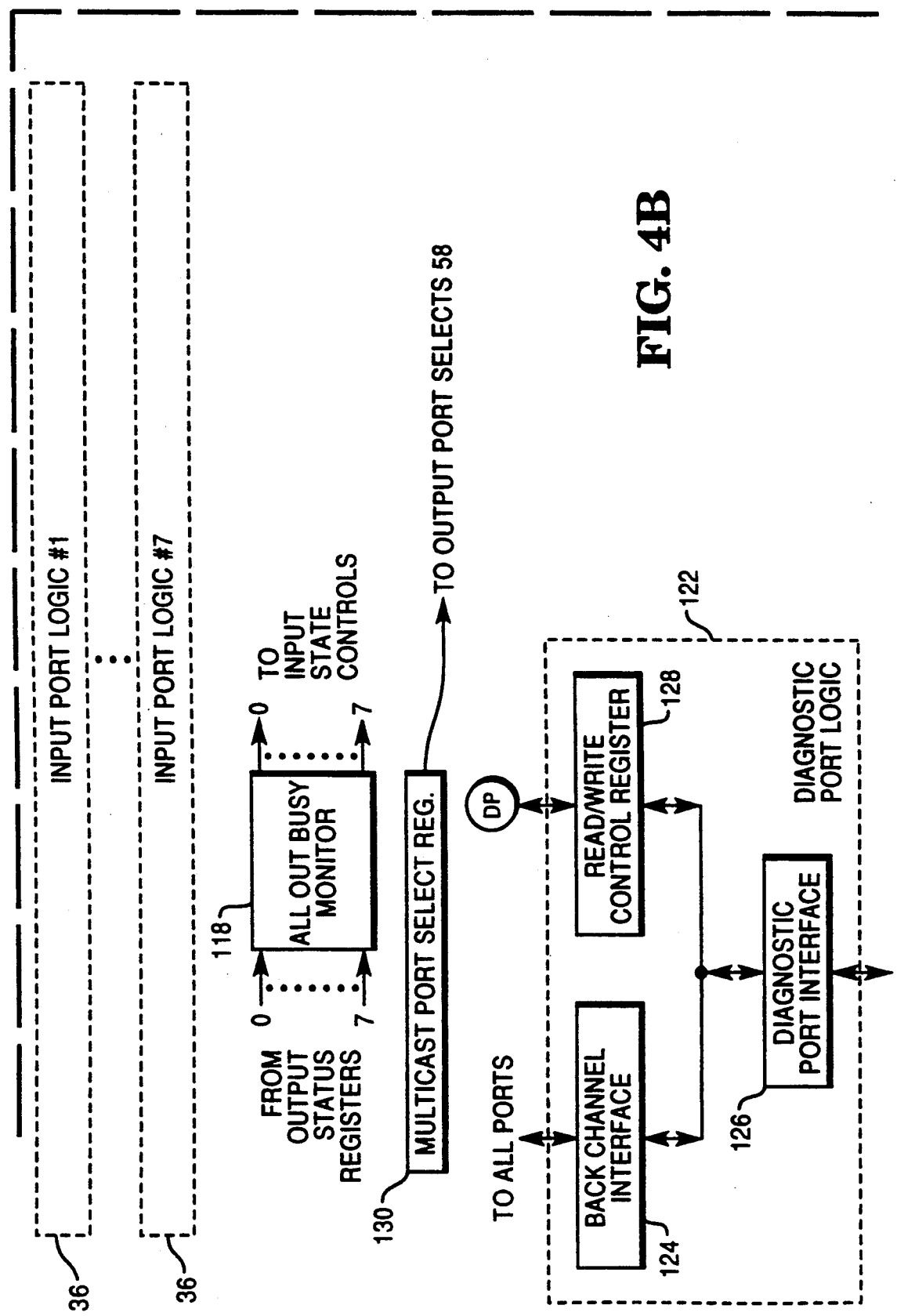
Figure 4C:
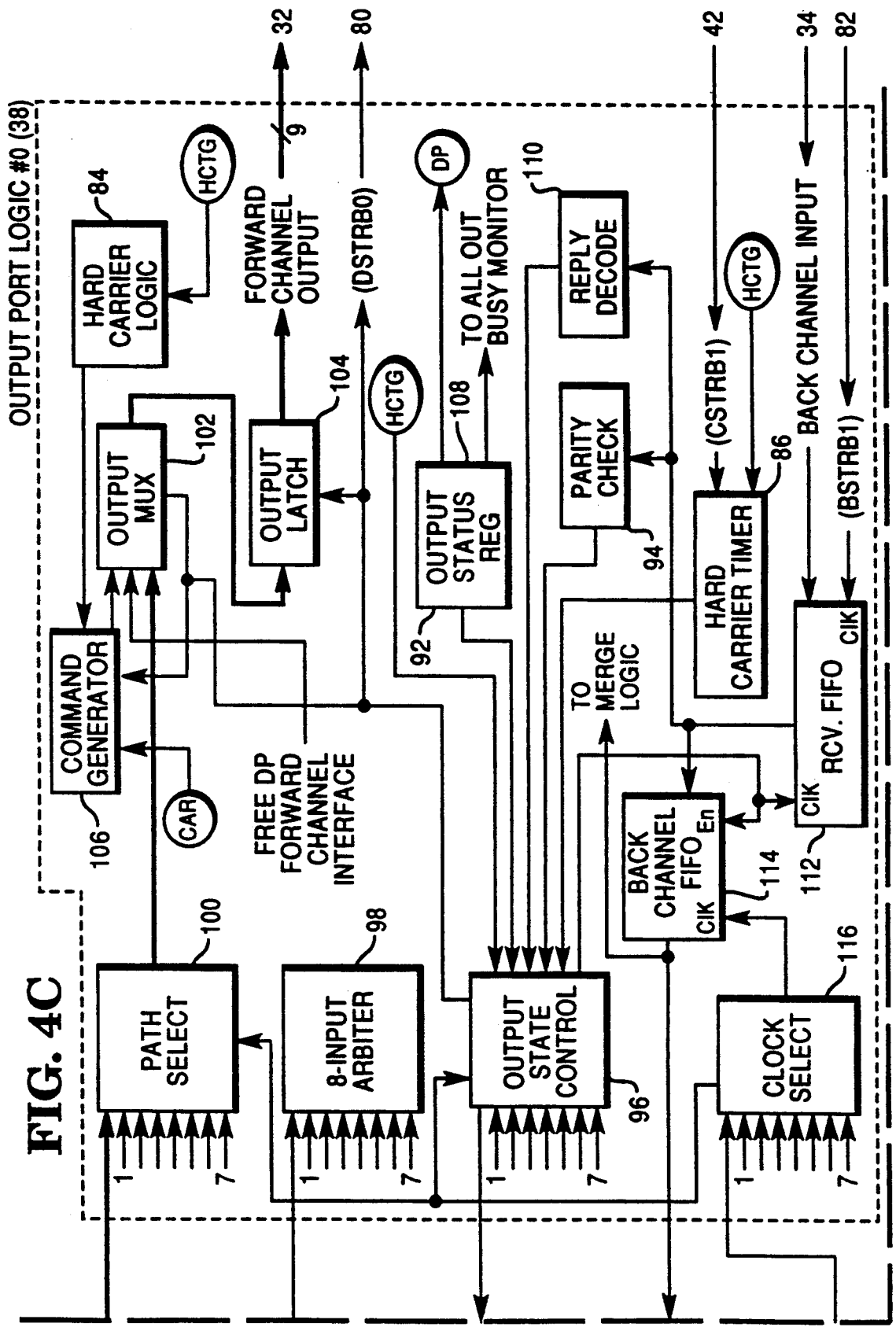
Figures 4, 4D:
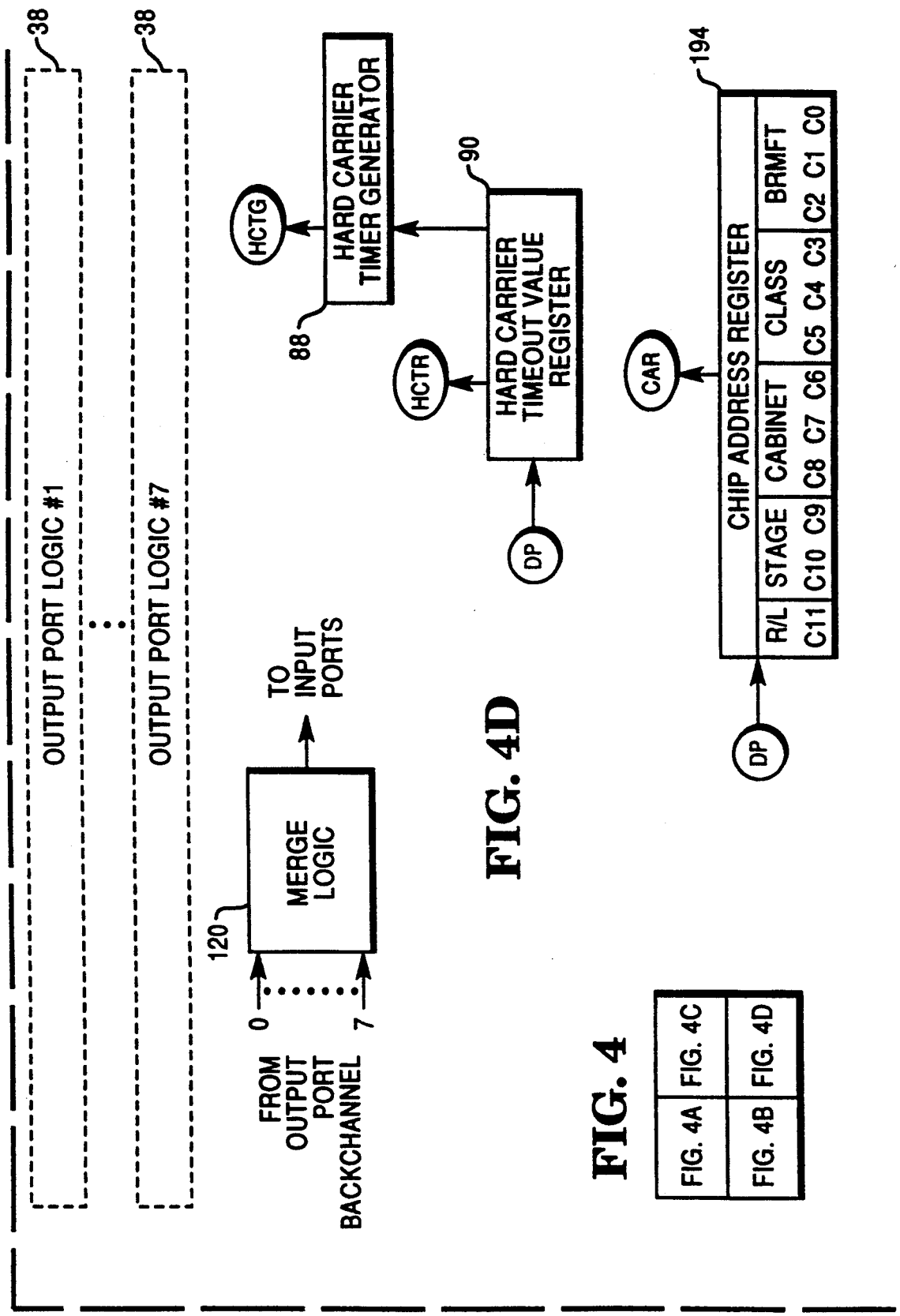

FIG. 4 describes the components of an 8×8 switch node 16 according to the present invention. FIG. 4 shows the basic circuitry required for communications from left to right through 9-bit forward channels 32, and for receiving and transmitting, from right to left, serial replies through 1-bit back channels 34. To implement a "folded" network 14, a duplicate but reversed 8×8 switch node 16 having the elements shown in FIG. 4 is required for communications from right to left through 9-bit forward channels 32, and for receiving and transmitting, from left to right serial replies, through 1-bit back channels 34.

The organization of the switch node 16 is modular; there are eight identical copies of the input port logic (IPL) 36 and eight identical copies of the output port logic (OPL) 38. Each switch node 16 is a crossbar so that each input port can be connected to any of the output ports. Each input port receives a forward channel 32 comprising eight bits of parallel data and one bit of parity; each input port transmits a back channel 34 comprising one bit of serialized data. Each output port receives a back channel 34 comprising one bit of serialized data; each output port transmits a forward channel 32 comprising eight bits of parallel data and one bit of parity.

Each IPL 36 is comprised of the following logic components, which are described further hereinafter: hard carrier timer 44, input FIFO 46, command/data latch 48, tag latch 50, command decode 52, parity check 54, input state control 56, output port select 58, data select mux 60, feedback select 62, command generator 64, input status register 66, back channel mux 68, reply generator 70, port level register 72, back channel output mux 74. Each OPL 38 is comprised of the following logic components, which are described further hereinafter: hard carrier logic 84, hard carrier timer 86, output status register 92, parity check 94, output state control 96, 8-input arbiter 98, path select 100, output mux 102, output latch 104, command generator 106, reply decode 110, receive FIFO 112, back channel FIFO 114, clock select 116. In addition, the switch node 16 comprises the following logic components, which are described further hereinafter: hard carrier timer generator 88, hard carrier timeout value register 90, all out busy monitor 118, merge logic 120, diagnostic port logic (DPL) 122, back channel interface 124, diagnostic port interface (DPI) 126, read/write control register 128, multicast port select register 130, tag mapping table 108, and chip address register 121.

Within the IPL 36, the input state control 56 constantly monitors the input on the forward channel 32 for the periodic presence of hard carriers, which indicates that the input port is connected to another switch node 16 or a TAXI transceiver 26. If the forward channel 32 input is directly interfaced to the TAXI transceiver 26, the presence of a hard carrier is indicated by a strobe of a CSTRBI signal 42 generated by a TAXI transceiver 26. If the forward channel 32 input is directly interfaced to another switch node 16, the presence of a hard carrier is indicated by the reception of a hard carrier escape code. Upon receipt of a hard carrier, a hard carrier timer 44 in the IPL 36 loads in two times the count value from a hard carrier timeout value register 90. The hard carrier timer 44 then counts down and another hard carrier must be received prior to the counter reaching zero; otherwise a hard carrier lost flag is set in the input status register 66. If the input port is not directly interfaced with a TAXI transceiver 26, the hard carrier timer 44 for the back channel 34 is disabled.

Within the OPL 38, the output state control 96 constantly monitors the input from the back channel 34 for the periodic presence of a hard carrier whenever it is directly interfaced to a TAXI transceiver 26. The presence of the carrier is indicated by a strobe of a CSTRBI signal 42 generated by the TAXI transceiver. Upon receipt of a hard carrier, a hard carrier timer 86 in the OPL 38 loads in two times the count value from a hard carrier timeout value register 90. The hard carrier timer 86 then counts down and another hard carrier must be received prior to the counter reaching zero; otherwise a hard carrier lost flag is set in the output status register 92. If the output port is not directly interfaced with a TAXI transceiver 26, the hard carrier timer 86 for the back channel 34 is disabled.

The OPL 38 also maintains the presence of a hard carrier on a forward channel 32 output. If there is no circuit active, the OPL 38 generates a hard carrier every time it receives a signal from the hard carrier timer generator 88, and upon reaching zero, the hard carrier timer generator 88 is reloaded from the hard carrier timeout value register 90. If a circuit is established, the OPL 38 generates a hard carrier whenever the IPL 36 to which it is connected receives a hard carrier. If the forward channel 32 output is directly interfaced to another switch node 16, the hard carrier that is generated takes the form a hard carrier escape code. If the forward channel 32 output is directly interfaced to a TAXI transceiver 26, the hard carrier is generated by the TAXI transceiver 26 as a result of not receiving anything from the switch node 16 OPL 38 forward channel 34 for one cycle.

When no circuit is established or pending, the switch nodes 16 and sending controllers 18 always generate a continuous stream of soft carrier commands. The controllers 18 and switch nodes 16 always expect to receive the soft carrier when there is no circuit established or pending. If the soft carrier or another legal command is not received immediately, a soft carrier loss error is reported by setting the appropriate bit of an input status register 66.

When a circuit is connected, pending connect, or pending disconnect, switch nodes 16 and controllers 18 always expect to receive an idle command when nothing else is expected. If an idle command or another legal command is not received, the forward channel loss bit or an idle loss error bit is set in the input status register 66.

4. NETWORK CONTROLLERS

Figure 5:
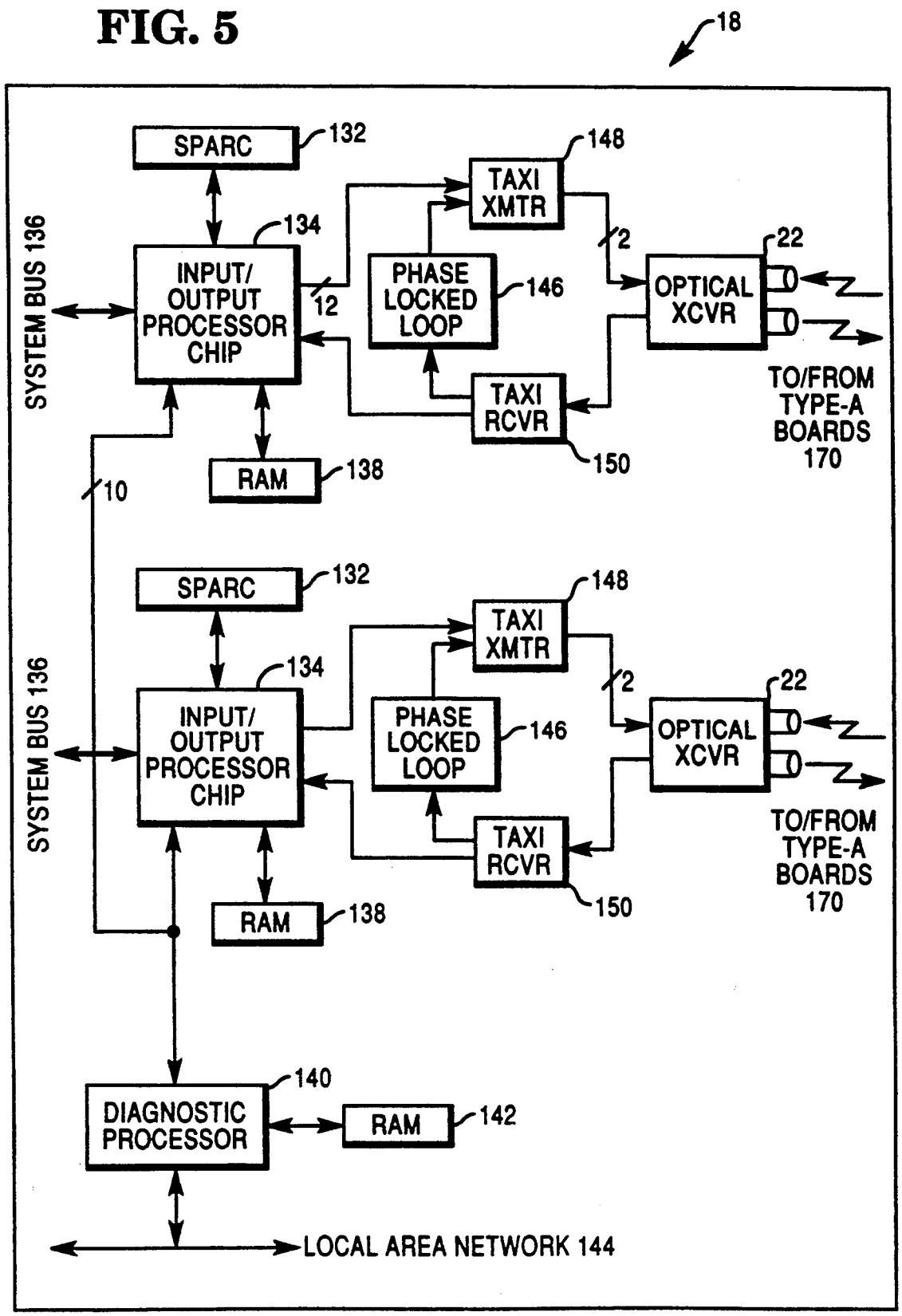
FIG. 5 is a block diagram describing the components of the controllers that connect each PM to the networks.

FIG. 5 is a block diagram describing the components of the controllers 18 that connect each PM 12 to the networks 14. A controller 18 comprises of a SPARC TM microprocessor 56 controlling the transfer of data through an input/output processor (IOP) 58. The IOP 58 communicates directly with a system bus 136 connected to the PM 12 and with the network 14 via phase locked TAXI transmitters 148 and receivers 150, and an optical transceiver 22. The TAXI transmitters 148 and TAXI receivers 150 are used to serialize and de-serialize data for transmission over optical fiber 24.

The controller 18 outputs a forward channel 32 consisting of eight bits of data plus a single bit parity, and a one bit back channel 34 associated with the receive channel to the TAXI transmitter 148. The controller 18 receives a forward channel 32 consisting of eight bits of data plus a single bit of parity and a one bit back channel 34 associated with the transmit channel from the TAXI receiver 150. The TAXI transmitter 148 converts the 10 bits of parallel data into bit serial data that encodes clock information into the data stream. The TAXI receiver 150 converts the bit serial data back into 10 bits of parallel data and recovers the clock. Each TAXI transmitter 148 on the controller 18 derives its clock input from the clock output of the TAXI receiver 150 via the phase locked loop 146. This allows each controller 18 to maintain synchronization to a master clock 28 distributed via the network 14.

5. DIAGNOSTIC PROCESSORS

As shown in FIG. 5, every controller 18 (and boards in FIGS. 6, 7, and 8) is interfaced to a diagnostic processor (DP) 140. There is one DP 140 per physical board that is interfaced to all the components on that board. All the DPs 140 are interconnected using a local area network (LAN) 144. During system startup, the DPs 140 have the ability to run self tests on the components and perform any initialization that is needed. During normal operation, the DPs 140 can respond to error conditions and facilitate logging them. Those DPs 140 that are interfaced to switch nodes 16 also participate in the process of reconfiguring the network 14 when errors are detected. A switch node 16 may detect numerous faults including parity errors, hard carrier loss, data over runs, back channel 34 loss, forward channel 32 loss, soft carrier loss, null loss, idle loss, FIFO errors, violation errors, tag errors, command/reply errors, time outs, and merge errors.

Referring again to FIG. 4, the diagnostic port interface (DPI) 126 in the diagnostic port logic (DPL) 122 of each switch node 16 allows the DP 140 to perform two types of activities within the switch node 16, i.e., reading and writing selected registers and sending information out any back channel 34 output. When the command decode 52 and the IPL 36 detects the presence of a DP 140 command or datum, it stores the command in the command/data and tag latches 48 and 50, and signals the DP 140 via the DPI 126. Using the DPI 126 and read/write register 128, the DP 140 picks up the command. The DP 140 commands are always acknowledged with a reply from the DP 140 which is returned via the back channel 34 output.

A forced parity error register is provided in each IPL 36 and each OPL 38. It is used for forcing parity errors on a forward channel 32 in the OPL 38 or back channel 34 in the IPL 36. The DP 140 may read or write the register. If a given forced parity error register is set to 00 when a test command or test reply is received, and a circuit exists, then the command or reply is forwarded to the next switch node 16, but otherwise ignored. If the register is set to 01 when a test command is received, and a circuit exists, then the test command is forwarded to the next switch node 16 and the byte which immediately follows has its parity bit inverted before being forwarded to the next switch node 16 (however, the forwarding switch node 16 does not report an error). If the register is set to 01 when a test reply is received and a circuit exists, then the test reply is "backwarded" to the previous switch node 16 with its first parity bit inverted (however, the "backwarding" switch node 16 does not report an error). In either case, the register is then cleared to zero. If the register is set to 10, then the behaviors are the same as the 01 case, except that the parity is inverted continuously as long as the register is set to 10, and the register is not automatically cleared to 00.

6. PACKAGING

In the preferred embodiment, each network 14 is constructed using up to four different boards, i.e., Type-A, -B, -C, and -D boards. Type-A and -D boards are used if the network 14 contains between 2 and 64 network I/O ports 20; Type-A, -B, and -D boards are used if the network 14 contains between 65 and 512 network I/O ports 20; and Type-A, -C, and -D boards are used if the network 14 contains between 513 and 4096 network I/O ports 20.

7. TYPE-A BOARD

Figure 6A:
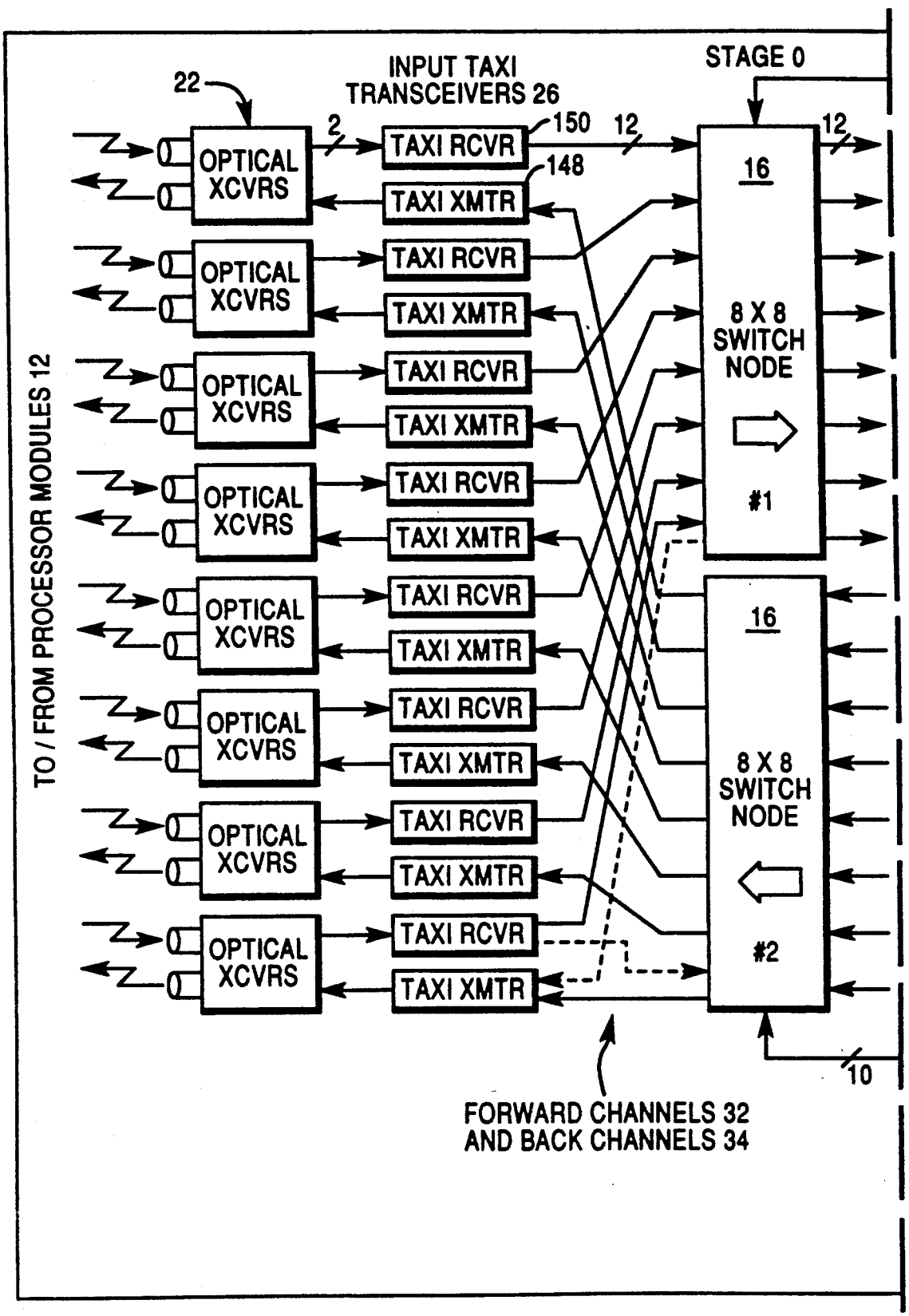
FIGS. 6(a) and 6(b) describe a Type-A board used in the network.
Figure 6B:
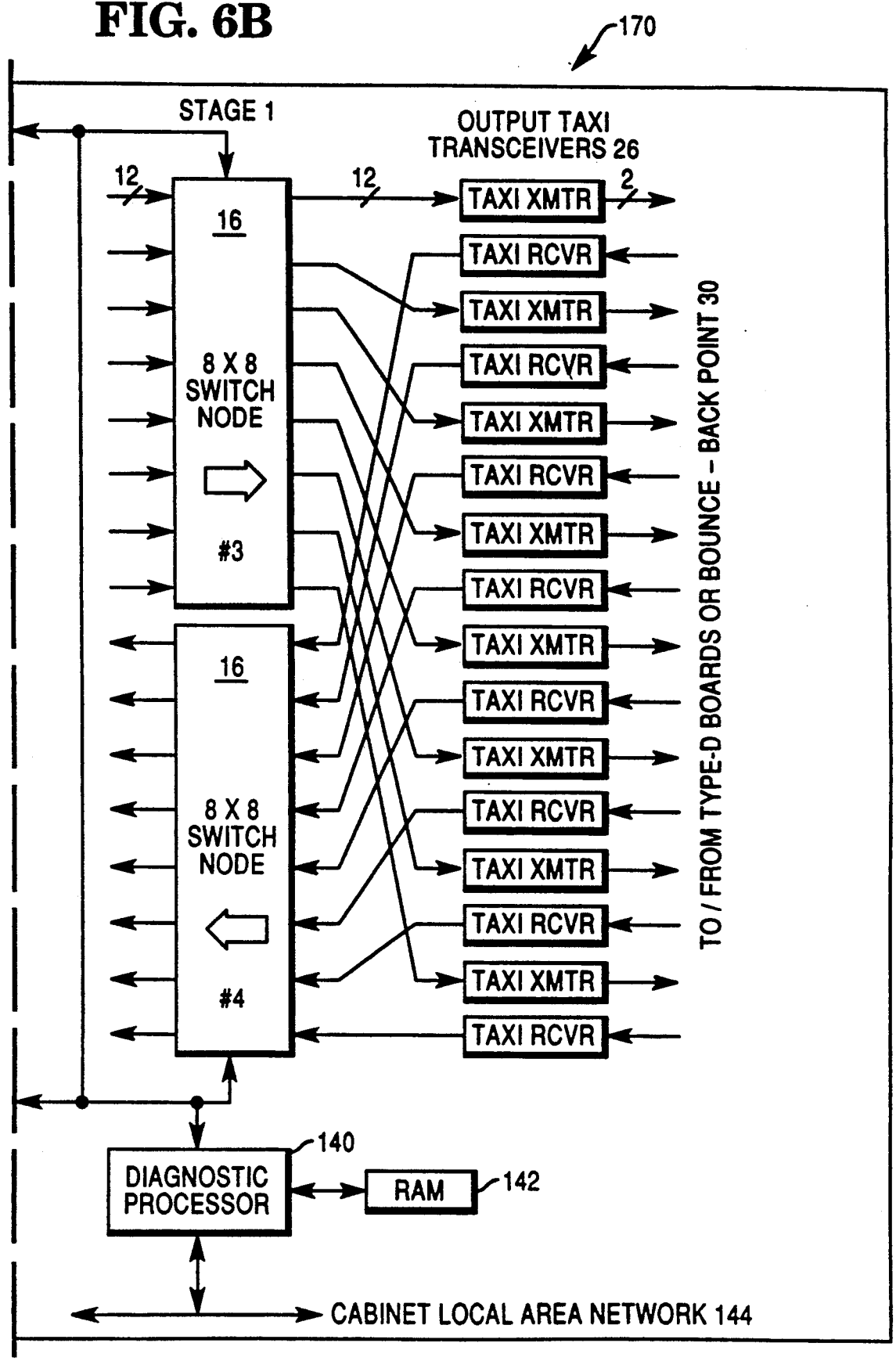

FIG. 6 describes a Type-A board 170. As described hereinbefore, the network 14 is physically folded and the switch nodes 16 are paired so that a "left" switch node 16 in a specific stage and level is physically adjacent to a "right" switch node 16 in the same stage and level. Each Type-A board 170 contains one such stage 0 switch node 16 pair and one such stage 1 switch node 16 pair. Consequently, eight properly connected Type-A boards 170 form a network 14 having 64 network I/O ports 20.

Up to eight PMs 12 may connect via controllers 18 to optical transceivers 22 on each Type-A board 170. The optical transceivers 22 communication, via TAXI transceivers 148 and 150, with the eight input ports of a first 8×8 switch node 16 in stage 0. Each of the output ports from the first stage 0 switch node 16 communicates with the input ports of a first stage 1 switch node 16. Up to eight Type-A boards 170 cross-connect between the first stage 0 switch nodes 16 and the first stage 1 switch nodes 16, in a manner described in FIG. 3, via a backplane (not shown). The first stage 1 switch node 16 connects to TAXI transceivers 148 and 150 which either loop back (at the bounce-back point 30) to connect to adjacent TAXI transceivers 148 and 150 in a network 14 with 64 or fewer network I/O ports 20, or connect to a Type-B board 172 (discussed below) in a network 14 having between 65 and 512 network I/O ports 20, or connect to a Type-C board 174 (discussed below) in a network 14 having between 513 and 4096 network I/O ports 20. The TAXI transceivers 148 and 150 connect to the input ports of a second stage 1 switch node 16. The output ports of the second stage 1 switch node 16 connect to the input ports of a second stage 0 switch node 16. Up to eight Type-A boards 170 cross-connect between the second stage 1 switch nodes 16 and the second stage 0 switch nodes 16, in a manner described in FIG. 3, via the backplane. The output ports of the second stage 0 switch node 16 connect to the optical transceivers 22, via TAXI transceivers 148 and 150, and thus to the eight PMs 12.

Note that when interfacing to a TAXI transceiver 148 and 150, output port i from the switch node 16 handling left to right paths is paired with input port i from the switch node 16 handling right to left paths, and vice versa. (For the sake of brevity and clarity, however, FIG. 6 shows only the back channel connections, as dotted lines, from the TAXI transmitter 148 at the bottom of FIG. 6 to the seventh input port on the #1 switch node 16 and from the seventh output port on the #2 switch node 16 to the TAXI receiver 150 on the bottom of FIG. 6.) Thus, any one of the PMs 12 can connect to another of the PMs 12 by appropriate switching of the stage 0 and stage 1 switch nodes 16.

8. TYPE-B BOARD

FIG. 7 describes a Type-B board 172. Each Type-B board 172 contains two switch node 16 pairs. The switch node 16 pairs are in stage 2 of any network 14 with more than 64 network I/O ports 20. These switch nodes 16 are on either side of the bounce-back point 30 and thus represent the point at which data "bounces back", "turns around", or reverses direction in the folded network 14. In networks 14 supporting between 65 and 512 network I/O ports 20, the stage 1 switch nodes 16 on the Type-A boards 170 are interconnected with the stage 2 switch node 16 on the Type-B boards 172 to effect an expansion of the network 14. Thus, any one of the PMs 12 can connect to another of the PMs 12 by appropriate switching of the stage 0, stage 1, and stage 2 switch nodes 16.

9. TYPE-C BOARD

Figure 8A:
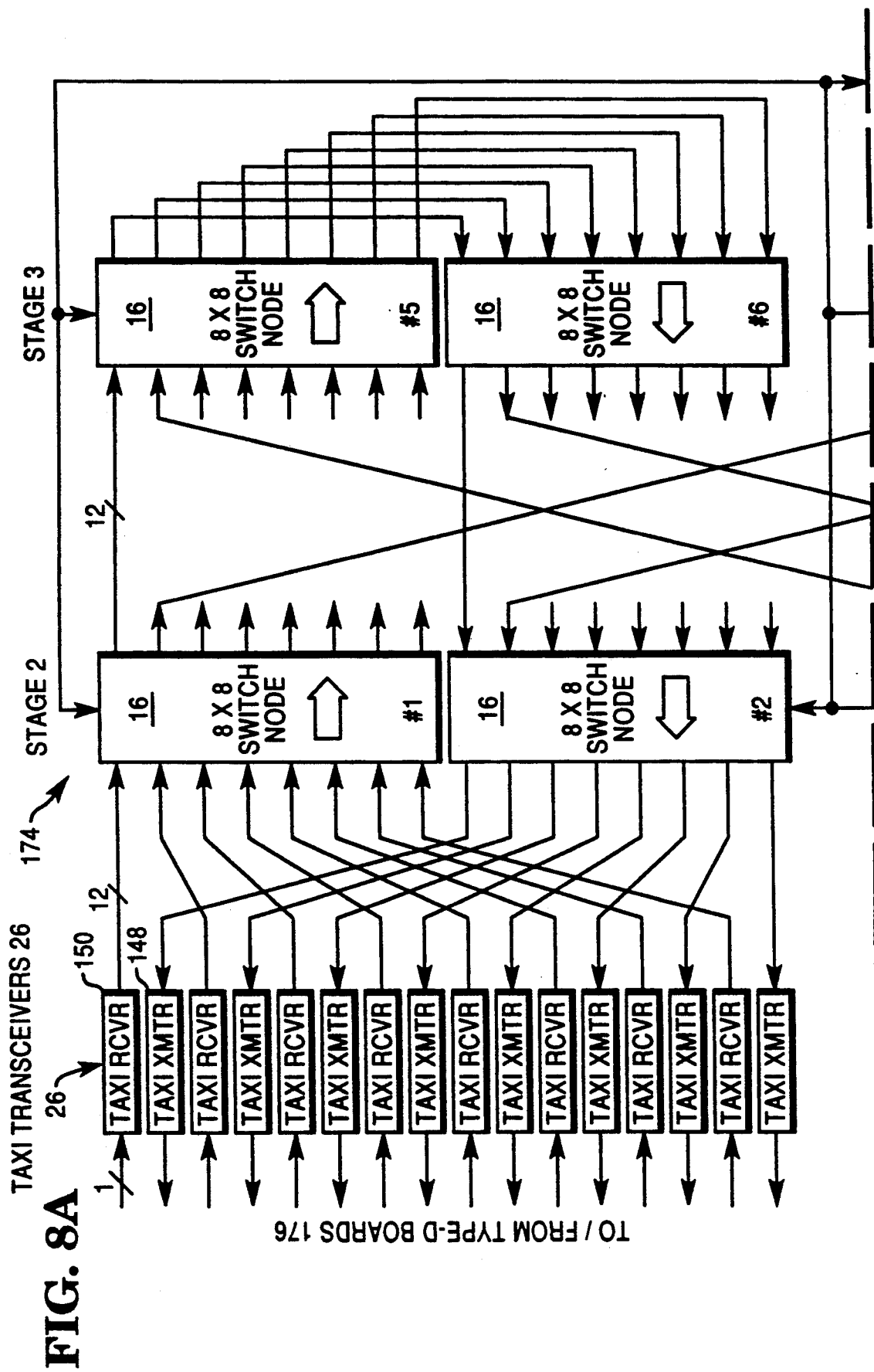
FIGS. 8 and 8(a) thru 8(c) describe a Type-C board used in the network.
Figure 8B:
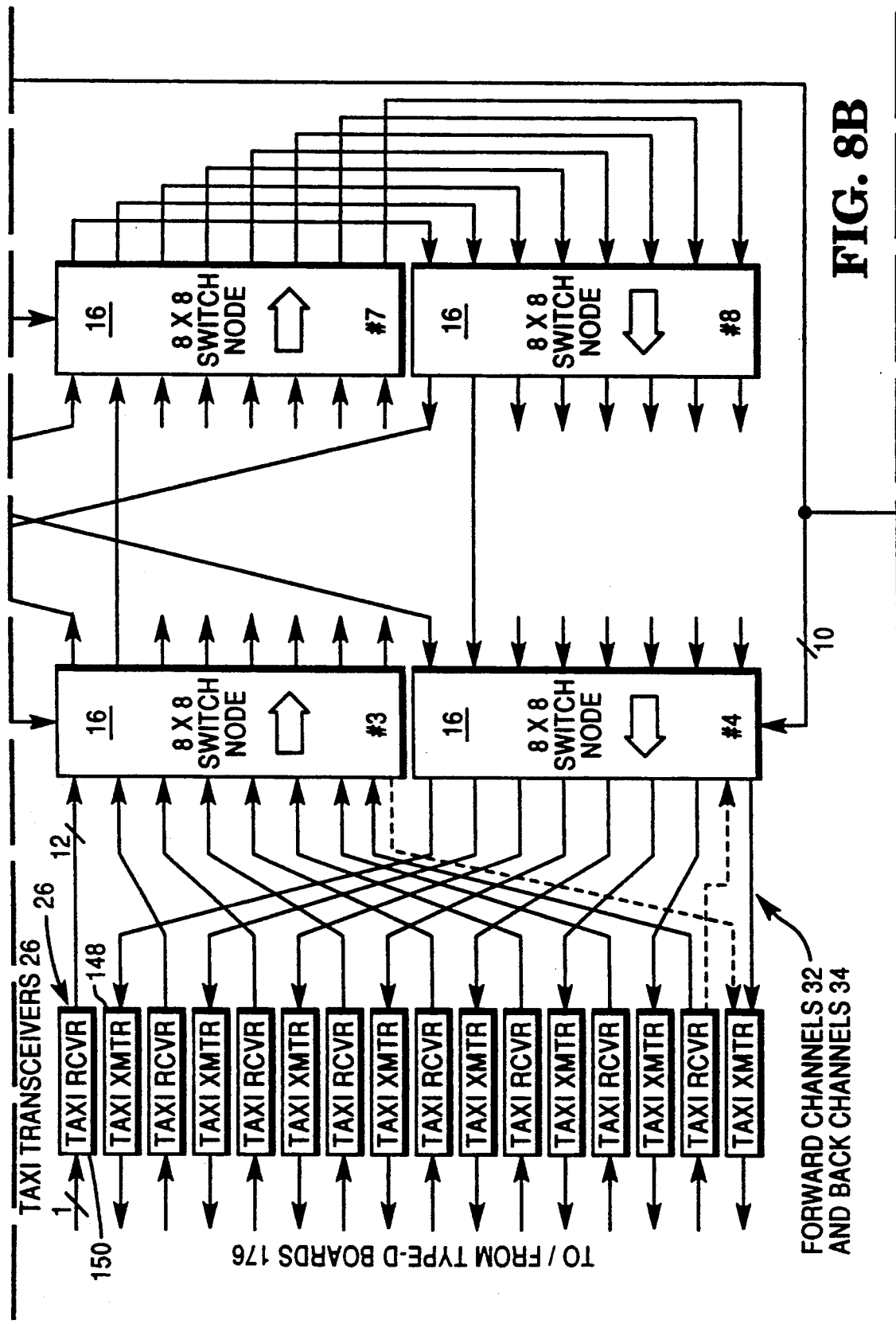
Figure 8C:
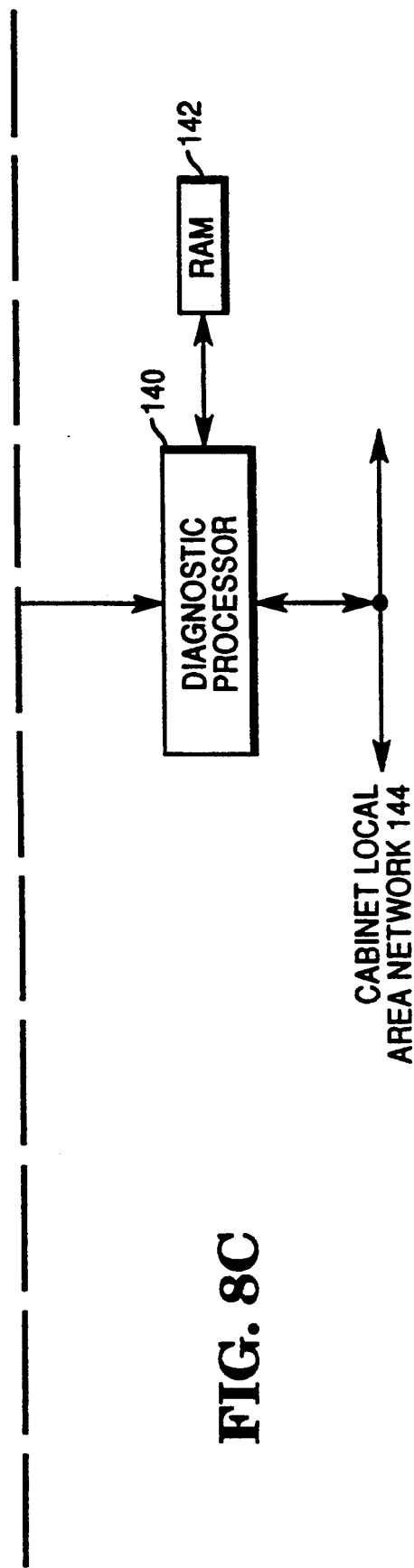
Figure 8:
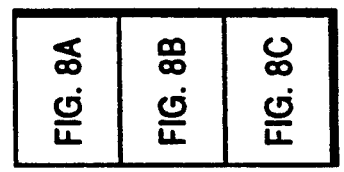

FIG. 8 describes a Type-C board 174. For a system 10 supporting between 513 and 4096 network I/O ports 20, an additional stage of switch nodes 16 (stage 3) is required, with the switch nodes 16 in stage 3 communicating with the switch nodes 16 of stage 2. Both stage 2 and stage 3 switch nodes 16 are implemented on the Type-C board 174. The switch nodes 16 labeled as #1–#4 are in stage 2 of the network 14; switch nodes 16 labeled as #5–#8 are in stage 3 of the network 14.

The input ports of a first stage 2 switch node 16 connect to Type-D boards 176 via TAXI transceivers 148 and 150. Each of the output ports from the first stage 2 switch node 16 communicates with the input ports of a first stage 3 switch node 16. Up to four Type-C boards 174 cross-connect between the first stage 2 switch nodes 16 and the first stage 3 switch nodes 16, in a manner described in FIG. 3, via a backplane (not shown). The first stage 3 switch node 16 loops back (at the bounce-back point 30) to connect to the input ports of a second stage 3 switch node 16. The output ports of the second stage 3 switch node 16 connect to the input ports of a second stage 2 switch node 16. Up to four Type-C boards 174 cross-connect between the second stage 3 switch nodes 16 and the second stage 2 switch nodes 16, in a manner described in FIG. 3, via the backplane. The output ports of the second stage 2 switch node 16 connect to Type-D boards 176 via TAXI transceivers 148 and 150. Note that when interfacing to a TAXI transceiver 148 and 150, output port i from the switch node 16 handling left to right paths is paired with input port i from the switch node 16 handling right to left paths, and vice versa. (For the sake of brevity and clarity, however, FIG. 8 shows only the back channel connections, as dotted lines, from the TAXI transmitter 148 at the bottom of FIG. 8 to the seventh input port on the #3 switch node 16 and from the seventh output port on the #4 switch node 16 to the TAXI receiver 150 on the bottom of FIG. 8.)

10. COMMUNICATION MODULE ASSEMBLY

Each cabinet housing the components of the network 14 contains up to six Communication Module Assemblies (CMAs). The packaging of components within the CMAs is intended to minimize configuration errors and simplify manufacturing and field upgrading. There are three types of CMAs, i.e., CMA/A, CMA/B, and CMA/C, depending on the size of the network 14: the CMA/A type is used in networks 14 supporting between 2 and 64 network I/O ports 20; the CMA/A and CMA/B types are used in networks 14 supporting between 65 and 512 network I/O ports 20; and the CMA/A and CMA/C types are used in networks 14 supporting between 513 and 4096 network I/O ports 20.

Figure 9:
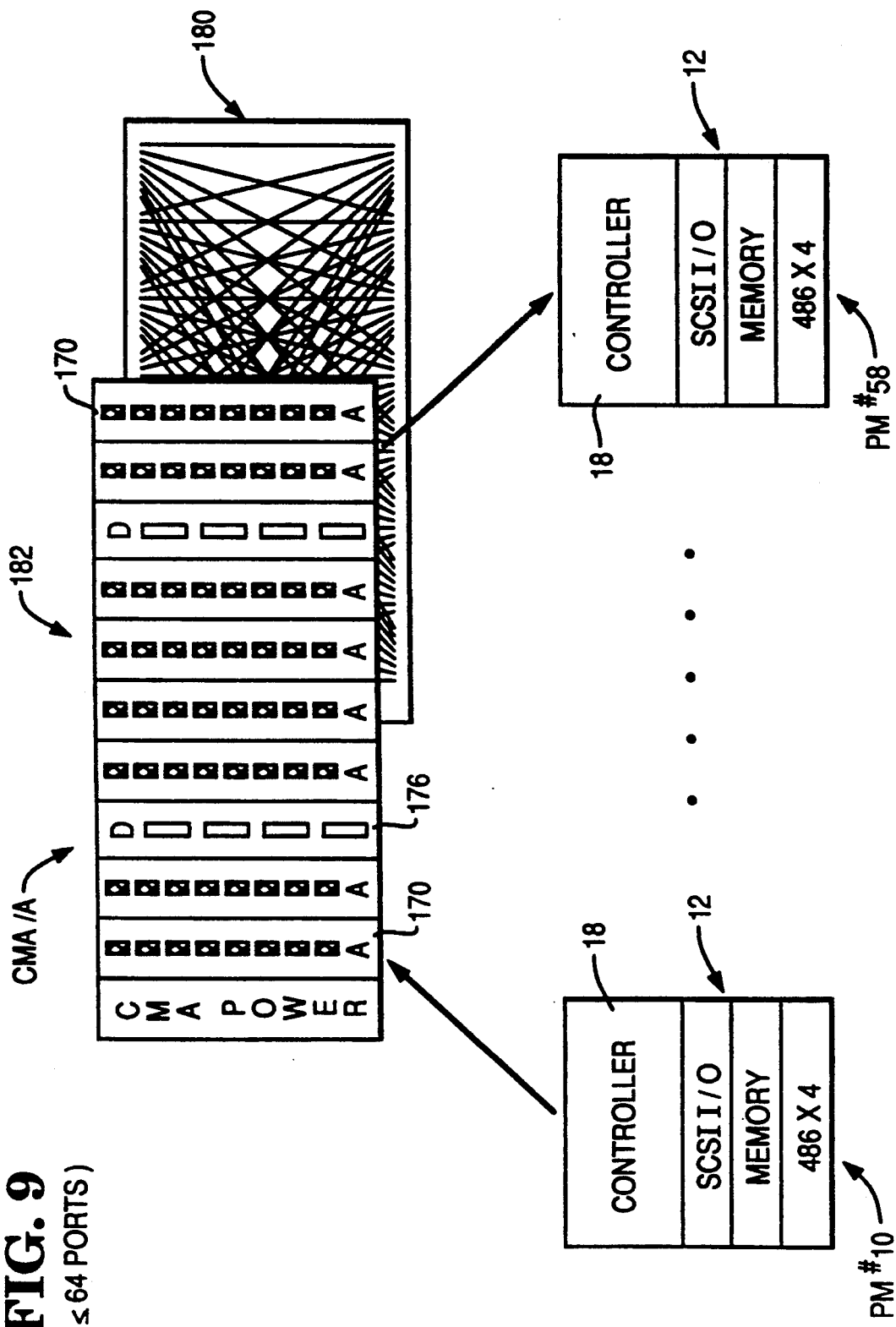
FIG. 9 illustrates a network comprising a single Communication Module Assembly (CMA/A), which supports between 2 and 64 network I/O ports.

FIG. 9 illustrates a network 14 comprising a single CMA/A 182, which supports between 2 and 64 network I/O ports 20. The CMA/A 182 contains a power board, up to 8 Type-A boards 170, and 2 Type-D boards 176. The Type-A and Type-D boards 176 are arranged in two groups of five boards each. In each group, the first two slots hold Type-A boards 170, the next slot holds a Type-D board 176, and the remaining two slots hold Type-A boards 170. The UWP between stage 0 and stage 1 switch nodes 16 is embedded in a backplane 180.

The Type-D board 176 in the CMA/A 182 interconnects up to four Type-A boards 170 in a CMA/A 182 to up to four Type-B boards 172 in a CMA/B 184. The rationale behind the Type-D board 176 is that there is no room for electrical connectors on the front panels of Type-A boards 170 to carry the signals from the Type-A boards 170 in the CMA/A 182 to Type-B boards 172 in a CMA/B 184. Therefore, the Type-D board holds four connectors on its front and the board is used only as a repeater of high speed TAXI signals. There can be up to two Type-D boards in a CMA/A 182 to service eight Type-A boards 170 in the CMA/A 182.

Figure 10:
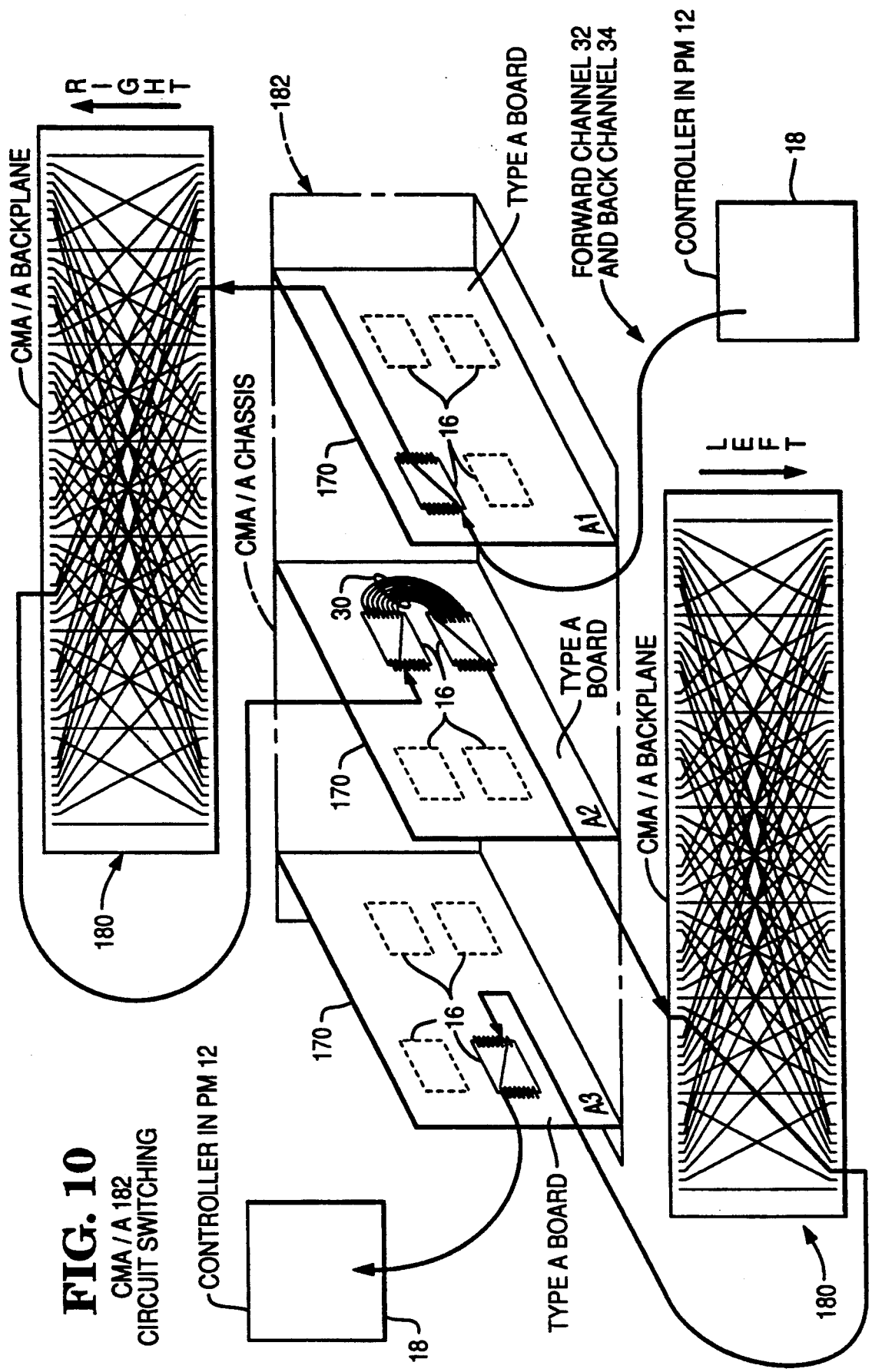
FIG. 10 describes circuit switching within the CMA/A wherein a Universal Wiring Pattern (UWP) between stage 0 and stage 1 switch nodes is embedded in a backplane.

FIG. 10 describes circuit switching within the CMA/A 182 and illustrates the Type-A board 170 connections to the backplane 180 and the PMs 12. In the preferred embodiment, all the stage 0 to stage 1 interconnections are between Type-A boards 170 residing in the same CMA/A 182, so the interconnection pattern, i.e., the UWP, between the stages is embedded in a backplane 180.

Within the Type-A boards 170, the bounce-back point 30 is created by connecting each of the eight TAXI transmitters 148 to the corresponding TAXI receivers 150 (see also, FIG. 6). Note that for a network 14 of this size, as an option, a non-expandable Type-A board 170 could be used with the following modifications to the board shown in FIG. 6: (1) the output TAXI transceivers 148 and 150 on the right side of FIG. 6 would be eliminated; and (2) the outputs from the switch node 16 labeled as #3 would be connected directly to the inputs to the switch node 16 labeled as #4. Doing this would substantially lower the power consumption (by approximately ½) and cost of the Type-A board 170. The main drawback is having an additional board type. However, this configuration could be expected to meet the needs of many systems.

Figure 11:
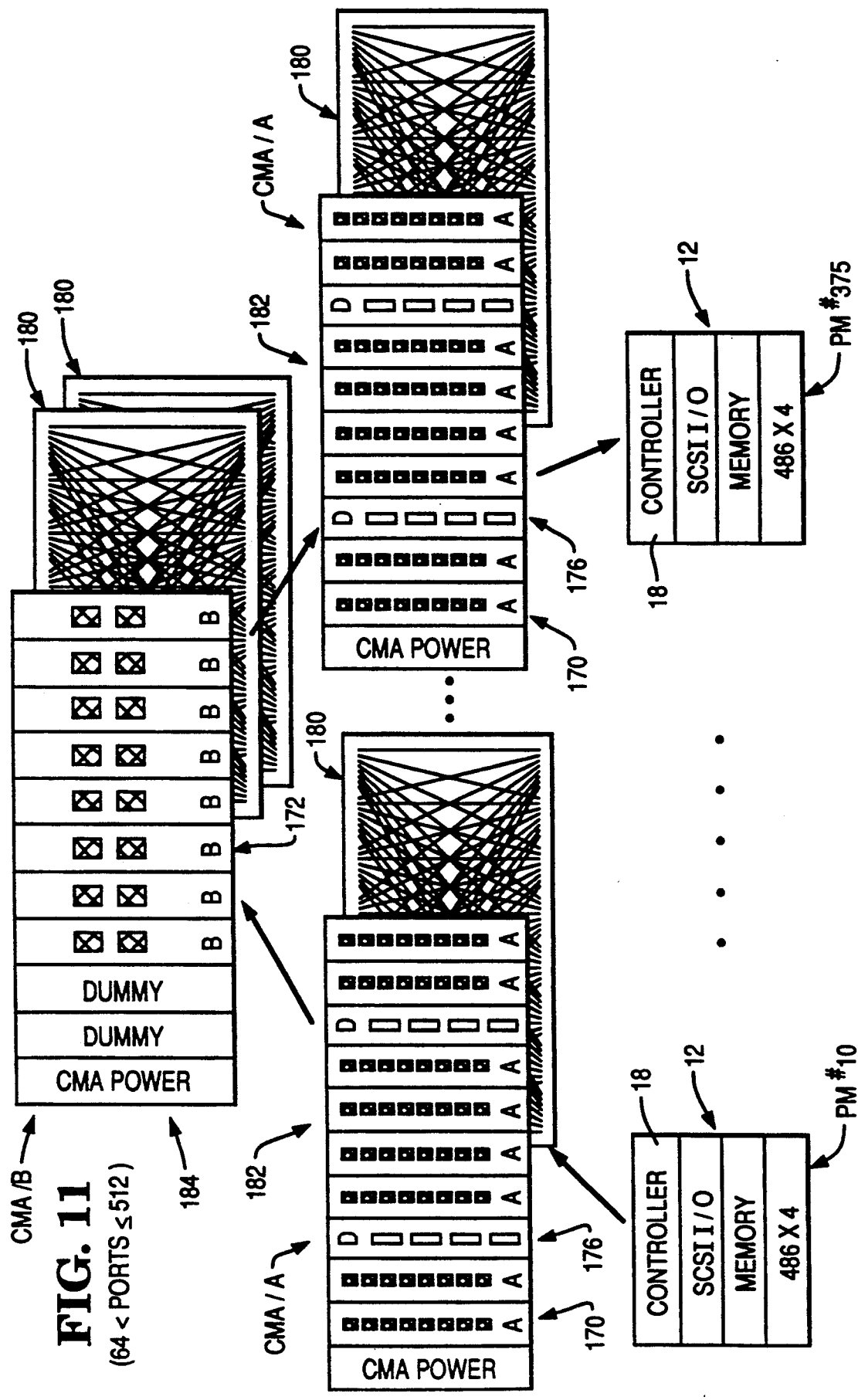
FIG. 11 illustrates a network 14 having CMA/As and CMA/Bs, which support between 65 and 512 network I/O ports.

FIG. 11 illustrates a network 14 having CMA/As 182 and CMA/Bs 184, which support between 65 and 512 network I/O ports 20. Each CMA/B 184 houses eleven slots containing a power board, two dummy slots, and two groups of four Type-B boards 172. For networks 14 supporting between 65 and 512 network I/O ports 20, each fully configured CMA/A 182 requires connection to one group in a CMA/B 184, i.e., every Type-B board 172 can connect to two Type-A boards 170. For networks 14 supporting 64 or fewer network I/O ports 20, no CMA/B 184 is required. In the preferred embodiment, the stage 1 to stage 2 interconnection pattern, i.e., the UWP, is embedded in a backplane 180 in the CMA/B 184. (Two backplanes 180 are shown in FIG. 11 because each group of four Type-B boards uses a different backplane.)

Figure 12:
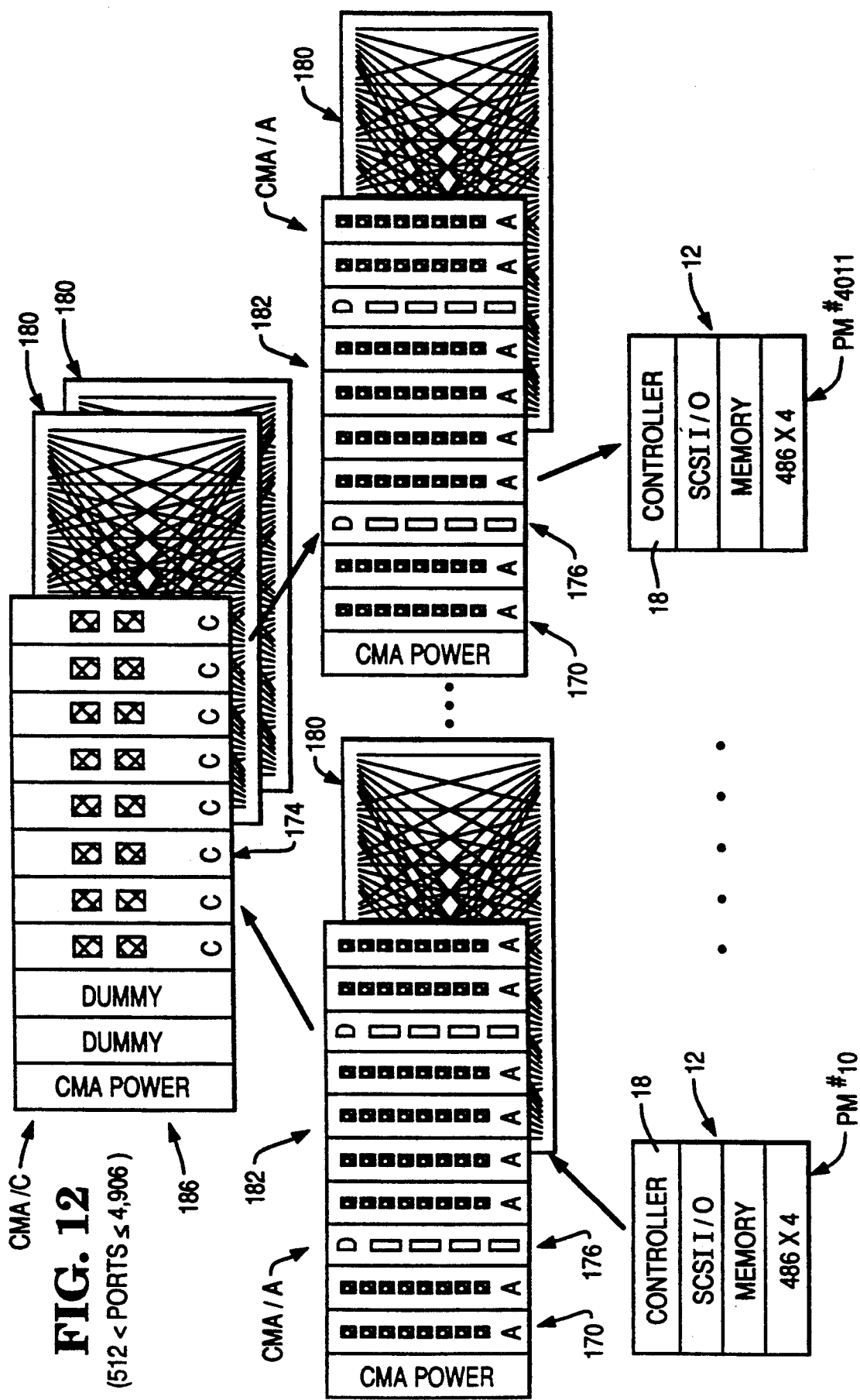
FIG. 12 illustrates a network 14 having CMA/As and CMA/Cs, which support between 65 and 4096 network I/O ports.

FIG. 12 illustrates a network 14 having CMA/As 182 and CMA/Cs 186, which support between 513 and 4096 network I/O ports 20. Each CMA/C 186 houses a power board, two dummy boards, and up to two groups comprised of four Type-C boards 174. For networks 14 supporting between 513 and 4096 network I/O ports 20, each fully configured CMA/A 182 requires connection to one group in a CMA/C 186, i.e., every Type-C board 174 can connect to two Type-A boards 170. In the preferred embodiment, all the stage 2 to stage 3 interconnections are between Type-C boards 174 residing in the same CMA/C 186, so the interconnection pattern, i.e., the UWP, between the stages is embedded in a backplane 180. (Two backplanes 180 are shown in FIG. 12 because each group of four Type-C boards uses a different backplane).

11. SIMPLIFIED CABLING

In the present invention, simplified cabling is intended to minimize configuration errors and simplify manufacturing and field upgrading. It is desirable to manufacture cables with a minimum number of different lengths. Without this capability, a given cable might not reach a specific connector in the specified CMA, although there are some connectors in that CMA it does reach. With this capability, it can be plugged into the connector that it does reach. In the field, connectors can be moved as needed for routing convenience. Thus, field engineers do not have to deal with as many configuration errors.

In the present invention, signal wires are grouped into multiconductor cables so that the number of cables that have to be handled is minimized. Cables within the network 14 can be plugged into almost any available connector in a chassis with minimal constraints. There are only two constraints on how to install cables: (1) two ends of the same cable cannot be plugged into the same board type; and (2) each cable end is constrained only as to which of several CMA/As 182 or CMA/Bs 184 (which group in the case of a CMA/B 184) it is connected. The cable may be plugged into any available connector in the correct CMA/A 182 or CMA/B 184, i.e., any of the four connectors on either Type-D board 176 in a CMA/A 182 or either connector on any of the four Type-B boards 172 in either group of a CMA/B 184. However, a connector on the Type-D board 176 is not considered available unless the slot to which it is wired contains a Type-A board 170. Unavailable connectors may be capped in manufacturing.

Figure 13:
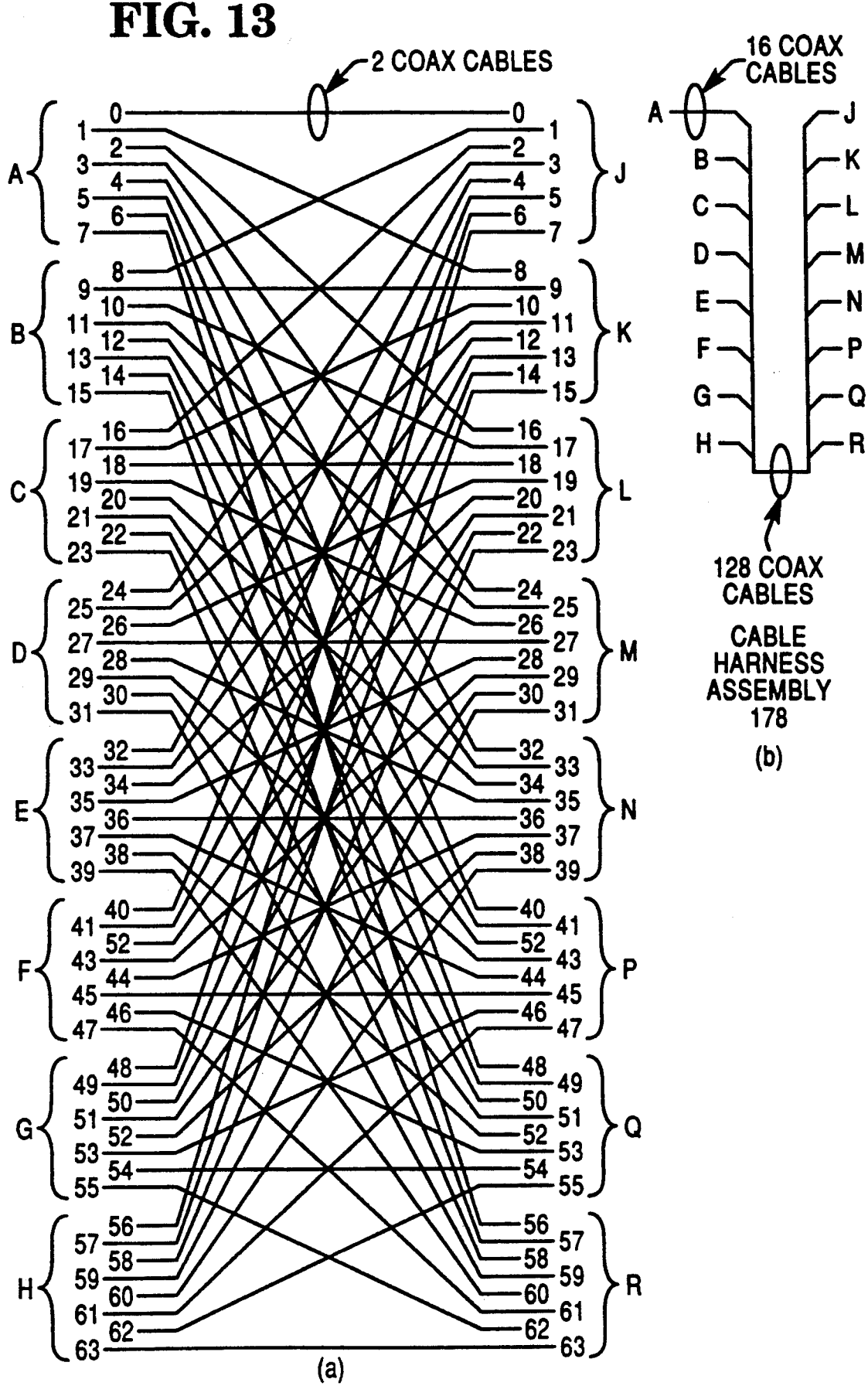
FIG. 13 illustrates a cable harness assembly.

FIG. 13 (a) illustrates a cable harness assembly 178, wherein each cluster of eight cables labeled with a letter (A through R) plugs into one bidirectional switch node 16 pair. Connectors A through H connect to switch nodes 16 on Type-A boards 170 (through the Type-D board 176) and J through R connect to switch nodes 16 on Type-B boards 172. FIG. 13 (b) provides a simplified representation of the cable harness assembly 178 of FIG. 13 (a).

Due to limited space for cable routing within a cabinet and the complexity of the cable harness assembly 178, it is preferable to avoid manufacturing a cable harness assembly 178 which is physically constructed as shown. Hence, the cabling is implemented as follows.

Figure 14:
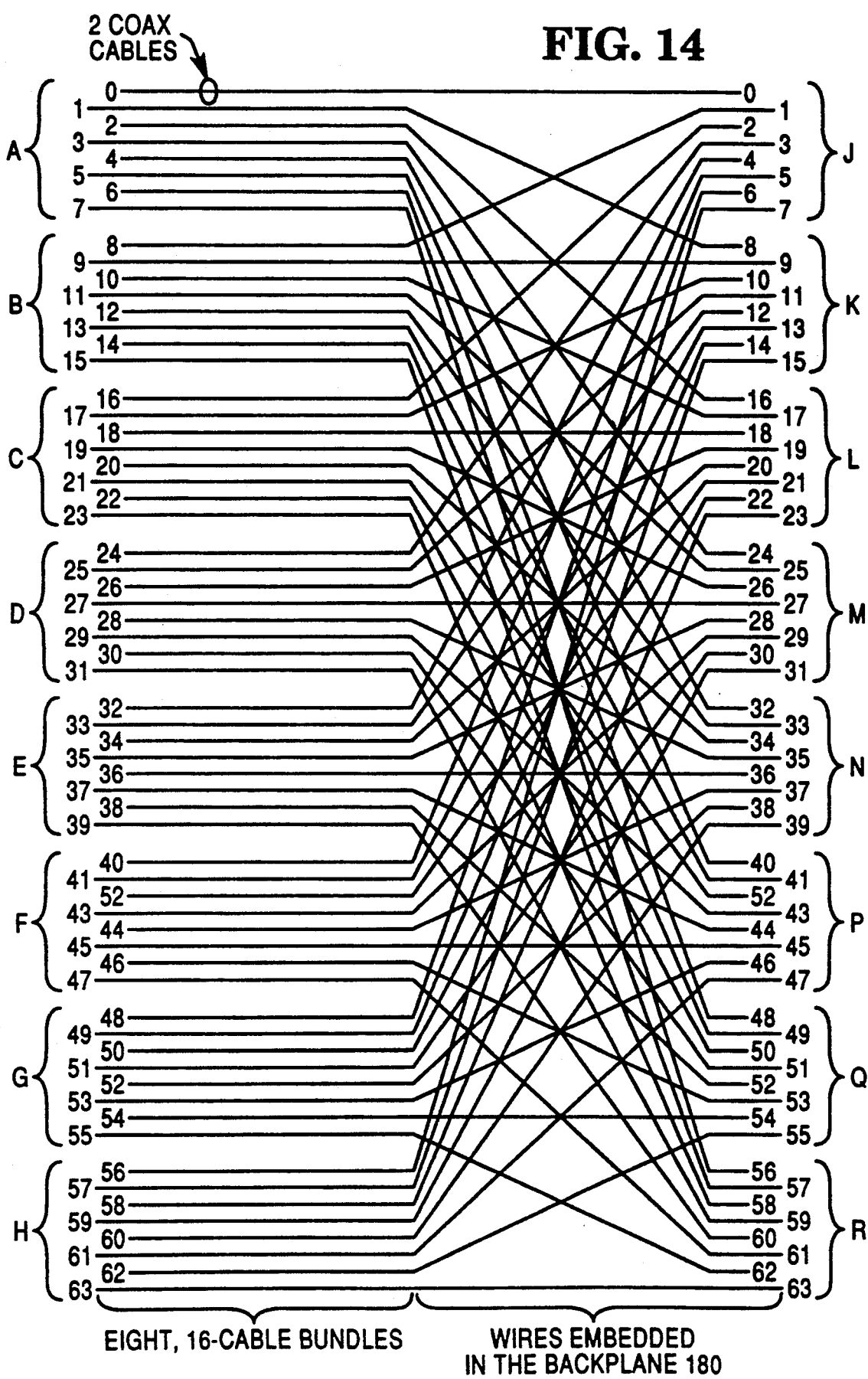
FIG. 14 illustrates a practical implementation of the cable harness assembly shown in FIG. 13.

For a network 14 with at least 65 but no more than 512 network I/O ports 20, one type of cable harness assembly 178 with variations in length is used. This cable harness assembly 178 is illustrated in FIG. 14 and is equivalent to the cable harness assembly 178 shown in FIGS. 13 (a) and (b). The cable harness assembly 178 comprises eight bundles, labeled A-H, wherein each bundle has eight pairs of coaxial cable. The cross connections are embedded in the backplane 180 to which the Type-B boards 172 are attached. The two connectors attached to the front panel of Type-B boards 172 are wired directly to the backplane 180 where they are distributed to the appropriate stage 2 switch nodes 16. The net result is as though the cable harness assembly 178 of FIGS. 13 (a) and (b) is used and each of its connectors, J through R, are directly connected to the TAXI transceivers 148 and 150 of a bidirectional switch node 16 pair on a Type-B board 172 instead of being routed through the backplane 180.

As additional network I/O ports 20 are added, only an approximately proportional amount of hardware is added, in most cases. Thus, the network 14 may be expanded in small increments while maintaining performance, in contrast to prior art networks 14 which require large increments of hardware to be added to maintain bandwidth when certain size boundaries are crossed, e.g., $N = b^i + 1$, wherein N is the number of network I/O ports 20, b is the number of switch node 16 I/O ports, and $i = 1, 2$, etc.

The cabling of networks 14 with more than 64 network I/O ports 20 allows for graceful expansion as the number of network I/O ports 20 is increased. The number of additional boards is kept to a minimum. As additional network I/O ports 20 are added to a network 14, the need to add Type-A boards 170 is determined by such factors as: (1) the number of Stage 0 to Stage 1 paths available by virtue of the Type-A boards 170 already present; (2) the percentage of the maximum possible bandwidth desired; (3) the number of optical transceivers 22 needed to physically connect all PMs 12; and (4) the number of CMAs that must be cross-linked.

As a network 14 grows from $N = 1$ to $N = 512$, either no additional hardware is required when a processor is added (the majority of the cases, i.e., 448 out of 512), or there is a linear increase of up to one additional resource of each type (57 out of 512 cases), or there is a discontinuity with more than linear growth (7 out of 512 cases).

The seven discontinuities are shown in Table I. The increment from 64→65 is the worst case percentage-wise, because that marks the transition from two stages to three stages. At all remaining discontinuities, the percentage increase is never greater than 12.5% (⅛th) beyond linear. There is no compounding effect due to the discontinuities in that, once a discontinuity is crossed, as N grows, no additional hardware is added at all until the linear growth relationship is restored, i.e., N "catches up" to the number of Type-A boards 170 or Type-B boards 172. This is illustrated in Table I where the ratios of numbers before the discontinuity is always perfectly linear, but not after. For example, in the "Type-A" column, $X_A \rightarrow Y_A$ is the change shown and, correspondingly, in the "N" column, $X_N \rightarrow Y_N$. Therefore, $X_A/X_N$ is always ⅛th, which is perfect because one Type-A board 170 can accommodate eight network I/O ports 20.

The minimum percentage of maximum possible bandwidth in a network 14 may be arbitrarily set to 50%. In order to maintain this bandwidth, the following formulae are used to calculate the number of CMA/As 182 (#CMA/A), CMA/Bs 184 (#CMA/B), Type-A boards 170 (#A), Type-B boards 172 (#B), and Type-D boards 176 (#D):

```
#CMA/A =   N/64
     #A =  MAX( N/8 , (8 * (N−1)/64 +
           MAX( ⌈(N MOD 64)/8⌉ ,
           SQRT(⌈(N MOD 64)/2⌉) ,
           N/128  * (N > 64))))
     #B =  (N > 64) * 4 * N/128
     #D =  (#CMA/A + MIN(#CMA/A − 1, (2 * #B −
           MIN(4, #A − 8 * (#CMA/A − 1))) MOD(4 *
           (#CMA/A − 1))))
#CMA/B =   #B/8
``` wherein MAX is a maximum function, MIN is a minimum function, ⌈ ⌉ is a ceiling function, ⌊ ⌋ is a floor function, MOD is an integer remainder, SQRT is a square root, and > is a boolean "greater than" function.

To configure a system 10 for N PMs 12 such that 100% of the maximum possible bandwidth is available, the following formulae are used to determine the number of CMA/As 182 (#CMA/A), CMA/Bs 184 (#CMA/B), Type-A boards 170 (#A), Type-B boards 172 (#B), and Type-D boards (176) (#D) that are required:

```
#CMA/A =   N/64
     #A =  MAX( N/8 , (8 * (N − 1)/64 +
           MAX( SQRT(N MOD 64) , N/64  *
           (N > 64))))
     #B =  (N > 64) * MAX( #A/2 , 4 *
           (N − 1)/64  +  N/128 )
     #D =  #A/4
#CMA/B =   #B/8
```

Table II shows an example of the number of Type-A boards 170 needed versus the number of PMs 12 for a network 14 with up to 64 network I/O ports 20 if only 50% of the maximum possible bandwidth is required. For up to 32 network I/O ports 20, the number of PMs 12 accommodated is determined by counting the number of connections between the switch nodes 16 on the number of boards indicated. Beyond 32 network I/O ports 20, the number of boards required is strictly determined by the number of optical transceivers 22 required to accommodate that number of PMs 12.

Table III shows an example of the number of Type-A boards 170 to install in the least populated CMA/A 182 given the number of PMs 12 to be connected to the depopulated CMA/A 182. This assumes 100% of the maximum possible bandwidth is to be provided. In this case, the number of boards required is always limited by the number of connections available between Stage 0 and Stage 1 switch nodes 16. In a network 14 with more than 64 PMs 12, a Type-B board 172 is provided for every two Type-A boards 170. However, there must be at least as many Type-B boards 172 as there are CMA/As 182, so extra boards may have to be added. In most cases, if any additional hardware is required, the addition of a single PM 12 to the network 14 may require the addition of one Type-A board 170, and one Type-B board 172 per network 14. If the current number of PMs 12 is a multiple of 64, then the addition of a single PM 12 requires two to four additional Type-B boards 172, possibly an additional CMA/B 184 chassis, an additional CMA/A 182 chassis, 2 additional Type-D boards 176, and one additional Type-A board 170 for every group of four Type-B boards 172 (maximum of eight). On average, however, the number of boards and CMAs required is directly proportional to the number of PMs 12.

In the #A formula above, for 100% bandwidth, as the network 14 grows from 1 to 512 network I/O ports 20, the term:

$$N/8 \qquad (A)$$

makes sure there are enough network I/O ports 20 to plug PMs 12 into. This term handles the case where N is 64x.

The term:

$$8 * (N-1)/64 \qquad (B)$$

calculates the number of completely full CMA/As 182, as long as there is at least one more partially populated one.

In the term:

$$SQRT(N \text{ MOD } 64) \qquad (C)$$

(N MOD 64) calculates the leftover part for the partially populated CMA/A 182 and the SQRT function accounts for the cross-connect between stages 0 and 1. If this is larger than the second term (B), then we are assured of being able to cross-connect all Type-B boards 172.

The term:

$$N/64 \qquad (D)$$

makes sure there are enough Type-A boards 170 to cross-connect with Type-B boards 172. This is where the overhead comes from.

The term:

$$(N>64) \qquad (E)$$

assures that the (D) term is used only if N>64.

To compare the results for the #A formula for both N=64x and N=64x+1, 1<x<8, examine the following derivation:

```
    MAX(  (64x + 1)/8  , (8 *  ((64x + 1) − 1)/64  +
    MAX(  SQRT(64x + 1) mod 64 ,
    (64x + 1)/64   ))) −
    MAX(  64x/8  , (8 *  (64x − 1)/64  +
    MAX(  SQRT(64x MOD 64)  ,  64x/64  )))
 =  MAX((8x + 1), (8x + MAX(1, x + 1))) −
    MAX(8x, (8 * (x − 1) + MAX(0, x)))
 =  MAX((8x + 1), (8x + x + 1)) −
    MAX(8x, (8x − 8 + x))
 =  (9x + 1) − 8x
 =  x + 1
```

This is the number of Type-A boards 170 added in crossing over from N=64x to N=64x+1. Since we would expect to add 1 due to linear growth, the overhead is x. This percentage of the total is 100* x/8x=$\frac{1}{8}$* 100=12.5%. The overhead, x, comes from the term:

$$N/64$$

for N=64x+1, which accounts for providing cross connections to the Type-B boards 172. The constant overhead ratio is due to the fact that the number of extra boards grows as x, and networks 14 that are multiples of 64 in size, by definition grow as x. The $\frac{1}{8}$th value is due to the fact that eight Type-A boards 170 are needed for every 64 network I/O ports 20 provided, but only one extra Type-A board 170 is needed per 64 network I/O ports 20 in the least populated CMA/A 182 to allow it to be connected to the Type-B boards 172.

If the above derivation was repeated for the remaining formulae, i.e., for the #CMA/A, #CMA/B, #B, and #D formulae, as illustrated in Table I, none of the increases would exceed 12.5%. Those skilled in the art will readily recognize how to derive the other formulae, based on the information given above.

In changing from one network 14 size to another, it may be necessary and/or desirable to completely disconnect all of the intra-network 14 cables and reconnect them for the new configuration. For small networks 14 (relative to one with 512 network I/O ports 20), the changes will typically involve moving a small number of cables from one board to another as will be illustrated below.

For networks 14 with at least 65 and no more than 512 network I/O ports 20, the eight connectors at one end of the cable harness assembly 178 described above are attached to the corresponding eight connectors on the four Type-B boards 172 in one group of a CMA/B 184. The eight connectors at the other end of the cable harness assembly 178 are distributed evenly among CMA/As 182 that are fully populated with Type-A boards 170, and are attached to Type-D boards 176 within the selected CMA/As 182. Connectors that would be allocated to a CMA/A 182 that is partially filled with Type-A boards 170 are evenly redistributed to CMA/As 182 that have all eight Type-A boards 170.

For networks 14 with at least 65 and no more than 512 network I/O ports 20, to provide at least 50% of the maximum possible bandwidth, the number of cable harness assemblies used to interconnect X CMA/As 182 to X/4 CMA/Bs 184 is X/2 if X is even and (X+1)/2 if X is odd, wherein X/4 is a ceiling function providing the smallest integer not less than X/4. Cable harness assemblies can be added one at a time until there are a total of X cable harness assemblies, at which point 100% of the maximum possible bandwidth will be available.

Figure 15:
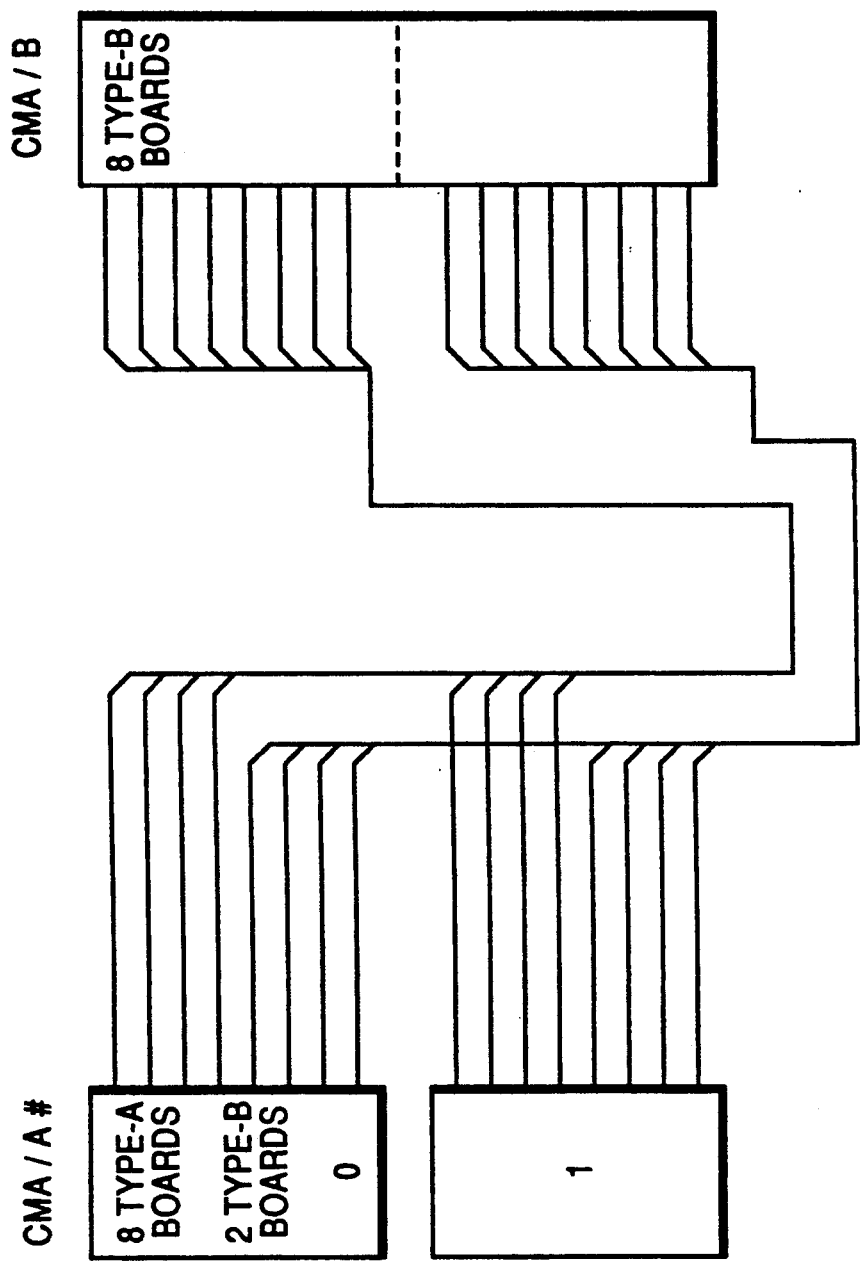
FIG. 15 shows a simplified wiring diagram describing how the switch nodes are connected in a network having 128 network I/O ports.

FIG. 15 shows a simplified wiring diagram describing how the switch nodes 16 are connected in a network 14 having 128 network I/O ports 20. The CMAs are represented by the solid boxes. The left hand block represents a CMA/A 182 with eight Type-A boards 170. The right hand block represents a CMA/B 184 with two groups of four Type-B boards 172 each therein. Two cable harness assemblies are used to link the Type-A boards 170 in each CMA/A 182 to the Type-B boards 172 in the CMA/B 184.

FIGS. 16(a), (b), (c) and (d) provide simplified wiring diagrams describing the expansion from 64 PMs 12 to 65–128 PMs 12. In each case, each PM 12 gets at least 50% of the maximum possible bandwidth.

Figure 16:
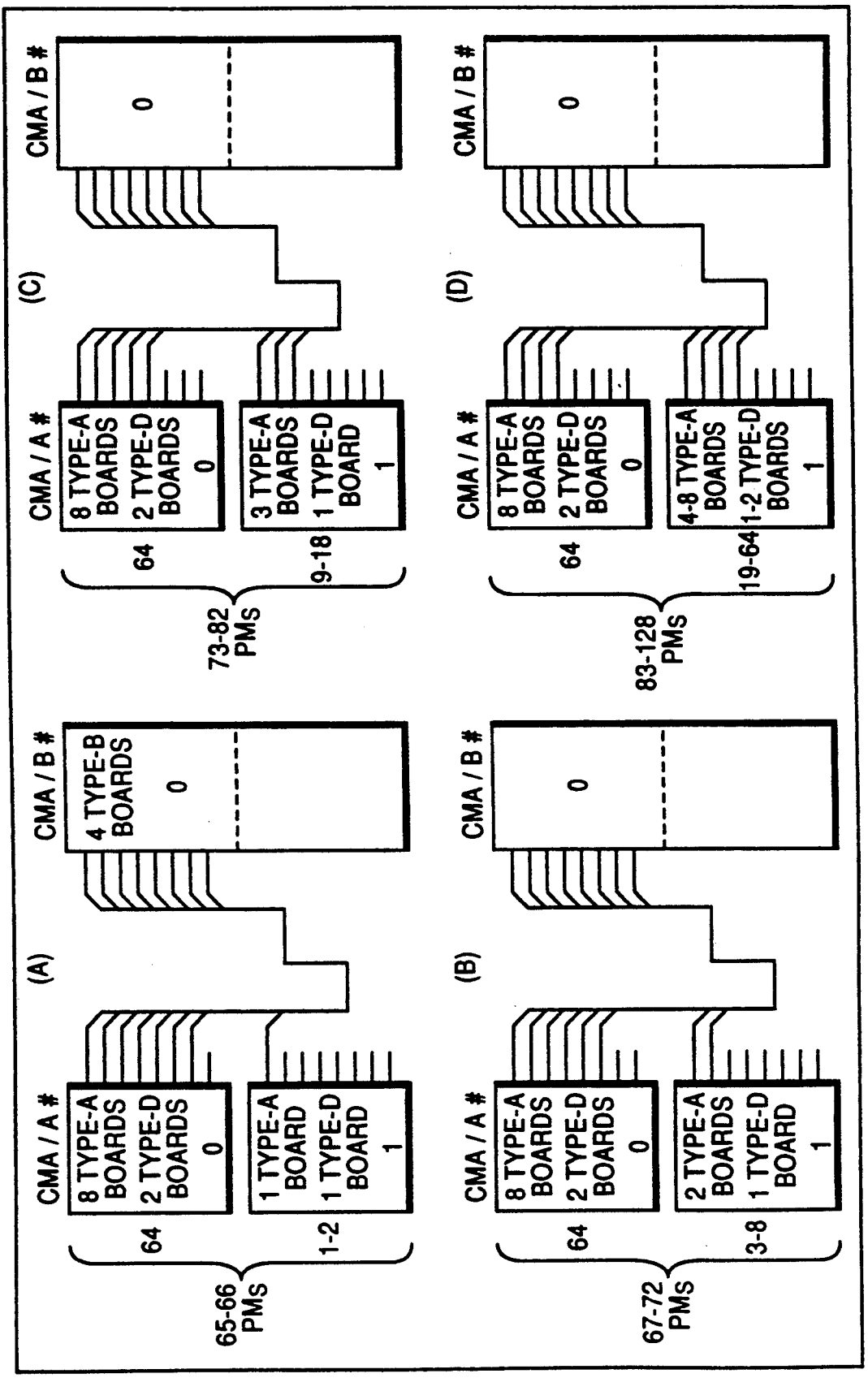
FIG. 16 provides simplified wiring diagrams describing the expansion from 64 PMs 12 to 65-128 PMs.

In FIG. 16 (a), CMA/A #1 need only contain one Type-A board 170 and one Type-D board 176 and only one connector from the CMA/A end of the cable harness assembly 178 is connected to the Type-D board 176. The other seven connectors are attached to any seven of the eight available Type-D connectors in CMA/A #0. Recall that the Type-A boards 170 comprise Stages 0 and 1 of the network 14, so all PMs 12 attached to CMA/A #0 can establish paths to switch nodes 16 in Stage 1 to which a cable is attached. The switch nodes 16 in Stage 0 will automatically sense any Stage 1 switch nodes 16 that are unconnected and avoid trying to establish paths through them. Note also that there would be up to 64 optical cables attached to the "left" side of each CMA/A 182 in the FIG. 16 (a) for connection to the PMs 12, although they are not explicitly shown.

FIG. 16 (b) shows the cabling for the situation in which there are three to eight additional PMs 12 beyond 64. Two Type-A boards 170 are required in CMA/A #1 and each associated connector on the Type-D board 176 must have a cable harness assembly 178 attached to maintain a balanced bandwidth between CMA/A #0 and CMA-A #1. A connection is moved from CMA/A #0 to CMA/A #1 for each Type-A board 170 added until there are at least four. At that point, the bandwidth is as evenly split as possible using one cable harness assembly 178. Again, within each CMA/A 182, it does not matter to which of the eight possible connection points four of the cable connectors are attached. It also does not matter which four of the cables in the cable harness assembly 178 go to which CMA/A 182, they just have to be evenly divided to maintain uniform bandwidth; in any event, the network 14 would still function correctly.

FIG. 16 (c) shows the cabling for the situation in which there are 9-18 additional network I/O ports 20 beyond 64.

FIG. 16 (d) shows the cabling for the situation in which there are 19-78 additional network I/O ports 20 beyond 64.

Figure 17:
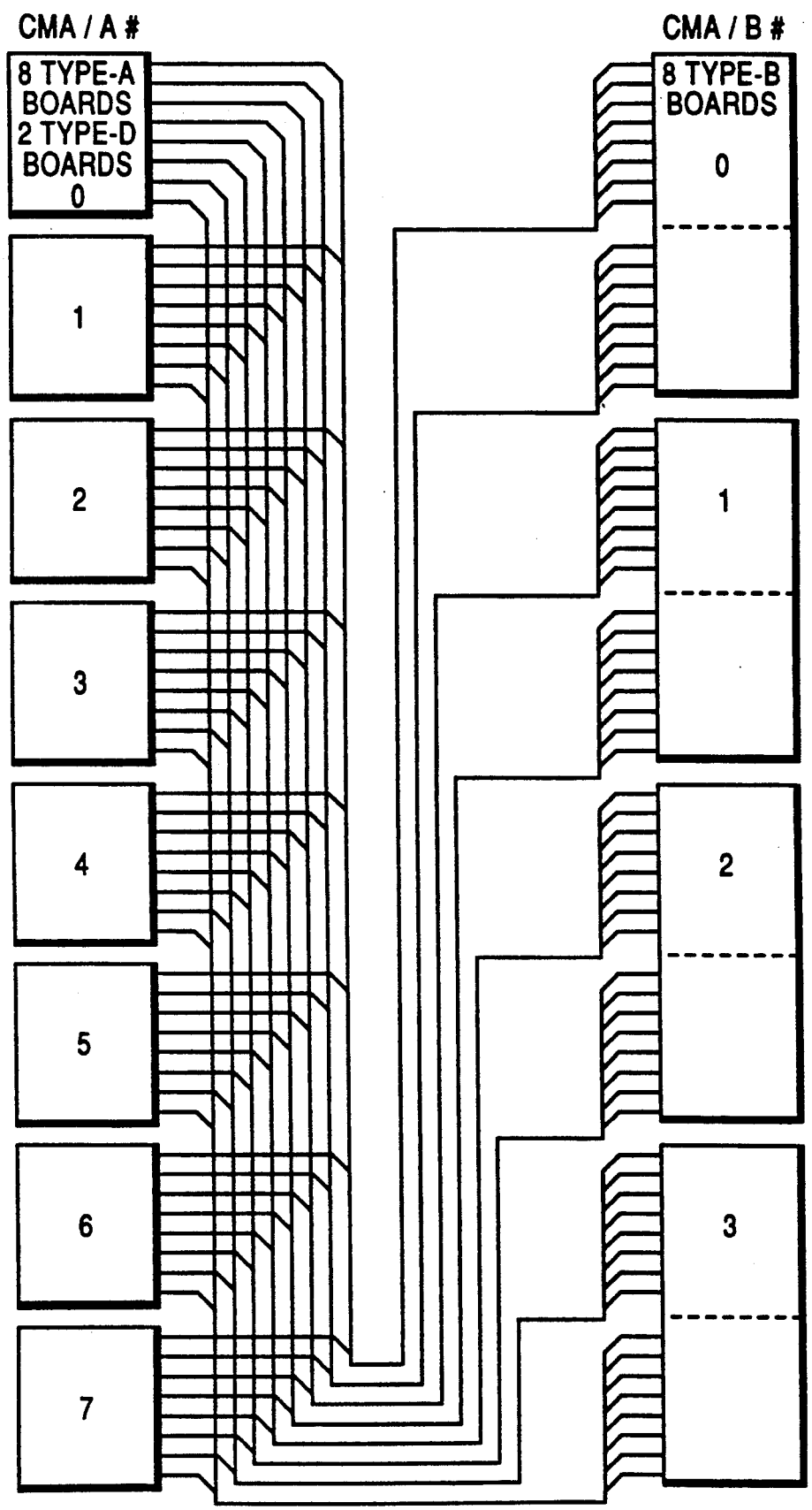
FIG. 17 shows the cabling for the situation in which there are 512 network I/O ports in the network.

FIG. 17 shows the cabling for the situation in which there are 512 network I/O ports 20 in the network 14. Twelve CMAs are present comprising eight CMA/As 182 that are fully populated with eight Type-A boards 170 (and two Type-D boards 176), and four CMA/Bs 184 with each group populated with four Type-B boards 172. All of the CMAs are housed in two docked cabinets (not shown). Eight cable harness assemblies are used to connect the CMA/As 182 to the CMA/Bs 184. The bandwidth of this network 14 can be reduced in increments of ⅛th by depopulating Type-B boards 172 from any CMA/B 184, four at a time. For each set of four Type-B boards 172, i.e., one group, removed from a CMA/B 184, the corresponding cable harness assembly 178 is also eliminated. The main reason to depopulate would be to lower the cost of the network 14 without losing functionality.

Figure 18:
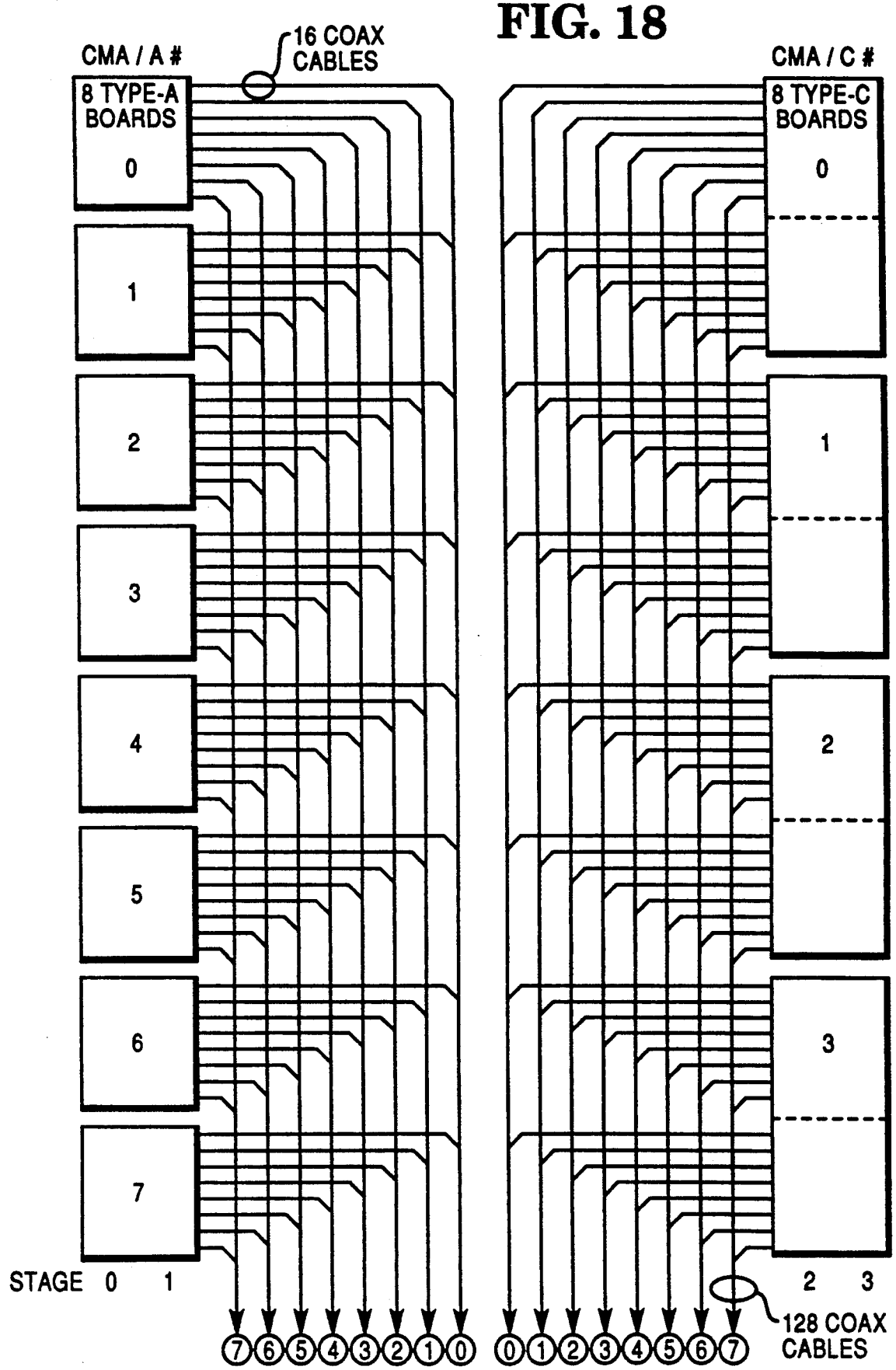
FIG. 18 shows the cabling for the situation in which there are more than 512 network I/O ports in the network.

FIG. 18 shows the cabling for the situation in which there are more than 512 network I/O ports 20 in the network 14. To configure a network 14 with more than 512 PMs 12 requires the use of a Type-C board 174 in place of the Type-B board 172 and a change in the way the cabling is implemented. Twelve CMAs are present comprising eight CMA/As 182 that are fully populated with eight Type-A boards 170 (and two Type-D boards 176), and four CMA/Cs 186 with two groups that are populated with four Type-C boards 174. These CMAs are housed in two docked cabinets (not shown). Functionally, it is necessary to use the cable harness assembly 178 of FIG. 14 with the Type-C boards 174. A total of eight such cable harness assemblies are required to connect the CMA/As 182 with the CMA/Cs 186 in FIG. 17. For each set of four Type-C boards 174, i.e., one group, removed from a CMA/C 186, the corresponding cable harness assembly 178 is also eliminated. The main reason to depopulate would be to lower the cost of the network 14. Depopulating also reduces cabling.

The Universal Wiring Pattern is embodied by the cable harness assembly 178. To cross-connect the docked cabinets each cable harness assembly 178 is cut in the middle and attached to connectors 18. This allows the cabinets to be connected via cable bundles 190 that contain parallel wires. The constraints on the way in which the cable bundles 190 are connected between cabinets are similar to the intra-cabinet cabling discussed earlier. The two rules are: (1) two ends of the same cable bundle 190 shall not be plugged into the same connector types; and (2) the cable bundles 190 shall be uniformly distributed among all docked cabinets. As a result, there is tremendous flexibility in the configurations and in the connections of the network 14.

Figure 19:
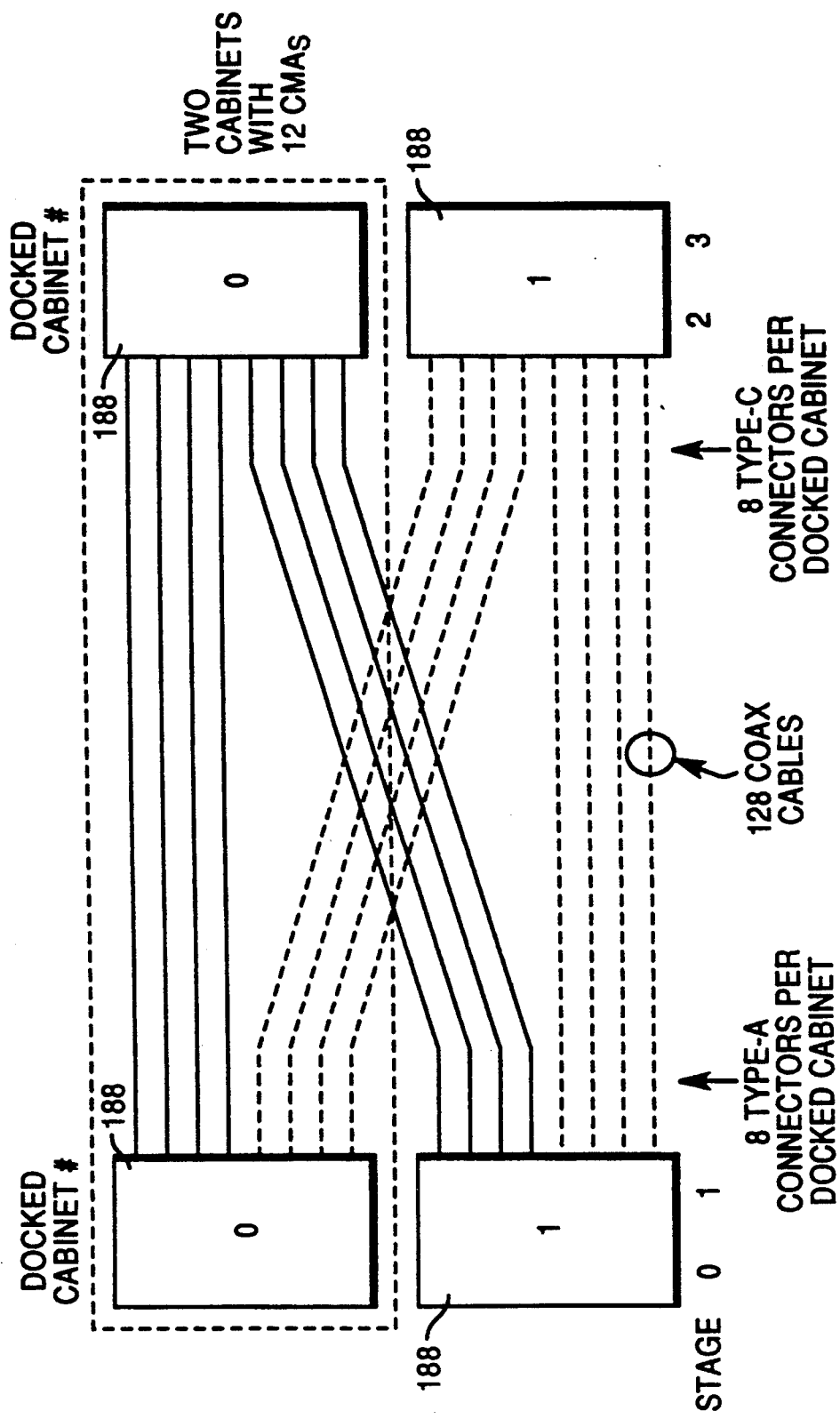
FIG. 19 shows the cabling for the situation in which there are 1024 network I/O ports in the network.

FIG. 19 shows the cabling for the situation in which there are 1024 network I/O ports 20 in the network 14. Each pair of docked cabinets 188 contains twelve CMAs. Eight CMA/As 182 are fully populated with eight Type-A boards 170 (and two Type-D boards 176) each, and four CMA/Cs 186 with two groups are populated with four Type-C boards 174. In this case, to balance the bandwidth, four cable bundles 190 each connect the cabinets 188 to themselves and another eight cables cross-connect into each other. The configuration shown is cabled for 100% of the maximum possible bandwidth. At the 50% level, the cable bundles 190 shown in dashed lines would be removed as well as all Type-C boards 174 in the lower docked cabinet 188 pair labeled as #1.

Figure 20:
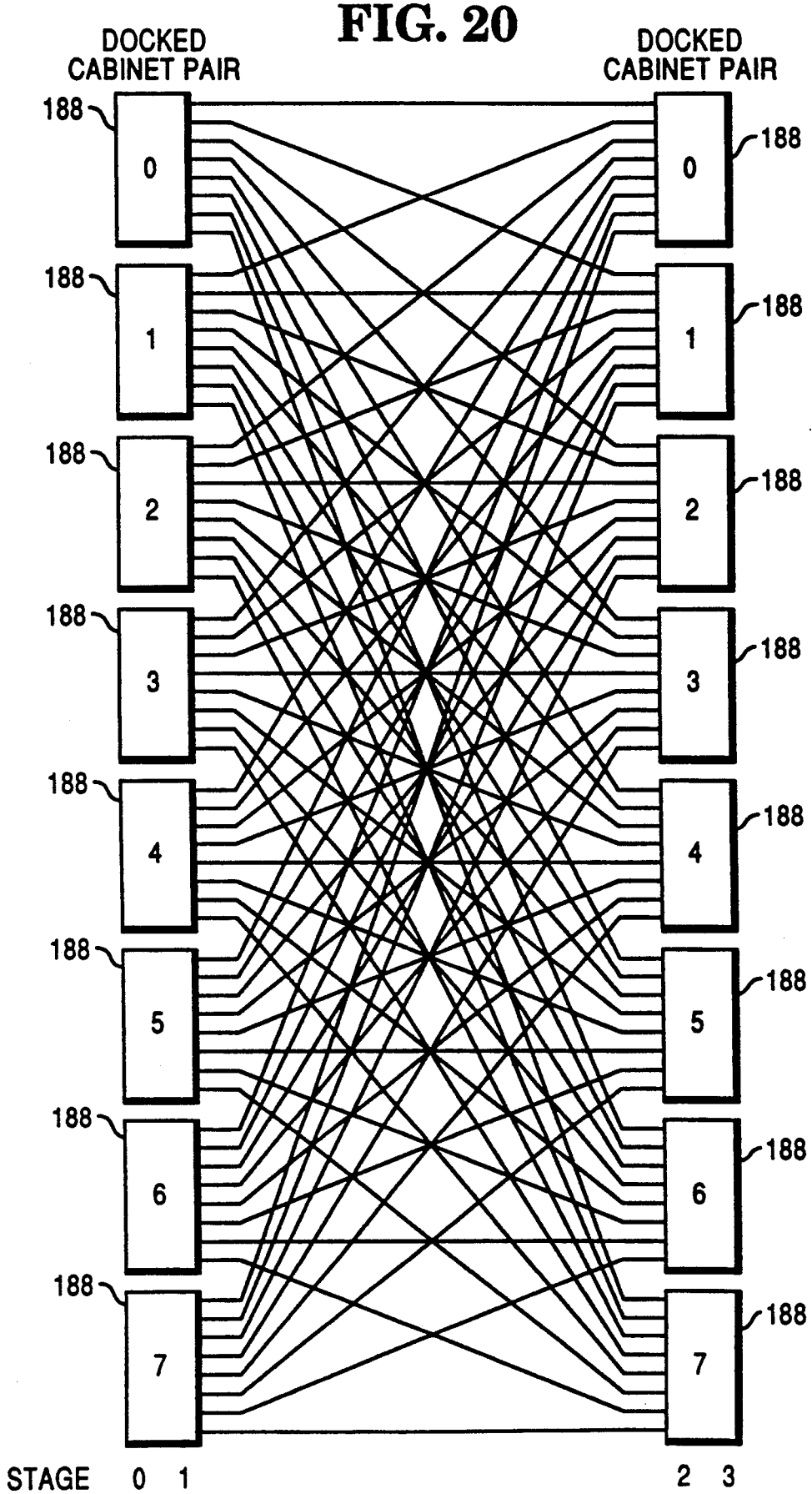
FIG. 20 shows the largest possible configuration of 4096 network I/O ports using eight cabinets to house the network.

FIG. 20 shows the largest possible configuration of 4096 network I/O ports 20 using eight pairs of docked cabinets 188 to house the network 14. A total of 64 cable bundles 190 are needed in this case. The bandwidth can be lowered by removing sets of Type-C boards 174, one docked cabinet 188 pair at a time. For each docked cabinet 188 pair, eight cable bundles 190 are removed.

Notice that the lines representing the cable bundles 190 in FIG. 20 form the Universal Wiring Pattern (UWP). This is because there are 64 copies of the UWP used to connect stage 1 switch nodes 16 to stage 2 switch nodes 16, and the wires that form each cable bundle 190 have been chosen to be from the same location in each of the 64 copies, i.e., it is as though the 64 UWPs were all stacked on top of each other.

Any configuration other than those illustrated can be readily constructed by following the minimal construction rules outlined above. It is understood that the manufacturing, field service, and marketing organizations may wish to impose additional rules for the sake of simplicity and/or minimizing the number of different configurations. Of note, however, is the ability to configure any network 14 size using the smallest possible amount of hardware that gets the job done. In particular, an entry level network 14 can be offered with two depopulated CMA/As 182, which keeps the cost as low as possible.

12. SWITCH NODE ADDRESSING

Referring again to FIG. 4, each 8×8 switch node 16 has a 12 bit chip address register 121 that is used for specifying the switch node 16 location in the network 14. This location, called the chip's address, is defined as:

$$C = \{c_{11}c_{10}c_9c_8c_7c_6c_5c_4c_3c_2c_1c_0\}_2$$

The bit positions are defined in Table IV. At startup, the chip address register 121 is loaded from the DP 140.

The Right/Left bit, $c_{11}$, distinguishes between switch nodes 16 that route traffic to the right from the PM 12 to the bounce-back point 30 in the folded network 14, versus switch nodes 16 that route traffic to the left from the bounce-back point 30 in the folded network 14 to the PM 12. Bit $c_{11}$ is set to $0_2$ for those switch nodes 16 with right arrows, #1 and #3, on Type-A boards 170 and Type-B boards 172 as shown in FIG. 6 and FIG. 7. Bit $c_{11}$ is set to $1_2$ for those switch nodes 16 with left arrows, #2 and #4, on Type-A boards 170 and Type-B boards 172 as shown in FIG. 6 and FIG. 7.

The Stage number, $c_{10}c_9$, is $00_2$ for those switch nodes 16 on Type-A boards 170 that connect to controllers 18. They are under the "Stage 0" label in FIG. 6. Bits $c_{10}c_9$ are $01_2$ for those switch nodes 16 on Type-A boards 170 under the "Stage 1" label in FIG. 6. On the Type-B board 172 shown in FIG. 7, all four of the switch nodes 16 have their $c_{10}c_9$ bits set to $10_2$.

Bits $c_8 \ldots c_0$ determine the switch node 16 Level number in the network 14. This number, appended at the least significant end with a three bit switch node 16 port number, $p_2p_1p_0$, defines the Level of the network I/O port 20 in the network 14, i.e., $c_8 \ldots c_0p_2p_1p_0$.

Bits $c_2c_1c_0$ are derived for every switch node 16 on a Type-A board 170 from its slot location in the CMA/A 182. The locations are encoded in four dedicated pins per slot from the backplane 180. The encoding begins with $0000_2$ in the leftmost board slot (the power board) and ends with $1010_2$ in the right most board slot. The DP 140 translates these physical numbers into the logical three bit number, $c_2c_1c_0$, needed. After translation, the left most Type-A board 170 slot is assigned $000_2$. Each subsequent Type-A board 170 is assigned a number which increases by 1 (skipping over Type-D slots) up to the right most Type-A board 170, which is $111_2$.

Bits $c_3c_2c_1$ are derived for every switch node 16 on a Type-B board 172 from its slot location in the CMA/B 184. The locations are encoded with four dedicated pins per slot from the backplane 180. The encoding begins with $0000_2$ in the left most board slot (the power board) and ends with $1010_2$ in the right most board slot. The DP 140 translates these physical numbers into the logical three bit number, $c_3c_2c_1$, needed. After translation, the left most Type-B board 172 is assigned $000_2$. Each subsequent Type-B board 172 is assigned a number which increases by 1 up to the right most Type-B board 172, which is $111_2$.

Bit $c_0$ is 0 for the upper two switch nodes 16 on a Type-B board 172 and 1 for the lower two switch nodes 16.

For a CMA/A 182, bits $c_5c_4c_3$ are derived from the CMA's location in the cabinet 188. For a CMA/B 184 or CMA/C 186, bits $c_5c_4$ are derived from the CMA's location in the cabinet 188. They are the same for all switch nodes 16 on every board in the same CMA. The DP 140 derives these bits as described in the dynamic configuration procedure, described hereinafter, and stores them into each switch node 16 to which it is connected.

Bits $c_8c_7c_6$ are derived from the most significant three bits of the four least significant bits of the cabinet 188 number. One docked cabinet 188 pair has an even cabinet 188 number and the other in the pair has the next larger number. The cabinet 188 number is determined during the dynamic configuration procedure by the DP 140 in the power subsystem, i.e., the gateway DP (not shown). This number is distributed to all DPs 140 in the cabinet 188 by the LAN 144 interconnecting the DPs 140. Each DP 140 stores the number into each switch node 16 on a board to which it is connected. For networks 14 with no more than 512 network I/O ports 20, in the case of a local area network 14 failure, these bits are set to 0. For networks 14 with no more than 512 network I/O ports 20, these bits are the same in every switch node 16 in the network 14. For networks 14 with more than 512 network I/O ports 20, the cabinets 188 containing one network 14 are numbered sequentially, starting with an even number.

13. AUTOMATIC PROCESSOR ID ASSIGNMENT

Automatic processor identification assignment consists of the ability to plug a PM 12 into any available network I/O port 20 and have it receive a unique port identifier from the network 14. Thus, each PM 12 in the network 14 can determine its address in either network 14 by simply asking the network 14. This means that it does not matter where any given PM 12 is plugged into the network 14. This greatly simplifies network 14 installation.

The PM's address within a given network 14 is determined by the Level number of the network I/O port 20 to which it is connected in that network 14. The PM 12 determines it address in each network 14 by transmitting a Send-Port-Addr command to the network 14. The switch node 16 that receive this command supplies the network I/O port 20 address via the Escape reply with a Port-Addr-Is-Key and the address itself.

Bits $c_8 \ldots c_0$ determine the Level number of the switch node 16 in the network 14. This number, appended at the low order end with a three bit switch node 16 port number, $p_2p_1p_0$, defines the Level of the network I/O port 20: $c_8 \ldots c_0p_2p_1p_0$. This is the address that is supplied to a PM 12 when it asks the network 14 where it is attached.

14. DYNAMIC CONFIGURATION

Figure 21:
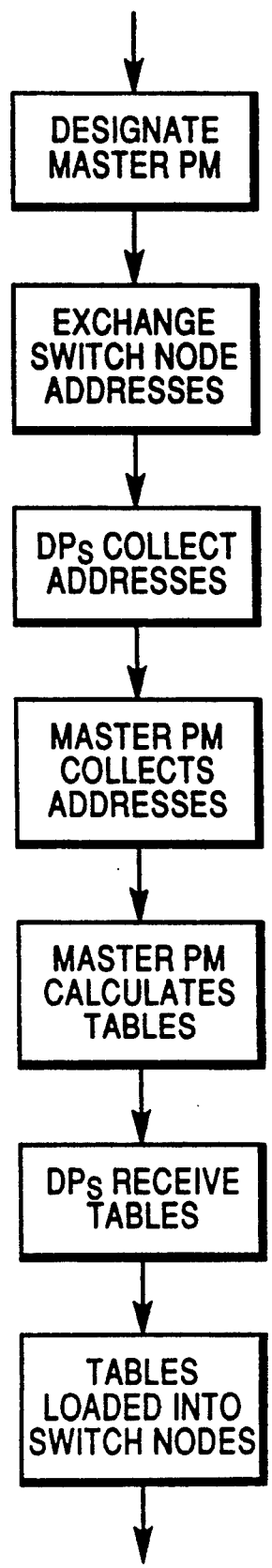
FIG. 21 is a flow chart describing the steps required for configuring the network.

FIG. 21 is a flow chart describing the steps required for configuring the network 14. Since cables connecting the boards in the network 14 can be configured in relatively arbitrary ways, the network 14 automatically determines how it is cabled and uses that configuration to establish the path between PMs 12. A protocol between switch nodes 16 permits one switch node 16 to ask another switch node 16 at the other end of a back channel 34 to transmit its chip address back via the forward channel 32. These chip addresses are used to build the tag mapping tables 108, which ensure that routing tags can be correctly interpreted to establish communication paths between PMs 12.

After a PM 12 is powered up, it performs a self test procedure to test the links of the network 14. It then transmits a Send-Port-Addr command to the network 14 and waits for an Escape reply with a Port-Addr-Is key on the back channel 34 which contains the 12-bit address for the PM 12 on the network 14.

If the state of the network 14 is "configuring", the PM 12 volunteers to perform the configuration task. A local DP 140, i.e., a DP 140 on the Type-A board 170 connected to the PM 12, signals whether the PM 12 has been accepted or rejected as the Master PM 12 (only one PM 12 per network 14 may be designated as a Master PM 12). If it is rejected, the PM 12 disconnects from the DP 140 and waits to be notified that the configuration is complete. If it is accepted, the Master PM 12 configures the network 14.

The configuration steps determine the topology of the network 14 and account for any switch nodes 16 or links that fail a self-test. The Master PM 12 constructs the tag mapping tables 108 that account for the topology. The network 14 is available for use once these tables 108 are reloaded in the switch nodes 16.

At startup, each DP 140 fills in the chip address register 121 of each switch node 16 on its board, i.e., bits $c_{11}$-$c_0$. All switch nodes 16, except switch nodes 16 in the "right" stage 0 connected to the controllers 18, activate their forward channel 32 carriers after the DP 140 has enabled all output ports of the switch node 16 by setting enable bits in each output status register 92. The DP 140 also enables the input ports of the switch node 16 by setting enable bits in each input status register 66.

Each input port of a switch node 16 is instructed by the DP 140 to test its back channel 34 by transmitting an Escape Reply with a Send-Chip-Addr key. Each output port that receives the Send-Chip-Addr key on its back channel 34 reads its chip address register 121 and sends the Chip-Addr-Is command out the forward channel 32. Receipt of the Chip-Addr-Is command by each input port on every switch node 16 that requested the chip address constitutes a test of all forward and back channel links.

When the Chip-Addr-Is command is received by an input port of a switch node 16, the DP 140 stores the address in RAM 142. The DP 140 builds a table with eight entries per switch node 16 that identifies where each input port is connected. The DP 140 reads the input status register 66 of each input port on each switch node 16 and constructs an eight bit input enable vector for each switch node 16 that indicates which ports are receiving a carrier. The DP 140 reads the output status register 92 of each output port on each switch node 16 and constructs an eight bit output enable vector for each switch node 16 that indicates which ports are receiving a carrier. Collectively, this information, and the type and location of faults detected by DPs 140, represents the raw topology of the network 14. The raw topology information is redundant by virtue of the fact that the network 14 is symmetric and folded.

The Master PM 12 gets the raw topology information from the DPs 140 via the LAN 144 interconnecting the network DPs 140 and the local DP 140 of the Master PM 12. A local DP 140 is that DP 140 on a Type-A board 170 which is connected to a stage 0 switch node 16 that is directly connected to the controller 18 of a PM 12. The Master PM 12 sends the network 14 a DP Connect command and the local DP 140 returns the raw topology information associated with its local switch nodes 16 to the Master PM 12. The local DP 140 then requests that every other DP 140 in the network 14 transmit its raw topology information, so it can be passed to the Master PM 12.

Once the Master PM 12 has received all the raw topology information, it calculates the tag mapping tables 108, multicast port select vectors, and input and output enable vectors for each switch node 16 in the network 14. The calculation includes a consistency check on the data and a validation check to make sure no cabling rules have been violated. The information for the tag mapping tables 108 for each of the switch nodes 16 is derived from the chip addresses, either of the switch node 16 in the next stage connected directly thereto, or of the switch node 16 in the following stage. The tag mapping table 108 needs only $\log_2 b$ bits per entry rather than $\log_2 N$ bits, e.g., 3 bits versus 12 bits.

If any faults are reported, the calculations simulate the removal of the faulty component by deleting the appropriate entries in the raw topology information. For example, if a switch node 16 has failed, up to 16 links may be deleted. The output enable vectors are set to disable output ports where the links have been removed so that the load balancing logic will not select those ports. The tag mapping tables 108 also must not point to a disabled output port or an error will be reported if a routing tag references the output port. Input ports are disabled so that no spurious errors will be reported, i.e., the output ports they are connected to are disabled and/or faulty, so they are either sending nothing, which is an error, or garbage, which has already been diagnosed.

If the failure is in a non-local switch node 16 or link (one not directly connected to a controller 18), the redundant nature of the network 14 guarantees that the tag mapping tables 108, multicast port select vectors, and input and output enable vectors can be computed with no loss of functionality, although there is a slight decrease in the bandwidth of the network 14. It may not be possible to preserve functionality if there are multiple failures, depending upon the specific combination of failures.

If there is one or more failures of local switch nodes 16 or links, the network 14 can be configured to be functional for point-to-point communications only if the controllers 18 connected to the faulty components are disabled. The network 14 cannot be used for broadcast or multicast. The other network 14 is used for that purpose.

When the calculation of the tag mapping tables 108, multicast port select vectors, and input and output enable vectors is complete, the Master PM 12 re-establishes connection with its local DP 140 and transfers the tag mapping tables 108, multicast port select vectors, and input and output enable vectors in packages grouped by switch node 16. As the local DP 140 receives each switch node 16 package, it transmits the package to the appropriate DP 140. The process continues until all DPs 140 have received the packages for every switch node 16.

When each DP 140 receives the package, it selects the correct switch node 16 and writes eight tag mapping tables 108 into the output port select 58 in each IPL 36 of the switch node 16. The DP 140 then enables and disables the eight input ports of the switch node 16 according to the selected eight bit input enable vector, one bit per input status register 108; the DP 140 also enables and disables the eight output ports of the switch node 16 according to the selected eight bit output enable vector, one bit per output status register 108. The multicast port select register 130 of the switch node 16 is also loaded with the correct multicast port select vector. Upon completion of this task for each switch node 16, the DP 140 signals the local DP 140 with an acknowledgement.

When the local DP 140 determines that all switch nodes 16 have been configured, it signals the Master PM 12 that the configuration is complete. The Master PM 12 then signals the local DP 140 to change the state of the network 14 from "configuring" to "ready." The local DP 140 broadcasts the state change to all other DPs 140 via the LAN 144 connecting the DPs 140. The network 14 is then ready for use.

Any PMs 12 that query the local DP 140 for the current state of the network 14 will find out that it is ready for use. At this point, all active PMs 12 execute a distributed algorithm to build their processor routing tables. These routing tables comprise the list of active PMs 12 and their addresses in the network 14.

A PM 12 that has just initialized and determines that either or both networks 14 are in the ready state, notifies the other PMs 12 of its presence in the network 14. The PM 12 multicasts its network I/O port 20 address on each network 14 to all other PMs 12. By merging replies using an addition mode, the PM 12 knows how many PMs 12 have received the multicast. Each receiving PM 12 adds the network I/O port 20 address to its table of PM 12 locations on the indicated network 14.

A flag is set to note if either network 14 is to be used for point-to-point traffic only. In such a case, some PMs 12 are not included on the list for that network 14, but are on the list of the network 14 capable of performing multicasts.

Each PM 12 transmits a point-to-point message to the sending PM 12 of the multicast indicating its I/O port address on each network 14. The sending PM 12 can then build its PM 12 routing tables from the point-to-point addresses received. Thus, an existing network 14 can be expanded online.

Figure 22A:
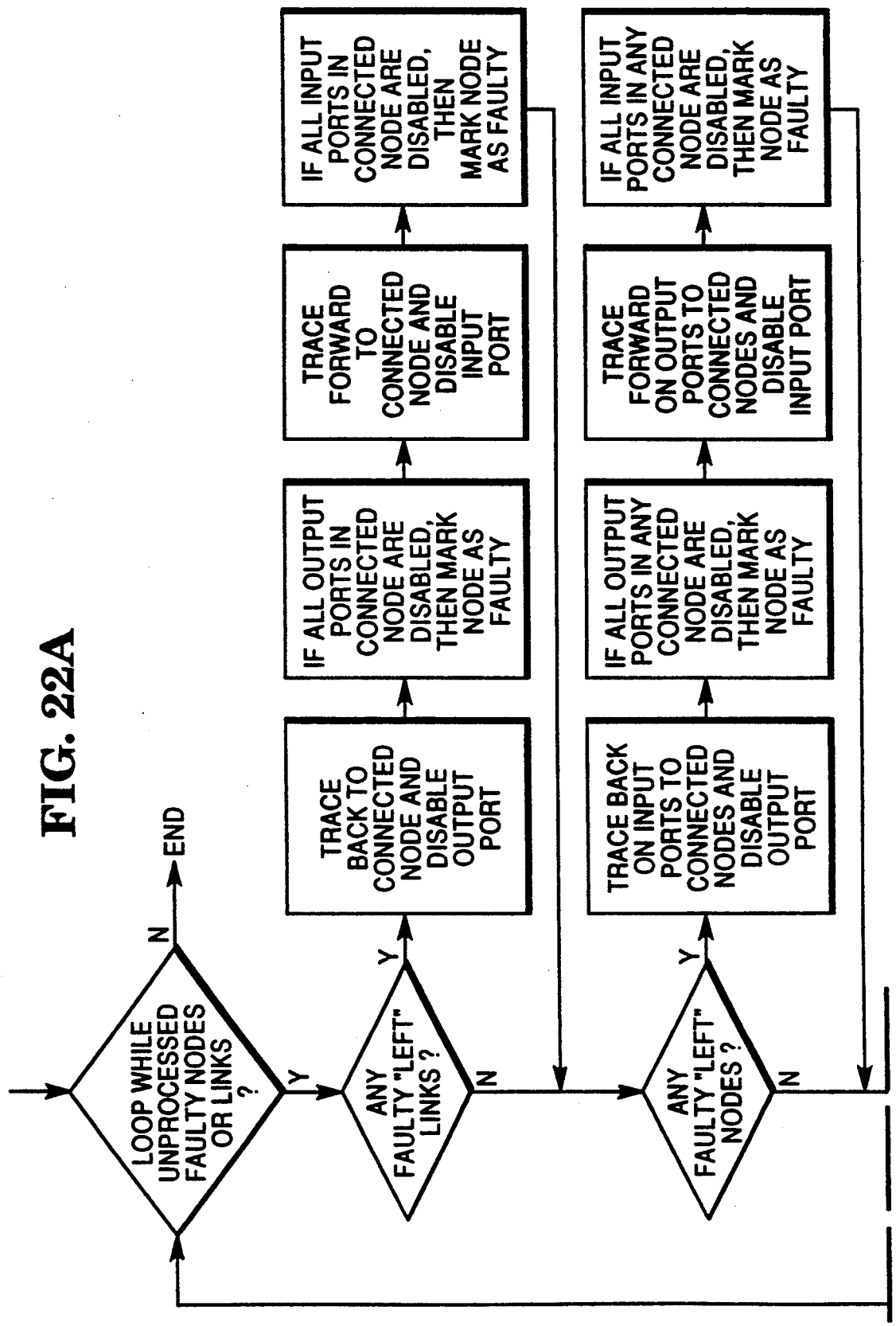
FIGS. 22(a) and 22(b) are flow charts describing the steps required for reconfiguring the network when a fault occurs.
Figure 22B:
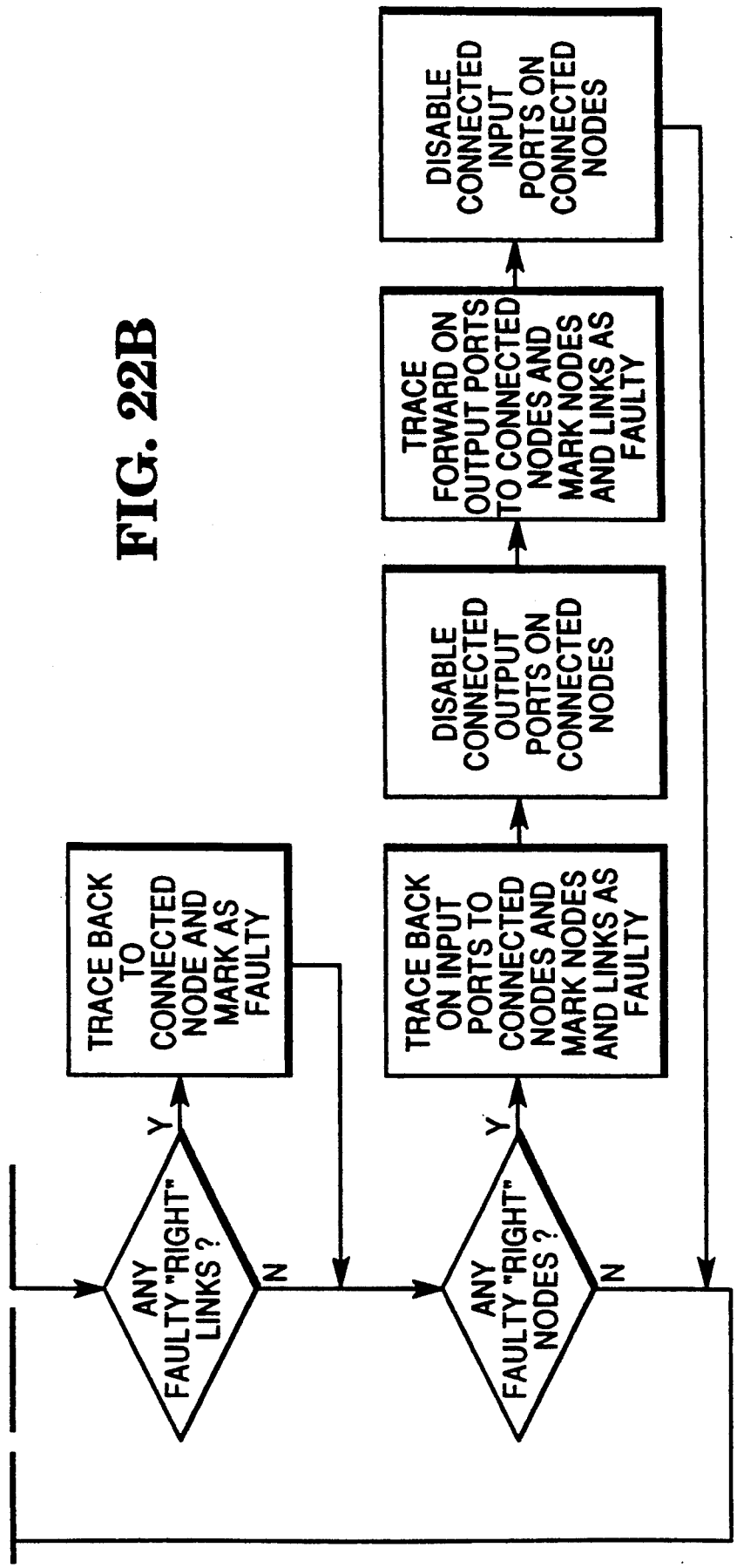

FIG. 22 is a flow chart describing the steps required for reconfiguring the network 14 when a fault occurs therein. If a fault is detected, the DP 140 can request that the network 14 be reconfigured so that the fault can be isolated. Communications in the faulty network 14 are interrupted during reconfiguration. However, communications within the system 10 are not interrupted because there are two networks 14. The controllers 18 in each PM 12 automatically switch over to the operational network 14 until the reconfiguration is complete, and then return to load balancing traffic between the two networks 14.

For the most part, the reconfiguration steps are similar to the steps performed at network 14 startup. What is different is that the configuring Master PM 12 identifies the fault location, via information received from the switch nodes 16 and DPs 140.

In FIG. 22, a continuous loop executes so long as there are any unprocessed faulty links or nodes. Within the loop, faulty links and switch nodes 16 are processed according to their location on either side of the bounceback point 30.

For a faulty "left" link, i.e., a fault on a link between switch nodes 16 in the left half of an unfolded network 14, including links connected to the output of the last stage, then the Master PM 12 traces back on the link and disables the output port of the connected switch node 16. If this results in all the output ports on the connected switch node 16 being disabled, then the connected switch node 16 is marked as being "faulty." The Master PM 12 also traces forward on the link and disables the input port of the connected switch node 16. If this results in all the input ports on the connected switch node 16 being disabled, then the connected switch node 16 is marked as being "faulty."

For a faulty "left" switch node 16, i.e., a fault in a switch node 16 in the left half of an unfolded network 14, then the Master PM 12 traces back on all input ports to the connected switch nodes 16 and disables the output port of each connected switch node 16. If this results in all the output ports on a connected switch node 16 being disabled, then the connected switch node 16 is marked as being "faulty." The Master PM 12 also traces forward on all the output ports to the connected switch nodes 16 and disables the input port of each connected switch node 16. If this results in all the input ports on a connected switch node 16 being disabled, then the connected switch node 16 is marked as being "faulty."

For a faulty "right" link, i.e., a fault on a link between switch nodes 16 in the right half of an unfolded network 14, then the Master PM 12 traces back on the link and marks the connected switch node 16 as being faulty.

For a faulty "right" switch node 16, i.e., a fault in a switch node 16 in the right half of an unfolded network 14, then the Master PM 12 traces back on all input ports to the connected switch nodes 16, marks the connected switch nodes 16 and links as being "faulty," and disables the output port of each connected switch node 16. The Master PM 12 also traces forward on all output ports to the connected switch nodes 16, marks the connected switch nodes 16 as being "faulty," and disables the input port of each connected switch node 16.

In addition to the above steps, attached controllers 18 are disabled if the faulty link or switch node 16 is in stage 0. The PMs 12 associated with the disabled controllers 18 use the redundant network 14. All other PMs 12 are notified that the affected PMs 12 can be reached via the redundant network 14 only. In all cases, the tag mapping tables 108 are updated so they do not point to any output port that has been disabled.

In the general case, where a MIN is constructed from $b \times b$ switch nodes 16 with n stages and $b^n = N$ I/O ports 20, the loss in bandwidth is a function of which stage, i, the error occurred. The following equations compute this:

| | | |
|---|---|---|
| Left Half - | Link loss | $= 1/b^n = b^{-n}$ |
| | - Switch node loss | $= b/b^n = b^{-n+1}$ |
| Right Half - | Link at the switch node output in stage i | $= b^{n-i}/b^n = b^{-i}$ |
| | - Switch node loss in in stage i | $= b^{n-1}/b^n = b^{-i}$ |

For example, in a network 14 of 512 I/O ports 20, there are three stages (n=3) constructed from 8×8 switch nodes 16 (b=8). If a switch node 16 in the right half of the unfolded network 14 in stage 1 (the second stage) fails, then ⅛th or 12.5% of the total bandwidth will be lost. If there were a loss in stage 0, then 100% of the bandwidth is considered lost because eight ports have become inaccessible and the algorithm would not be able to guarantee it can route all messages correctly. Hence, those ports and the attached controllers 18 are disabled. Doing so restores 100% bandwidth to the remaining healthy, but smaller, network 14.

If any part of a link between a PM 12 and the network 14 fails, the PM 12 uses only the active network 14. Each PM 12 in the network 14 is notified whenever a given PM 12 is unavailable on a given network 14. In the event that both links connected to a PM 12 fail, the PM 12 is dropped from the network 14. When a switch node 16 detects a carrier loss from a controller 18, it interrupts its DP 140 which determines the network I/O port 20 involved, and broadcasts the network I/O port 20 to the other DPs 140 via the LAN 144. The other DPs 140 notify their PMs 12 that the PM 12 at the network I/O port 20 given is no longer part of the network 14. The receiving PMs 12 delete the entry in their processor routing tables corresponding to the network I/O port 20. All PMs 12 switch to using the other network 14 for multicasts.

15. SIMPLIFIED BACKPLANE ROUTING

Ordinarily, the layout of the network 14 backplane 180 would be very complex due to cross-connecting 128 twelve bit channels, i.e., two universal wiring patterns (UWP) between stages of switch nodes 16. The cross-connect wiring needed to couple one stage of the network 14 to the next consists of 64 paths of 24 traces each for a total of 1,536 traces. Each is a point-to-point connection, not a bus. These traces are located in a backplane 180 which creates a substantial layout problem.

However, due to the existence of the tag mapping tables 108 and the method of dynamic reconfiguration, it is possible to remap the traces, so that the connections are horizontal only. The tag mapping tables 108 can be used to compensate for traces that need to be moved to reduce congestion on the backplane 180.

16. CONNECTION PROTOCOL

The connection protocol between PMs 12 uses a handshaking scheme that sends commands and data on the parallel 9-bit forward channel 32, and communicates replies on the serial 1-bit back channel 34. A connect command, which contains a 16-bit routing tag specifying the destination, is transmitted from a sending controller 18 to the network 14 on the forward channel 32. The connect command works its way from switch node 16 to switch node 16 until it reaches a receiving controller 18.

Within each switch node 16, the IPL 36 uses a DSTRBI signal 40 generated by the TAXI transceiver 26 to strobe a data item received on the forward channel 32 input into an input FIFO 46. A data item may be clocked into the input FIFO 46 at every clock cycle. The input FIFO 46 synchronizes data items with an internal clock of the switch node. The output of the input FIFO 46 is examined by a command decode 52, which in conjunction with an input state control 56, determines where the data is to be latched, if anywhere.

When a connect command is received, the switch node 16 stores the connect command in a command-/data latch 48 and the routing tag in a tag latch 50. The four most significant bits of the routing tag specifies one of six methods by which the connect command and thus the path is routed: monocast (i.e., point-to-point) nonblocking, monocast blocking, monocast blocking without load balancing, multicast, and DP connect. The other bits of the routing tag are used either to steer the message to the proper PM 12 for monocast connect commands, or to select a "bounce-back point" for multicast connect commands.

The routing tag is decoded by the output port select 58 to produce an eight bit vector which identifies the desired output port in the case of a point-to-point connect command, or multiple ports in the case of a multicast connect command. In the case of a multicast connect command, a multicast port select register 130 is examined by the output port select 58 to generate directly the output port selection vector.

For monocast connect commands, the output port select 58 contains a tag mapping table 108 for mapping the routing tag to the correct output port based on the way the network 14 boards are cabled. The tag mapping table 108 is an 8×3-bit memory array used for translating the routing tag to an output port selection. The tag mapping table 108 provides a logical to physical translation wherein three bits from the routing tag are fed to the tag mapping table 108 and three bits are output therefrom identifying the particular output port of the switch node 16 that should be used. The bits from the routing tag address an entry in the tag mapping table 108, the contents of which identify the correct output port to receive the command. In the preferred embodiment, the bits from the routing tag comprise $c_0-c_2$ for stage 0, $c_3-c_5$ for stage 1, $c_6-c_8$ for stage 2, and $c_9-c_{11}$ for stage 3. (The stage is identified via a chip address register 121.)

Each bit of the vector generated by the output port select 58, along with control signals, is connected to an 8-input arbiter 98 in the OPL 38. The 8-input arbiter 98 receives signals from each IPL 36, selects an active IPL 36, and outputs the input port number selected. The input port number is used by a path select 100 to connect the IPL 36 to an output latch 104 in the OPL 38 via the output mux 102.

Within the arbiter 98, multicast connect commands have priority over point-to-point connect commands. Note, however, that no circuit either pending or currently established is ever preempted by a multicast. In the case of point-to-point connect commands, the arbiter 98 selects an active IPL 36 in a round-robin fashion. The 8-input arbiter 98 only changes the input port selected after a disconnect command has been received.

The output state control 96 decodes the input port number output from the arbiter 98 and sends an enable signal to a feedback select 62 in the associated IPL 36. The feedback select 62 compares all incoming enables (one from each OPL 38) to the original bit vector from the output port select 58 for an exact match. When an exact match is detected, the input state control 56 is notified that the connect command currently stored in the command/data and tag latches 48 and 50 has been selected for connection.

The input state control 56 activates an acknowledgment signal that is distributed by the output port select 58 to each output port selected. The acknowledgement signal confirms that all output ports needed are available and therefore each port can proceed to transmit the stored connect command to the next stage switch node 16. Transmission is enabled by setting the output mux 102 to select the output of the path select 100 and activating the clock to the output latch 104.

Once the circuit has been established through all switch nodes 16, the receiving controller 18 acknowledges receipt of a connect command by sending "idle replies" on the back channel 34 to the sending controller 18. When the sending controller 18 receives the first idle reply, the circuit is complete.

However, before the back channel 34 can transmit any replies, the IPL 36 in a switch node 16 connected to the receiving controller 18 changes the status of the back channel 34 from "closed" to "open." A closed back channel 34 continuously transmits null bits; an open back channel 34 continuously transmits idle replies (when there is no other reply to transmit). The IPL 36 opens the back channel 34 with a start pattern comprising the bits $110_2$, which allows single bit error detection. Immediately following the start pattern, the receiving controller 18 begins transmitting idle replies.

Within each switch node 16, the OPL 38 uses a BSTRBI signal 82 generated by the TAXI transceiver 26 to strobe a data item received on the back channel 34 input into a receive FIFO 112. A data item may be clocked into the receive FIFO 112 at every clock cycle. The receive FIFO 112 is five bits deep and synchronizes data items with the internal clock of the switch node 16. The OPL 38 removes a data item from the receive FIFO 112 at every clock cycle as well. A reply decode 110 decodes the bits from the receive FIFO 112. Nulls or start patterns are discarded; replies are passed intact to a back channel FIFO 114.

The back channel FIFO 114 is capable of storing the longest single reply. A long reply begins with a four bit reply code, a first parity bit covering the reply code, an eight bit key field, a second parity bit covering all previous bits, the first 8 bits of a 16-bit data field, a third parity bit covering all previous bits, the second 8 bits of the 16-bit data field, and a fourth parity bit the covers the entire reply. If the back channel FIFO 114 is full, the reply decode 110 continues to decode incoming replies, but discards short replies, e.g., the idle reply.

The input state control 56 sets the back channel output mux 74 to select the output of the back channel FIFO 114 for connection to the back channel 34 output. The IPL 36 shifts out a new back channel 34 bit whenever a BSHFTI signal 76 is strobed. The BSHFTI signal 76 is connected to the BSTRBO signal 78 from the switch node 16 connected to the input port.

After receiving the initial idle replies in the back channel 34, the sending controller 18 may begin transmitting other commands and messages to the receiving controller 18. When transmitting messages to a receiving controller 18, the sending controller 18 transmits a message header and a checksum through the circuit. The header command contains information that allows the receiving controller 18 to determine what the sending controller 18 expects from it, e.g., the allocation of space to receive a data segment, the reporting of a status condition, etc. The checksum command is used by the controllers 18 for error detection and correction. If a circuit is currently active, the switch nodes 16 pass it on as though it were data. If a circuit is not currently active, the command decode 52 sets a command error flag in the input status register 66. The receiving controller 18 acknowledges receipt of the header and its checksum by responding with a reply on the back channel 34 consistent with the instructions in the header.

A header with data transmission is similar to the header-only transmission with the exception that an extra acknowledgement is included. An ACK (acknowledge) reply is transmitted by the receiving controller 18 after the receipt of the last header data item or header checksum. Upon receiving the ACK reply from the receiving controller 18, the sending controller 18 proceeds to send the data. A disconnect success command is not sent by the sending controller 18 until the ACK reply is received from the receiving controller 18.

Whenever there are no other commands or data to be sent, the sending controller 18 transmits idle commands on the forward channel 32 to the receiving controller 18, and the receiving controller 18 returns idle replies on the back channel 34 to the sending controller 18.

17. DISCONNECTION PROTOCOL

When positive replies are received and the sending controller 18 has nothing further to be done, it transmits a success command that indicates the circuit is to be disconnected. For example, after a data block has been sent, the sending controller 18 is required to wait until it has received idle replies from the receiving controller 18 before sending a disconnect (success) command (if the idle replies were already received while the sending controller 18 was in the process of transmitting the data block, then it does not have to wait).

If any replies on the back channel 34 are negative, a failure command is transmitted by the sending controller 18, which causes the circuit to be disconnected. The failure command also causes the receiving controller 18 to abort the work associated with the communication session.

Upon receipt of the success or failure command, the input state control 56 of each switch node 16 goes into a "disconnect pending" state and passes the command to the next stage switch node 16. Upon receiving a success or failure command, the receiving controller 18 sends a success or failure reply, and stops transmitting replies on the back channel 34. The switch nodes 16 interpret a success reply as a disconnect reply. However, if an error occurs, e.g., the receiving controller 18 could not validate a previous data block, it may respond with a failure reply, which is interpreted as a disconnect (failure) reply and aborts the disconnect process.

Unlike the connect command which created the circuit, the disconnect (success) reply tears down the circuit from the receiving controller 18 back to the sending controller 18. However, the switch nodes 16 enforce a protocol requiring the disconnect (success) command to propagate forward before the disconnect (success) reply is recognized.

When a disconnect (success) reply arrives on the back channel 34 in a switch node 16, the input state control 56 disables the output port select 58, thus dropping the request to the 8-input arbiter 98 and the connection between IPL 36 and OPL 38. This causes each selected OPL 38 to transmit soft carriers on the forward channel 32 output and frees the 8-input arbiter 98 to select another IPL 36 for service. Simultaneously, the IPL 36 transmits the disconnect (success) reply, followed by nulls, on the back channel 34 output. The disconnect (success) reply is thus propagated out to the next stage switch node 16, where the disconnect reply causes that switch node 16 to do the same thing, and so on until the disconnect (success) reply is propagated back to the sending controller 18.

When the IPL 36 detects soft carriers on the forward channel 32 input, the input state control 56 transitions to a "no circuit" state and becomes ready to participate in another circuit. When the sending controller 18 receives a failure or success reply followed by inactivity on the back channel 34, the circuit is completely disconnected. The sending controller 18 then starts to transmit soft carriers on the forward channel 32 output.

18. MONOCAST LOAD BALANCING

Figure 23:
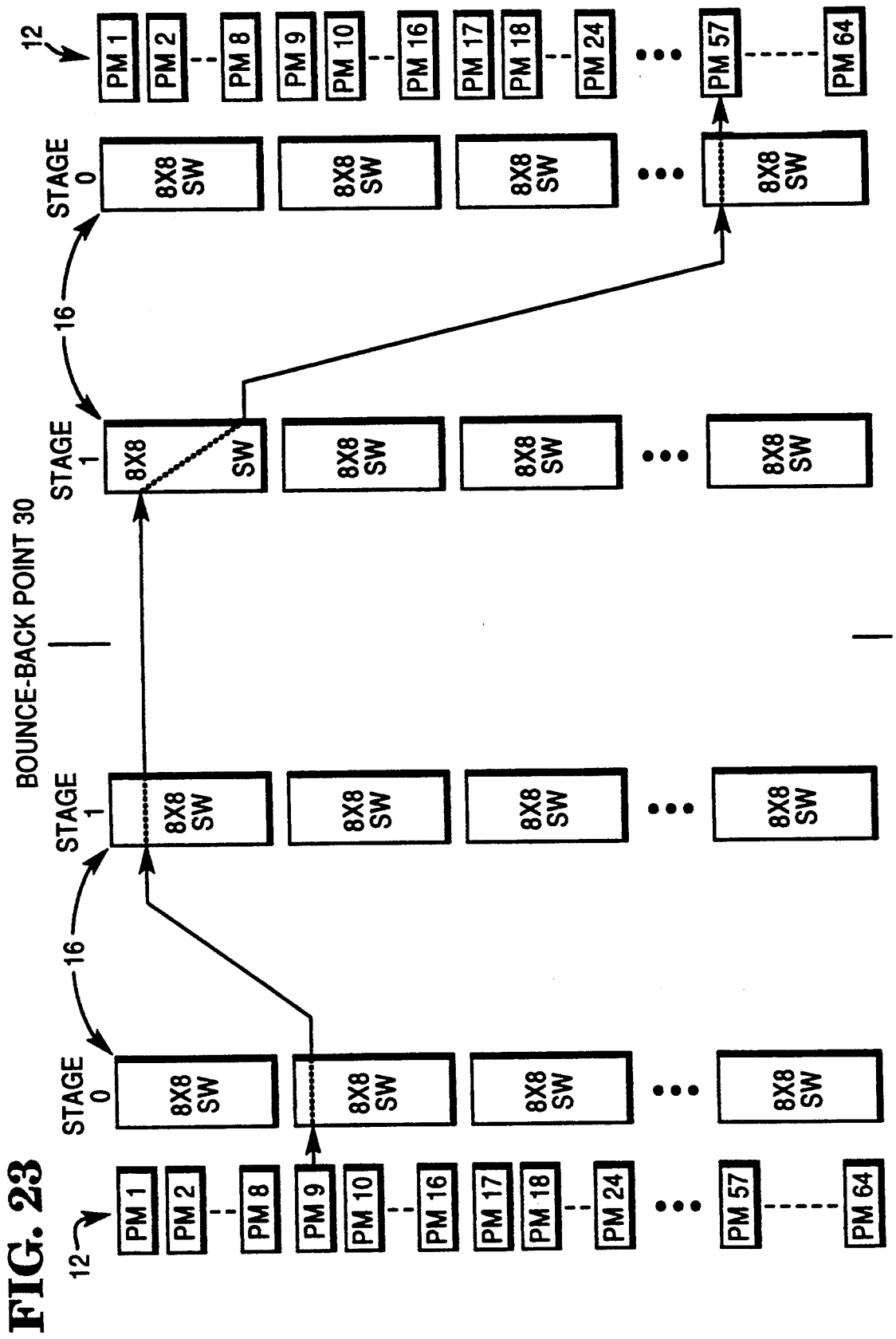
FIG. 23 illustrates the paths traversed through the network by a monocast connect command.

FIG. 23 illustrates the paths traversed through the network 14 by a monocast connect command. Two load balancing methods are used when routing monocast messages upward through the left half stages of the unfolded network 14. (Direct routing to the correct switch node 16 using the tag mapping tables 108 occurs for monocast connect commands in the right half stages of the unfolded network 14). A first method chooses the output port that is directly across from the requesting input port, if this port is available, otherwise the next numerically higher output port (modulo 8) that is available is chosen. A second method looks at the routing tag, and in conjunction with the tag mapping tables 108, routes the connect command to the correct switch node 16 at the next stage. If the desired port is unavailable, the next numerically higher port (modulo 8) that is available is chosen. Both load balancing methods are designed to evenly distribute requesting input ports to available output ports. Thus, message traffic should be evenly distributed in the network 14, especially when the network 14 is not fully configured.

19. MONOCAST NON-BLOCKING

When a routing tag specifies "monocast non-blocking", certain steps are taken if the desired path through the network 14 is unavailable. If no output port is available in a switch node 16 in the left half of the unfolded network 14, or the selected output port is not available in a switch node 16 in the right half of the unfolded network 14, then the circuit is backed-off. Back-off occurs only on monocast connect commands.

The network 14 provides the ability to back-off connections in such a way that a completely different connect command is tried from the sending controller 18 rather than retrying the original connect command in the switch node 16. This reduces contention in the network 14. By trying different connect commands, overall performance is improved in terms of number of connections per second. This also minimizes any "hot spots," wherein heavy traffic in one section of the network 14 impedes the flow in the rest of the network 14 because of a rippling effect. A back-off protocol is realized by the network 14 sending a disconnect reply back to the sending controller 18 on the back channel 34 when an idle reply is expected after the transmission of a connect command on the forward channel 32.

1. MONOCAST BLOCKING

When a routing tag specifies "monocast blocking", certain steps are taken if the desired path through the network 14 is unavailable (back-off is disabled). If no output port is available while load balancing, or if the port selected by the tag mapping table 108 is unavailable, then the switch node 16 waits (i.e., does nothing) until a suitable port becomes available. This effectively gives the connection a higher priority than connections with back-off enabled, since it will get through in the shortest time possible.

2. MONOCAST BLOCKING WITHOUT LOAD BALANCING

When a routing tag specifies "monocast blocking without load balancing", the tag mapping table 108 is used to select a specified outlet port in each switch node 16. The purpose for this type of message is to route a circuit deterministically, and is typically used in conjunction with a test command or test reply for a selected switch node 16. It may also be used by other diagnostic routines.

3. MONOCAST PIPELINE

The network 14 also provides a pipeline protocol wherein the sending controller 18 is allowed to send the data portion of the messages after a predetermined number of clock cycles after it has sent the connect command, i.e., the sending controller 18 need not wait for the receiving controller 18 to "acknowledge" (in the form of back channel 34 idle replies) the connect command. Immediately after the sending controller 18 has transmitted the connect command, it starts to count wait cycles; at a terminal count value, the sending controller 18 begins sending data. The terminal count value is chosen such that if the connect command is not backed off, data transmitted at the terminal count value should catch up with the connect command just after the connect command reaches the receiving controller 18.

On the other hand, if the connect command is backed-off before it reaches the receiving controller 18, the switch node 16 that could not allocate any output port sinks the connect command and any subsequent data, and sends a disconnect (failure) reply followed by nulls out its back channel 34 to the sending controller 18. The disconnect (failure) reply disconnects the partially established circuit as it is propagated back through the intervening switch nodes 16 to the sending controller 18. The sending controller 18 recognizes the disconnect failure reply as indicating that the connection has been backed off. The sending controller 18 then sources soft carriers at its forward channel 32 output, and proceeds to a different connection, queueing the original connection for later retry.

If the receiving controller 18 sees the connect command, then the circuit has not been backed-off by the network 14. At this point, the receiving controller 18 has the option of backing-off the circuit by responding with a failure reply and discarding data bytes, or it may complete the circuit by responding with idle replies on its back channel 34. The (idle or failure) reply is propagated back through the network 14 toward the sending controller 18. A failure reply indicates that the circuit has been backed-off. An idle reply indicates to the sending controller 18 that the circuit is complete.

23. MONOCAST NON-PIPELINE

A non-pipelined protocol is used when back-off is disabled (back-off is disabled for high-priority messages). The non-pipelined protocol for monocast connect commands is similar to the pipelined protocol, with one difference. Instead of counting wait cycles before sending data, the sending controller 18 first waits for the idle replies from the receiving controller 18 to arrive, then it begins transmitting data (the stream of idle replies indicates a circuit has been established). If the sending controller 18 were to transmit data before this, then there is a chance that the data will arrive at a switch node 16 that has not yet forwarded the connect command, which would result in data loss and a network 14 error. At the end of the data block, the sending controller 18 sends a disconnect (success) command (in this case, since it already received idle replies, it can send this command immediately following data). The remainder of the protocol is identical to the pipelined protocol.

24. CONTROLLER SOFTWARE

Software executing in the controller 18, and more specifically in the SPARC ™ microprocessor 56, provides a number of different functions, including configuration of the network 14 to support the flexible cabling, services to the PM 12 for the logical use of the network 14, dynamic load balancing of traffic on multiple networks 14, and automatic fault recovery so that a network 14 may continue operation in a degraded mode, i.e., when a network 14 is not fully connected because a fault has caused at least one PM 12 to be inaccessible and when one or both networks 14 have a single fault that is reconfigured around leaving the network 14 fully connected.

Figure 24:
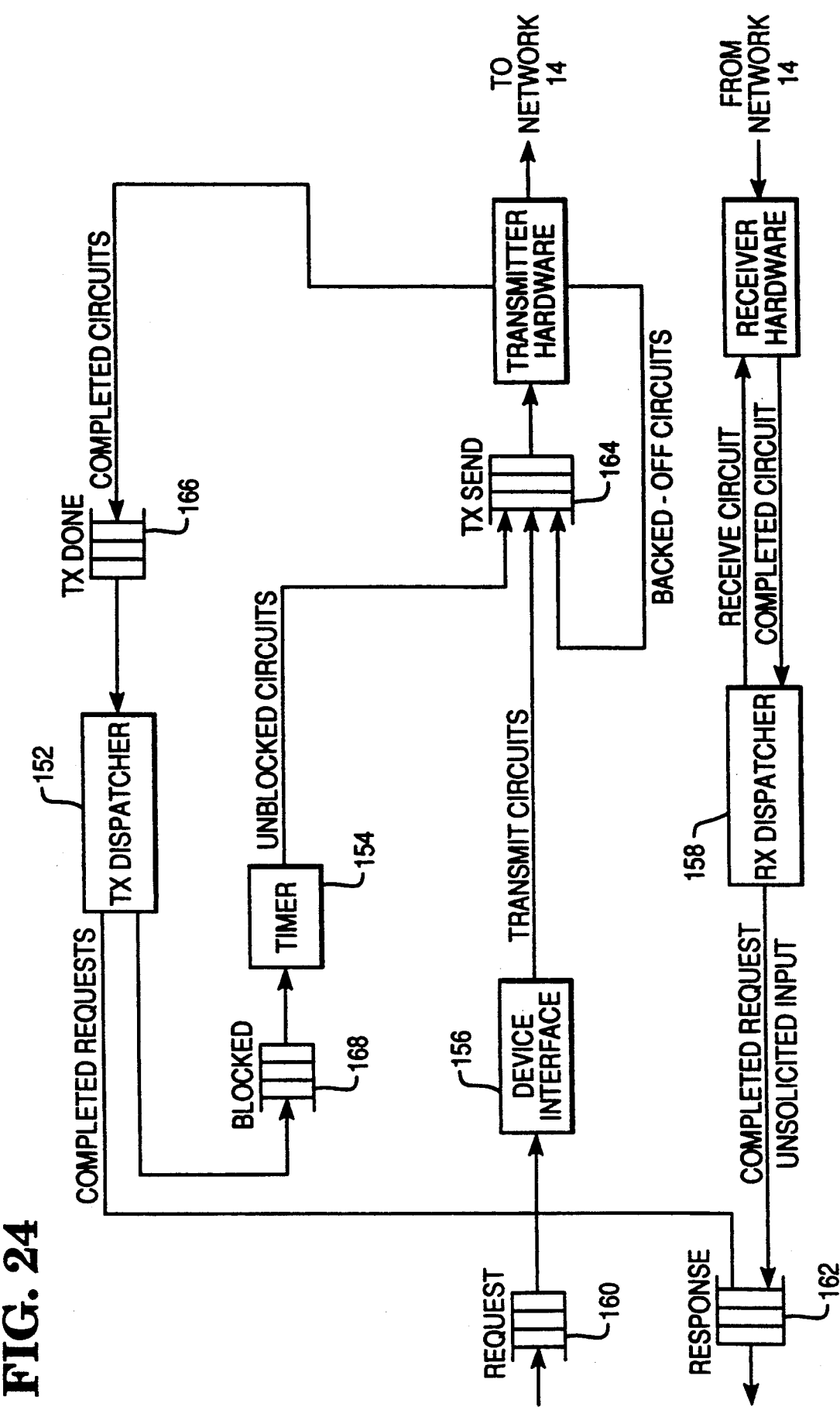
FIG. 24 illustrates the software tasks executed by the network controllers.

The software is based around a set of tasks as shown in FIG. 24, including a device interface 156, a RxDispatcher 158, a TxDispatcher 152, and a timer 154. The device interface 156 handles communications with the operating system. The RxDispatcher 158 handles the building and completion of incoming network 14 connections. The TxDispatcher 152 handles the building and completion of outgoing network 14 connections. The timer 154 handles timeout events, blocking and unblocking of connections, and other time related functions.

Generally, requests from the operating system are processed by the device interface 156 and queued up in the TxSend queue 164 until they are transmitted to the network 14. Circuits blocked physically by the network 14, i.e., backed off circuits, are put in the TxSend queue 164. Circuits blocked logically, e.g., due to congestion in the receiving controller 18, are put on the Blocked queue 168 for retransmission after a time-out. Circuits that are completed are queued on the TxDone queue 166 for completion processing by the TxDispatcher 152. A circuit completion may do many things, but commonly will return a response to the PM 12.

Generally, the RxDispatcher 158 receives the header of any incoming circuit. Once a header is received, the RxDispatcher 158 builds the appropriate channel program to receive the remainder of the circuit. When the circuit is complete, the RxDispatcher 158 may do many things, but will commonly return a request to the PM 12 as unsolicited input or a response to the PM 12 that matches a previously received request.

25. SUPERCLUSTERS

Superclusters are partitions of the network 14 comprising logically independent subsets of PMs 12. Communication within one subset is prevented from interfering with communication in any other subset, yet communication between superclusters is maintained. This is implemented using supercluster partitioning rules.

In a network 14 of a given size, there are many subnetworks 14 that can operate independently of one another. Thus, there is a means to support the supercluster concept. The rules for forming superclusters are relatively flexible and simple. To be precise, however, it is useful to define some notation.

Assume there are N network I/O ports 20 in a network 14 and that $m = \lceil \log_2 N \rceil$, wherein $\lceil \log_2 N \rceil$ indicates a ceiling function providing the smallest integer not less than $\log_2 N$. If $n = \log_8 N$ and N is a power of 8, then $m = 3n$. The binary address of a PM 12 (which is its Level or network I/O port 20 address in the network 14) can then be represented as $Y = \{Y_{m-1} \ldots Y_1 Y_0\}$, $Y_i \in \{0,1\}$, $0 \leq i < m$. The relationship between Y and X, the octal representation, is simply $x_j = \{Y_{3j+2} Y_{3j+1} Y_{3j}\}$, $0 \leq j < n$.

The basic rule is that any group of PMs 12 whose binary addresses agree in p high order bits may form a supercluster of size $2^{m-p}$ and there can be $2^p$ superclusters of that size in the network 14. In the preferred embodiment, however, a supercluster may not be smaller than the switch node 16 size, e.g., 8. The binary address of each supercluster is $\{Y_{m-1} Y_{m-2} \ldots Y_{m-p}\}$, i.e., the number formed by the p high order bits. In superclusters number 0, for example, every PM 12 will have an address of the form $\{0_{m-1} 0_{m-2} \ldots O_{m-p} Y_{m-p-1} \ldots y_1 y_0\}$. Because each supercluster is logically embedded in a subnetwork, the rules can be applied recursively to subdivide superclusters into smaller clusters. Thus, any network 14 can contain a multiplicity of superclusters of different sizes. However, each size is a power of two and none smaller than eight. If these rules are followed, the communications among the PMs 12 in one supercluster will not overlap and/or deadlock with the communications among PMs 12 in any other supercluster.

For networks 14 in which N is not a power of two, the PMs 12 are equally allocated to the address blocks that are a power of two in size with no address block smaller than the switch node size. This is controlled by where a given PM 12 is plugged into the network 14. For example, if there are 50 PMs 12 and they are to be split into two superclusters of 25 PMs 12 each, the first group should be plugged into the network 14 where the decimal addresses range from 0 to 31 and the second group where the decimal addresses range from 32 to 63.

In general, a list is made of the sizes desired and the smallest power of two not less than each size (or eight whichever is larger) is computed. To compute the size of the network 14 needed, the powers of two just computed are summed and the smallest power of two not less than that sum is calculated. Next, the network 14 is divided in half recursively as needed until there is a section which is the size of each power of two that was calculated for each supercluster. The PMs 12 in each supercluster are assigned to addresses in the corresponding range. If this is done, each PM 12 in a cluster meets the addressing constraints.

As an example, assume a network 14 is to be configured with five superclusters of sizes 75, 25, 30, 20, and 10 PMs 12. The corresponding powers of two are 128, 32, 32, 32, and 16. The sum of these is 240, so a network 14 of size 256 is needed. This is divided into the address ranges 0-127 and 128-255. The group of 75 PMs 12 is assigned anywhere in the range 128-255. The remaining free addresses are each split in half again to yield groups 0-63 and 64-127. These are too big, so they are both split yielding 0-31, 32-63, 64-95, and 96-127. The 25 PM 12 supercluster can be assigned to any of these address groups, e.g., 0-31. Similarly, the group of 30 PMs 12 is assigned to 32-63 and the group of 20 PMs 12 is assigned to 64-95. The remaining group of 10 could be assigned anywhere in the range 96-127, but it is best to pick one half or the other. Another group of up to size 16 could be added later, or, those boards could be depopulated from the network 14. The last supercluster is assigned to 96-111.

Both networks 14 in a system are partitioned in equivalent ways. That is, even though the PMs 12 in a supercluster do not have to be assigned to the same block of addresses in each network 14, they must be in a valid partition of the same size in each network 14. For simplicity it is recommended that the address blocks be made the same in each network 14.

Superclusters can be created in existing systems 10 without recabling the PMs 12 if each PM 12 is plugged into the same address in each network 14, as long as the address rules are followed. It may be, however, that one supercluster has more PMs 12 than another due to the way in which the PMs 12 are attached to the network 14. To avoid this problem, the PMs 12 should be evenly distributed among the network I/O ports 20.

26. MULTICAST

Figure 25:
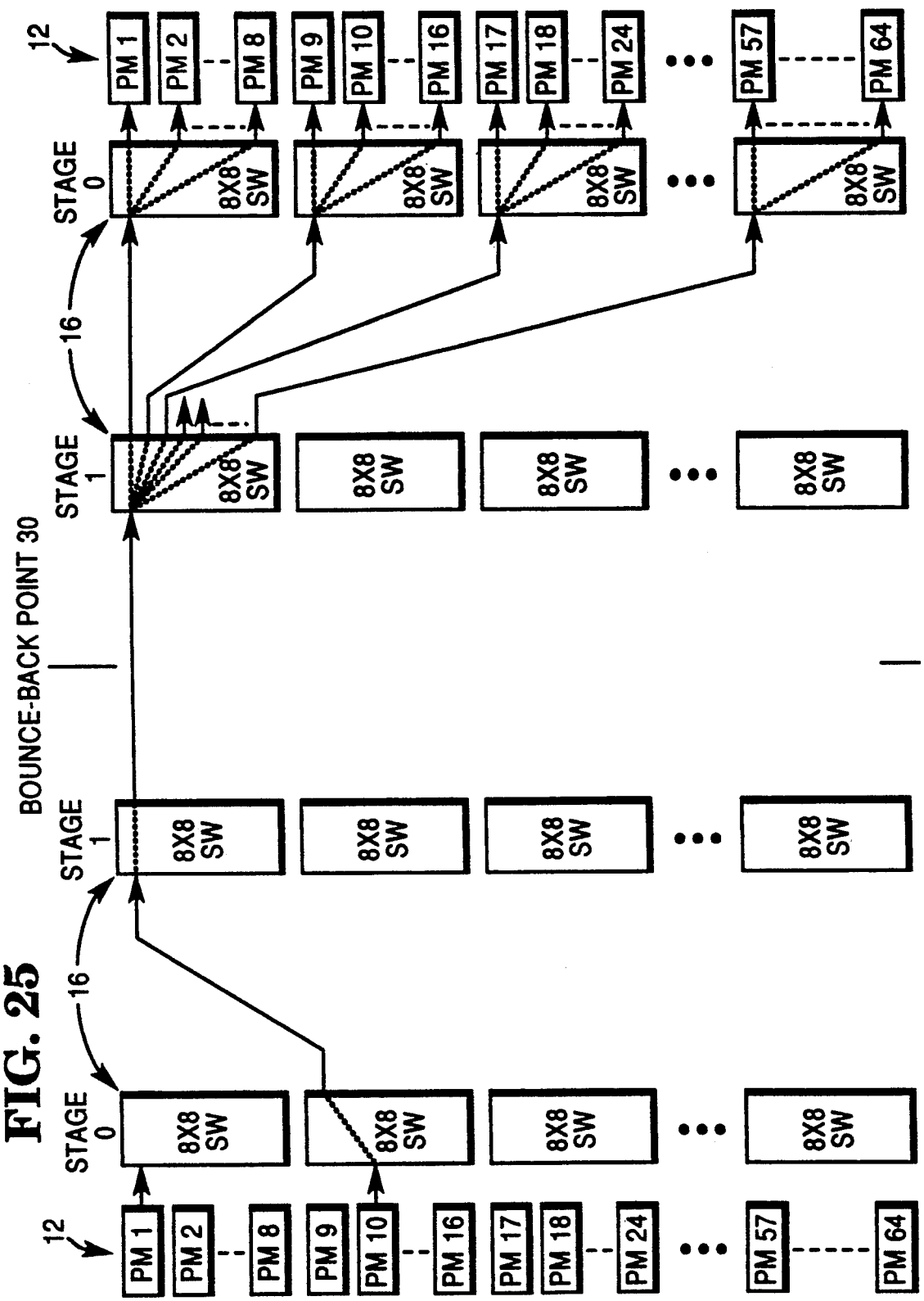
FIG. 25 illustrates the paths traversed through the network by a multicast connect command.

FIG. 25 illustrates the paths traversed through the network 14 by a multicast connect command. The tag mapping table 108 is used to select a single output port for switch nodes 16 in the left half of an unfolded network 14, thereby steering the multicast connect command and routing tag to a particular bounce-back point 30, i.e., a particular input port on a particular switch node 16 in the highest numbered stage in the left half of the unfolded network 14. The multicast port select register 130 is used to select a set of output ports for switch nodes 16 in the right half of the unfolded network 14

All PMs 12 within a supercluster use the same bounce-back point 30 for multicasts. A multicast from on supercluster to another uses the bounce-back point 30 of the destination supercluster. These rules prevent deadlock by permitting only one multicast at a time within a supercluster partition. In addition, circuits in different supercluster partitions cannot interfere with each other.

No more than one multicast bounce-back point 30 is located at the input of any switch node 16 (which limits the number of superclusters to the number of switch nodes 16 in the highest numbered stage of the network 14). Furthermore, no two multicast commands are routed through the same switch node 16 in the right half of the unfolded network 14 (which effectively prohibits supercluster address sizes that are smaller than the size of a switch node 16). These rules simplify the switch node 16 design because the 8-input arbiter 98 in each switch node 16 does not need to allow for multiple simultaneous multicast commands.

Multicasts are disjoint, i.e., no supercluster is a subset or superset of another supercluster. This rule prevents deadlock by preventing one multicast from interfering with another multicast.

A PM 12 can establish a connection to all other PMs 12 by multicasting to a supercluster comprised of all PMs 12. In such a case, only one PM 12 can use the network 14 at a time.

The multicast capability allows the PMs 12 to be easily coordinated, especially with respect to their status. The alternative would require point-to-point messages to be sent to every PM 12 and the coordination of status information received in reply.

Multicasts could easily "hog" all available bandwidth, so a mechanism, called a multicast window, is included that regulates entry of multicast connections to the network 14 in such a way as to maintain high performance of multicast and point-to-point messages. Because multicasts are regulated, they are given priority over point-to-point messages by the switch nodes 16. In addition, the switch nodes 16 "remember" that there was recent multicast traffic and wait for a timed period to see if more multicasts are forthcoming before allowing point-to-point traffic to resume.

There are two major elements required by the multicast protocol that are not part of the monocast protocol:

1. The connection is fully handshaked in that an idle reply is received by the sending controller 18 followed by a count reply. The idle reply is the result of a merge of all idle replies from all the receiving controllers 18 to which the sending controller 18 is connected. The count reply is a merge of all count replies from each receiving controller 18 transmitting a one count. The result is the quantity of receiving controllers 18 that have received the multicast.

2. An ACK reply from the receiving controller 18 is required after transmission of the header and also after the data is transmitted. A disconnect success command is not transmitted by the sending controller 18 until the ACK reply has been received.

To establish a multicast circuit, the sending controller 18 first transmits a connect command and routing tag which indicates the selected bounce-back point 30. Each switch node 16 directs the connect command to the selected bounce-back point 30. Once the connect command reaches the selected bounce-back point 30, the output port or set of output ports to be selected is determined from the multicast port select register 130 in the switch node 16. In this case, paths are established from a receiving input port to the entire set of selected output ports. If some of the selected output ports are currently unavailable, the input state control 56 in the IPL 36 waits until all of the selected output ports become available. The connect command and the routing tag are then copied to each of the selected output ports and subsequently propagated to the next stage of switch nodes 16. This process is repeated stage by stage, until the connect command reaches all of the designated receiving controllers 18.

Each receiving controller 18 then responds with a count reply followed by idle replies on the back channel 34. When there is more than one receiving controller 18, merge logic 120 in each switch node 16 combines the incoming replies on the back channel 34. After a reply decode 110 decodes the reply, the output state control 96 signals the merge logic 120 that it is ready to participate in the reply merge process. If all selected back channels 34 fail to become ready to merge, then the sending controller 18 detects the failure via timing out. When the merge logic 120 detects that all selected back channels 34 are ready to merge, it enables the clocks to all participating back channel FIFOs 114 simultaneously.

There are two types of results from the merge logic 120, i.e., low sort and add. The type is specified by the reply. In low sort mode, the merge logic 120 outputs the reply with the lowest key followed by the accompanying data word. In add mode, the data words of all replies are added in a bit serial fashion so that the result has the same number of bits as the operands. The input state control 56 sets the back channel output mux 74 to select the output of the merge logic 120 to be connected to the back channel 34 output.

Stage by stage, the switch nodes 16 merge the back channel 34 replies and send the results through their back channels 34 to the next stage until a single merged count reply is derived and passed back t the sending controller 18 by the switch node 16 in stage 0 in the right half of the unfolded network 14. The sending controller 18 verifies that it has received idle replies and checks the count reply (the count reply indicates the total number of receiving controllers 18 that have received the connect command).

If the count is correct, the sending controller 18 begins sending the data portion of the message, followed by a checksum command and idle commands; the sending controller 18 then waits for a merged ACK reply from all receiving controllers 18. The transmitted data and command follows the paths that the connect command created previously (branching out to multiple ports just as the connect command did) until they have reached all designated receiving controllers 18.

Each receiving controller 18 individually checks its data with the checksum command it has received. If correct, each then responds with an ACK reply, followed by idle replies. Just as the count reply did, the ACK replies from all receiving controllers 18 are merged, stage by stage, until a single merged ACK reply, followed by merged idle replies, is propagated back to the sending controller 18.

The sending controller 18, which had been waiting for this merged ACK reply to indicate that all receiving controllers 18 have verified their data, then sends a disconnect (success) command followed by idle commands. As before, this command and subsequent idle commands are propagated forward through the network, to all of the receiving controllers 18. Each receiving controller 18 then responds with a disconnect (success) reply to disconnect the circuit.

The disconnection proceeds in a fashion similar to that of the monocast case. However, switch nodes 16 that are connected to more than one output port wait for the disconnect reply from all selected output ports before proceeding. As each switch node 16 merges the disconnect reply, it disconnects its paths and sends the merged reply followed by nulls out of its back channel 34 to the switch node 16 in the previous stage. Its output ports, when disconnected, individually source soft carriers through their respective forward channels 32 toward the receiving controllers 18. This disconnection procedure is repeated, stage by stage, until finally a single merged disconnect (success) reply followed by nulls reaches the sending controller 18, indicating a successfully received message and completed circuit disconnection. The sending controller 18 then sources soft carriers through its forward channel 32 towards the switch node 16 in stage 0.

27. FORWARD CHANNEL COMMANDS

The following section describes a protocol which defines the different command types that can be transmitted through the network 14. The commands are transmitted on forward channels 32 through the network to receiving controllers 18. In the descriptions of each command, the byte count does not include the command escape byte.

A Soft Carrier command consists of two bytes and is processed both by switch nodes 16 and controllers 18. The second byte is the one's complement of the first byte which facilitates error detection during idle periods by ensuring that all data bits and the parity bit toggle. If there is no circuit present when this command is received by a switch node 16, the command decode 52 causes the input state control 56 to discard the command by clocking the next item out of the input FIFO 46. If there is a circuit present or pending, the switch node 16 sets the forward channel 32 loss error bit in the input status register 66.

Whenever a given output port is not part of a circuit, the output state control 96 sets the output mux 102 to select the command generator 106 and the command generator 106 transmits the soft carrier command, thereby maintaining the soft carrier on the output port.

A Success command consists of one byte and is used by both the switch nodes and network controllers 18. It is a one byte command. If a circuit is currently active, the switch nodes 16 interpret it as a disconnect and pass it on.

A Failure command consists of one byte is used by both the switch nodes 16 and controllers 18. It is a one byte command. If a circuit is currently active, the switch nodes 16 interpret it as a disconnect and pass it on.

An Idle command consists of two bytes and is processed both by switch nodes 16 and controllers 18. The second byte is the one's complement of the first byte which facilitates error detection during idle periods by ensuring that all data bits and the parity bit toggle. If there is no circuit present when this command is received by a switch node 16, then the soft carrier loss error bit is set in the input status register 66. If there is a circuit pending (Connect command received but not yet forwarded), then the command decode 52 causes the input state control 56 to discard the command by clocking the next item out of the input FIFO 46. If there is a circuit present, then the switch node 16 passes this command on to the next stage.

Whenever a given output port or its associated input port detects an error while a circuit is present, the input state control 56 sets the data select mux 60 to select the command generator 64 and the command generator 64 transmits the Idle command, thereby maintaining the circuit without propagating the error.

A Test command consists of one byte and is used by both the switch nodes 16 and the controllers 18. It provides a mechanism for testing command error processing throughout the network 14. Switch nodes 16 that have been enabled to respond to this command complement the parity bit on the byte or bytes following this command.

A Chip-Address-Is command consists of one byte and is followed by two bytes that contain the chip address and the port number of the sending controller 18. It is only issued while a DP 140 session is active. This command is stored in the command/data latch 48 upon receipt. The local DP 140 is notified and reads the latch 48 via the diagnostic port logic (DPL) 122. It is used to acknowledge receipt of data. This command is nominally used only by the switch nodes 16. (It is also used by the controllers 18 for testing purposes only.) Upon receipt, the IPL 36 in a switch node 16 stores the chip address in the tag latch 50. This command is issued by a switch node 16 upon receipt of an Escape Reply with a Send-Chip-Addr key field. It is used as part of the process to determine the topology of the network 14.

A Connect command consists of one byte and is followed by the two byte routing tag. This command is processed by both switch nodes 16 and controllers 18. When this command is received by a switch node 16, the command decode 52 causes the input state control 56 to store it into the command/data latch 48 and, on subsequent clock cycles, it stores the following two bytes into the tag latch 50.

A Checksum command consists of one byte and is followed by two bytes. This command is used exclusively by the controllers 18. If a circuit is currently active, the switch nodes 16 pass it on as though it were data. If a circuit is not currently active, then the command decode 52 sets a command error flag in the input status register 66.

A Send-Port-Address command consists of one byte and is used by a controller 18 to obtain its location in the network 14 from the switch node 16 to which it is directly attached. The port address is returned via the back channel 34 using an Escape Reply with a Port-Addr-Is key field. This command may also be issued by switch nodes 16, or received by any switch node 16 or controller 18 for diagnostic purposes.

A Resync command consists of one byte and is used by controllers 18 or switch nodes 16 to request that the recipient transmit null bits on the back channel 34 for as long as this command is continuously received. It is issued by controllers 18 or switch nodes 16 when their back channel 34 inputs lose framing synchronization as a result of an error detected on the back channel 34.

A DP-Ack command consists of one byte and is issued by a controller 18, via the switch node 16 to which it is directly connected, to the local DP 140. It is only issued while a DP 140 session is active. This command is stored in the command/data latch 48 upon receipt. The local DP 140 is notified and reads the latch 48 via the Diagnostic Port Logic (DPL) 122. It is used to acknowledge receipt of data.

28. BACK CHANNEL REPLIES

The following section describes a protocol which defines the different reply types that can be transmitted through the network 14. The replies are transmitted on back channels 32 through the network to sending controllers 18.

There are two types of replies encoded in an open back channel 34, i.e., short and long. Both types begin with a four bit reply code followed by a parity bit. A long reply follows this with an eight bit key field, a second parity bit covering all previous bits, the first 8 bits of a 16-bit data field, a third parity bit covering all previous bits, the second 8 bits of the 16-bit data field, and a fourth parity bit the covers the entire reply. Thus, the short reply is five bits and the long reply is 32 bits.

A Test reply is short. This command provides a mechanism for testing reply error processing throughout the network 14. Switch nodes 16 that have been enabled to respond to this reply complement the parity on the reply and then forward it.

A Success reply is short. If a circuit is currently disconnect pending, the switch nodes 16 interpret it as a disconnect reply and pass it on. Receipt of this reply clears a fail bit in the input status register 66.

A Failure reply is short. If a circuit is currently disconnect pending, the switch nodes 16 interpret it as a disconnect reply and pass it on. Receipt of this reply sets the fail bit in the input status register 66.

An Idle reply is short. Once a circuit is established, this reply is sent whenever there is nothing else to be sent by a controller 18.

A Pause reply is short. Once a circuit is established, this reply is sent by controllers 18 and is merged by switch nodes 16. It is compatible with the idle reply. If both are present, then the result is a pause reply.

ACK (Acknowledge), NAK (Negative Acknowledge), and NAP (Not A Participant) replies are short. A SAK (Status Acknowledge/Unsuccessful) reply is long. The NAK response may be of several different types, indicating a locked, error or overrun condition. The NAP reply typically is used as an indication that the processor does not have the resources to process the message meaningfully, i.e. not applicable processor.

Once a circuit is established, these replies are sent by controllers 18 and merged by switch nodes 16. These replies are compatible with Idle, and among themselves, for merge operations. Only the Idle reply is discarded, the others remain in the back channel FIFO 114 until a merge operation is complete; the winner is the reply with the highest priority. The SAK reply has the highest priority, followed by the NAK, ACK, and NAP replies. The NAP and SAK replies may also be merged with the Sense and Sum replies. Table V shows the results of merge operations, based on the type of reply.

With regard to the SAK reply, it typically denotes the readiness state of a processor module with regard to a particular task or transaction. Such SAK replies provide, in conjunction with the back channel 34 merge operations of the network 14, means for providing a globe status report for a given task or transaction. Because the SAK replies may be sorted according to priority, the lowest data content response automatically gains priority and establishes the least ready status as the global system state. The SAK replies are also used in conjunction with various other operations, such as system initialization and lockout operations.

If two or more back channel FIFOs 114 contain a SAK reply, then the SAK reply with the lowest value wins in the merge. The data field of the SAK reply contains the PM 12 number, which is passed through the back channel 34 with the winning key. If two or more keys are equal, then the lowest PM 12 number is returned.

A Sense reply is long. Once a circuit is established, this reply is sent by controllers 18 and merged by switch nodes 16. The lowest value wins in a merge. The data field contains the PM 12 number which is passed through the back channel 34 with the winning key. If two or more keys are equal, then the lowest PM 12 number is returned. This reply is merged with the NAP and SAK replies.

A Count reply is long. Once a circuit is established, this reply is sent by controllers 18 and merged by the switch nodes 16. The key and data fields are bit serially added with other Count replies in the merge logic 120 in a switch node 16. The result is truncated to 20 bits. This operation assumes that least significant bits are transmitted first. This reply is merged with the NAP and SAK replies. The Sum reply is not merged with any Count reply.

An Escape reply is nominally issued only by switch nodes 16. The key field is used to specify one of the following seven options: Available, Not-Available, Send-Chip-Address, Port-Address-Is, DP-Attention, DP-Data, and DP-Checksum. These replies are all long.

An Available key is used only by switch nodes 16 in the left half of an unfolded network 14 when there is no circuit present. The data fields are not used. Upon receipt, the OPL 38 in each switch node 16 clears a Temp-Not-Avail status flag in the output status register 92. This reply and key are issued only as needed, not on a continuous basis. When a circuit is pending, there is no need to issue this reply and key. Switch nodes 16 that do not perform load balancing never use this reply and key.

A Not-Available key is used only by switch nodes 16 in the left half of an unfolded network 14 when there is no circuit present. The data fields are not used. Switch nodes 16 that do not perform load balancing never use this reply and key. It can be issued after a circuit has been disconnected and as part of the initialization procedure. It is issued only if all output ports are either permanently unavailable (because nothing is connected) or temporarily unavailable (due to receipt of this reply from an upstream switch node 16), or if the input port becomes unavailable due to the detection of an error condition. Upon receipt, the OPL 38 in each switch node 16 sets a Temp-Not-Avail status flag in the output status register 92. This reply and key are issued only when the status of the switch node 16 changes, not on a continuous basis. Once a circuit is pending, this reply and key are not issued. At that point the switch node 16 is committed to completing the circuit. Switch nodes 16 in stage 0 do not issue this reply and key.

A Send-Chip-Addr Key is used by a switch node 16 to ask the switch node 16 at the other end of the back channel 34 to transmit its chip address via the forward channel 32. The data field is set to 0. The Chip-Addr-Is command is used to supply the requested chip address. This reply and key are issued only if the hard carrier is present on the back channel 34. It is used as part of the process to determine the topology of the network 14. It may also be sent or received by the controllers 18 for diagnostic purposes.

A Port-Address-Is Key is issued by a switch node 16 to a controller 18. The data fields contain the value in the chip address register 121 and port number register 72 in the switch node 16. This reply and key are issued only as a result of receiving the Send-Port-Addr command. This reply and key may also be received by a switch node 16 for diagnostic purposes. In such a case, the switch node 16 stores all the reply fields, but otherwise ignores the reply. A DP 140 may then read the fields by means of the DPL 122.

A DP-Attention Key is used by the diagnostic processor to indicate that a response is available for the controller 18. It is sent by the local switch node 16 at the next available opportunity when no circuit is present.

A DP-Data Key is used to move data from the DP 140 to the controller 18 while a DP session is active.

A DP-Checksum Key is used to move a checksum from the diagnostic processor to the controller 18 while a DP session is active.

A Ctl-Error reply is long. It is issued by the controllers 18 to report errors. The key field contains an error code and the data field contains the PM number. No merge take place when this reply is received. If a circuit is present, it is queued up in the back channel FIFO 114 (overwriting whatever was there) and transmitted on a first-come-first-served basis. If no circuit is present or pending, then this reply is ignored.

A Net-Error reply is long. It is issued by the switch nodes 16 to report errors. The key field contains an error code and the data field contains the chip address and port number. No merge takes place when this reply is received. If a circuit is present, it is queued up in the back channel FIFO 114 (overwriting whatever was there) and transmitted on a first-come-first-served basis. If no circuit is present or pending, then this reply is ignored.

The Ctl-Error and Net-Error replies are only used to try to directly inform the sending controller 18 of a problem. In any event, other error reporting mechanisms are used to ensure the system logs and responds to the error condition.

29. NETWORK APPLICATIONS

Figure 26:
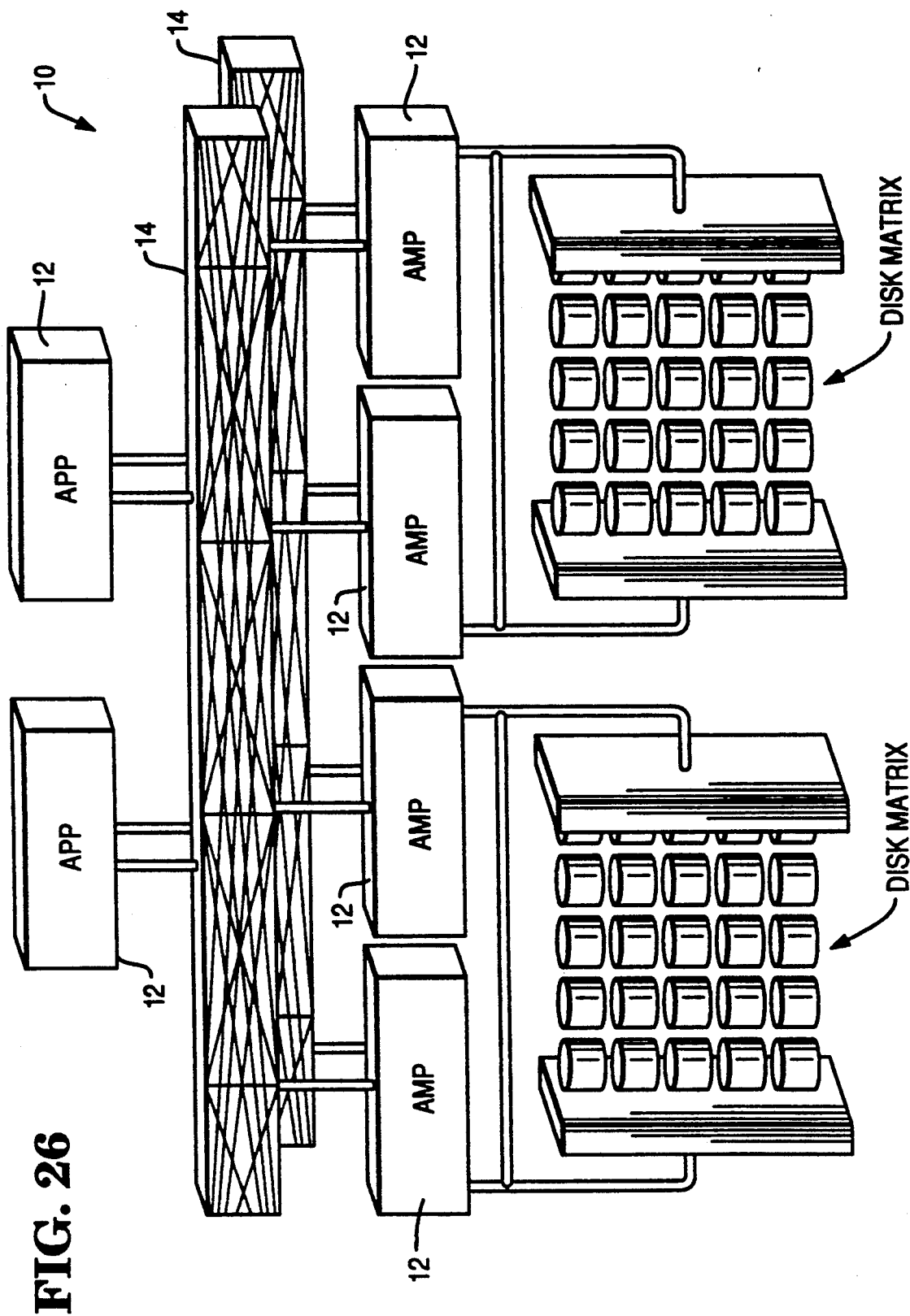
FIG. 26 illustrates one possible application of the present invention, which comprises a general purpose multiprocessor computer system capable of massive parallel processing.

FIG. 26 illustrates one possible application of the present invention, which comprises a general purpose multiprocessor computer system 10 capable of massively parallel processing. The system 10 consists of common platform PMs 12, which are functionally differentiated by software and I/O subsystems, communicating with each other by means of the redundant networks 14.

The functional differentiation of processing determines the PM 12 type. One PM 12 type, the access module processor (AMP), manages portions of the relational database. Another PM 12 type, the application processor (AP), executes an operating system version which provides the processing environment visible to end-users.

An AP consists of one or more CPUs based on the INTEL ® 486 CPU, memory 22 and I/O capabilities including controllers 18. Each AP may include multiple CPUs and includes at least two controllers 18 for connection to two networks 14. Each AP executes an independent copy of the operating system, preferably UNIX TM, and maintains an independent address space. If a single AP contains multiple CPUs, they may be tightly-coupled by sharing a single copy of the operating system and a common address space.

An AMP is similar to the AP, but includes greater disk I/O capabilities and has little or no communication other than disk interfaces and network controllers 18. Each AMP executes an independent copy of the operating system, which is specifically designed for executing the database software. Each AMP is allocated a portion of the database for which it is responsible. The database software executing therein maintains separate buffers, logging, recovery and database management capabilities. AMPs are not overtly aware of the existence of other AMPs and are normally unaffected by the operations of the other AMPs. AMPs receive requests from the APs and perform the operations on their portion of the database. Depending on the request, the AMPs may return simple acknowledgements, results of an aggregation function, or a relation back to the requesting AP. The AMPs have the capability to work in parallel with other AMPs and to perform parallel operations internally.

The computer system 10 provides a single operational view for on-line transaction processing (OLTP) so that end users do not know which AP they are physically communicating with or which AP is actually executing their applications. All APs have the potential to be included in a common pool for these services. OLTP software routes transactions and responses as necessary, depending on which AP is capable of providing specific services.

The computer system 10 is based on client-server processing concepts. This allows other host environments, such as IBM MVS TM, DEC VMS TM, and other UNIX TM systems, to act as clients to the databases managed by the computer system 10. Client software running in the host environment communicates with the APs. For example, in IBM environments, DB2 TM-style SQL clients can be used to access the database on the computer system 10. The database executes partially in the APs, but mostly in the AMPs. The AP portion includes software to process SQL statements into a form required by the AMP. This processing includes parsing SQL into parallel steps, optimization, AMP message generation, and AMP workload dispatching.

30. CONCLUSION

This concludes the description of the preferred embodiment of the invention. In summary, the present invention comprises a multistage interconnect network 14 (MIN) capable of supporting massively parallel processing, including point-to-point and multicast communications between processor modules (PMs) which are connected to the input and output ports of the network. The network 14 is built using interconnected 8×8 switch nodes 16 arranged in 2 [$\log_8 N$] stages, wherein N is the number of input/output ports in the network and [$\log_8 N$] indicates a ceiling function providing the smallest integer not less than $\log_8 N$. The additional stages provide additional paths between network input ports and network output ports, thereby enhancing fault tolerance and lessening contention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE I

Incremental Growth at Discontinuities

| N | CMA | Type-A | % | Type-B | % | Type-D | % |
|---|---|---|---|---|---|---|---|
| 64→65 | 1→2 | 8→10 | 12.5 | 0→5 | (∞) | 2→3 | — |
| 128→129 | 2→3 | 16→19 | 12.5 | 8→10 | 12.5 | 4→5 | — |
| 192→193 | 3→4 | 24→28 | 12.5 | 12→14 | 8.0 | 6→7 | — |
| 256→257 | 4→5 | 32→37 | 12.5 | 16→19 | 12.5 | 8→10 | 12.5 |
| 320→321 | 5→6 | 40→46 | 12.5 | 20→23 | 10.0 | 10→12 | 10.0 |
| 384→385 | 6→7 | 48→55 | 12.5 | 24→28 | 12.5 | 12→14 | 8.0 |
| 448→449 | 7→8 | 56→64 | 12.5 | 28→32 | 11.0 | 14→16 | 7.0 |

TABLE II

Number of Type-A Boards Versus Number of PMs if 50% of the Maximum Bandwidth is Maintained (#PMs < 65)

| #PMs | #Type-A Boards |
|---|---|
| 2 | 1 |
| 3–8 | 2 |
| 9–18 | 3 |
| 19–32 | 4 |
| 33–40 | 5 |
| 41–48 | 6 |
| 49–56 | 7 |
| 57–64 | 8 |

TABLE III

Number of Type-A Boards in the least populated CMA/A Versus Number of PMs if 100% of the Maximum Bandwidth is Maintained (#PMs < 129)

| #PMs | #Type-A Boards |
|---|---|
| 2–4 | 2 |
| 5–9 | 3 |
| 10–16 | 4 |
| 17–25 | 5 |
| 26–36 | 6 |
| 37–49 | 7 |
| 50–64 | 8 |

TABLE IV

8 × 8 Chip Address Register Bit Definition

| BIT | MEANING | DERIVATION |
|---|---|---|
| $c_{11}$ | Right/Left | Hardwired on board |
| $c_{10}c_9$ | Stage # | Hardwired on board |
| $c_8c_7c_6$ | Cabinet # | DP supplies it |
| $c_5c_4c_3$ | CMA/A # | DP supplies it |
| $c_5c_4$ | CMA/B # | DP supplies it |
| $c_2c_1c_0$ | Type-A board # | Hardwired in backplane |

TABLE IV-continued

8 × 8 Chip Address Register Bit Definition

| BIT | MEANING | DERIVATION |
|---|---|---|
| $c_3c_2c_1$ | Type-B/C board # | Hardwired in backplane |
| $c_0$ | Type-B/C level | Hardwired on board |

TABLE V

Back Channel Merge Logic Results

|  | Nap | Ack | Nak | Sak | Sense | Count | Sum |
|---|---|---|---|---|---|---|---|
| Nap | Nap | Ack | Nak | Sak | Sense | Count | Sum |
| Ack | Ack | Ack | Nak | Sak | Err | Err | Err |
| Nak | Nak | Nak | Nak | Sak | Err | Err | Err |
| Sak | Sak | Sak | Sak | Sak | Sak | Sak | Sak |
| Sense | Sense | Err | Err | Sak | Sense | Err | Err |
| Count | Count | Err | Err | Sak | Err | Count | Err |
| Sum | Sum | Err | Err | Sak | Err | Err | Sum |

What is claimed is:

1. A communications system, comprising:
   (a) a plurality of switch nodes, each switch node comprising a first plurality of input ports, a second plurality of output ports, and means for selectively connecting said input ports to said output ports; and
   (b) means for connecting the switch nodes together in a multistage interconnect network, the means for connecting comprising forward channel and back channel signal paths coupled to each of the input and output ports in the switch nodes, wherein the back channel signal paths have a narrower bandwidth relative to the forward channel signal paths to simplify packaging.

2. The system of claim 1, further comprising:
   (c) multicast means, operative within the network, for transmitting forward channel messages from a source to one or more destinations; and
   (d) back channel merge means, within each switch node, for combining back channel replies received from the destinations into a single result, wherein the result is transmitted on the back channel to the source.

3. The system of claim 1, wherein the means for connecting comprises cabling means for wiring between switch nodes in different stages so that the forward channels and back channel signal paths are laid out in one or more copies of a universal wiring pattern.

4. The system of claim 3, wherein the universal wiring pattern comprises a permutation of connections between switch node input and output ports that swaps the least significant two base b digits of a port's level number representation, where b is the switch node size.

5. The system of claim 3, wherein the means for wiring comprises means for wiring every stage in a network of size $N=x^n$, $n>1$, with $x^{n-2}$ copies of the universal wiring pattern, wherein x is a total number of output ports on a switch node.

6. The system of claim 1, wherein the means for connecting comprises means for interconnecting the switch nodes together to simplify the cabling, wherein a pattern of interconnections between switch nodes in each stage of the network is completely specified by permuting the digits of a level number representing a port of a switch node.

7. The system of claim 6, wherein the means for interconnecting comprises means for connecting switch node output ports identified by (S: $x_{n-1} \ldots x_1 x_0$) to switch node input ports identified by (S+1: PERMUTE$^n_S$ {$x_{n-1}$ ... $x_1x_0$}), wherein S indicates a switch node in a specific stage, n refers to a total number of stages in the network, and x is a level number of a switch node port represented as ($x_{n-1}$ ... $x_1x_0$)$_b$ in a base b corresponding to a size of the switch nodes, wherein $0 \leq x_i = b$, $0 \leq i < n$.

8. The network of claim 7, wherein PERMUTE$^n_S$ {$x_{n-1}$ ... $x_1x_0$} is equivalent to PERMUTE$^2_0${$x_1x_0$}=$x_0x_1$ for a network wherein n=2.

9. The network of claim 7, wherein PERMUTE$^n_S$ {$x_{n-1}$ ... $x_1x_0$} is equivalent to PERMUTE$^3_0${$x_2x_1x_0$}=$x_2x_0x_1$ and PERMUTE$^3_1${$x_2x_1x_0$}=$x_1x_0x_2$ for a network wherein n=3.

10. The network of claim 7, wherein PERMUTE$^n_S$ }$x_{n-1}$ ... $x_1x_0$} is equivalent to PERMUTE$^3_0$}$x_2x_1x_0$}=$x_2x_0x_1$ and PERMUTE$^3_1$}$x_2x_1x_0$}=$x_0x_1x_2$ for a network wherein n=3.

11. The network of claim 7, wherein PERMUTE$^n_S$ {$x_{n-1}$ ... $x_1x_0$} is equivalent to PERMUTE$^4_0${$x_3x_2x_1x_0$}=$x_3x_2x_0x_1$, PERMUTE$^4_1${$x_3x_2x_1x_0$}=$x_1x_0x_3x_2$, and PERMUTE$^4_2${$x_3x_2x_1x_0$}=$x_3x_2x_0x_1$ for a network wherein n=4.

12. The network of claim 11, wherein PERMUTE$^4_0$ and PERMUTE$^4_2$ leave the most significant two digits undisturbed, so that an interconnection length in stages 0 and 2 are minimized.

13. The system of claim 6, wherein the means for interconnecting comprises means for connecting switch node output ports identified by (S+1: PERMUTE$^n_S$ {$x_{n-1}$ ... $x_1x_0$}) to switch node input ports identified by (S: $x_{n-1}$ ... $x_1x_0$), wherein S indicates a switch node in a specific stage, n refers to a total number of stages in the network, and x is a level number of a switch node port represented as ($x_{n-1}$ ... $x_1x_0$)$_b$ in a base b corresponding to a size of the switch nodes, wherein $0 \leq x_i < b$ and $0 \leq i < n$.

14. The network of claim 13, wherein PERMUTE$^n_S$ {$x_{n-1}$ ... $x_1x_0$} is equivalent to PERMUTE$^2_0${$x_1x_0$}=$x_0x_1$ for a network wherein n=2.

15. The network of claim 13, wherein PERMUTE$^n_S$ {$x_{n-1}$ ... $x_1x_0$} is equivalent to PERMUTE$^3_0${$x_2x_1x_0$}=$x_2x_0x_1$ and PERMUTE$^3_1${$x_2x_1x_0$}=$x_1x_0x_2$ for a network wherein n=3.

16. The network of claim 13, wherein PERMUTE$^n_S$ {$x_{n-1}$ ... $x_1x_0$} is equivalent to PERMUTE$^3_0${$x_2x_1x_0$}=$x_2x_0x_1$ and PERMUTE$^3_1${$x_2x_1x_0$}=$x_0x_1x_2$ for a network wherein n=3.

17. The network of claim 13, wherein PERMUTE$^n_S$ {$x_{n-1}$ ... $x_1x_0$} is equivalent to PERMUTE$^4_0${$x_3x_2x_1x_0$}=$x_3x_2$ $x_0x_1$, PERMUTE$^4_1${$x_3x_2x_1x_0$}=$x_1x_0x_3x_2$, and PERMUTE$^4_2${$x_3x_2x_1x_0$}=$x_3x_2x_0x_1$ for a network wherein n=4.

18. The network of claim 17, wherein PERMUTE$^4_0$ and PERMUTE$^4_2$ leave the most significant two digits undisturbed, so that an interconnection length in stages 0 and 2 are minimized.

19. The system of claim 1, wherein the means for connecting comprises means for arranging the switch nodes in more than $\log_b N$ stages, wherein b is a total number of switch node input/output ports, N is a total number of network I/O ports, and $\log_b N$ indicates a ceiling function providing the smallest integer not less than $\log_b N$, thereby providing additional communication paths between any network input port and network output port to enhance fault tolerance and lessen contention.

20. The system of claim 19, wherein the switch nodes are arranged in 2 $\log_b N$ stages.

21. A method of communicating among a plurality of switch nodes connected together in a multistage interconnect network, each switch node comprising a first plurality of input ports, a second plurality of output ports, and means for selectively connecting said input ports to said output ports, the method comprising:
(a) transmitting messages between switch nodes using a forward channel coupled to each of the input and output ports in the switch nodes; and
(b) transmitting between switch nodes using a back channel coupled to each of the input and output ports in the switch nodes, wherein the back channels have a narrower bandwidth relative to the forward channels to simplify packaging.

22. The method of claim 21, further comprising:
(c) transmitting forward channel messages from a source to one or more destinations; and
(d) combining back channel replies received from the destinations into a single result, wherein the result is transmitted on the back channel to the source.

23. A communication system having a plurality of ports for concurrently transferring messages between different ones of the ports, comprising:
(a) a plurality of agents connected to the system, each including means providing interconnect request messages containing routing tags for communicating with other agents, means for transmitting variable length data messages, and means for transmitting response messages of different types having values in accordance with a predetermined protocol; and
(b) network means for intercoupling the agents, the network means comprising a plurality of switch nodes arranged in a multistage interconnect network and each having a plurality of forward channel and back channel signal paths with selectable interconnections between different terminals of the switch nodes, the back channel signal paths having a narrower bandwidth relative to the forward channel signal paths, the switch nodes also including means responsive to the routing tags in the messages for selecting signal paths between switch nodes in order to establish a complete path through the network, and the switch nodes further comprising means for reserving the complete path during the transmission of variable length data messages, once request messages and response messages thereto have been successfully interchanged.

24. A communications system, comprising:
(a) a plurality of switch nodes, each switch node comprising a first plurality of input ports, a second plurality of output ports, and means for selectively connecting said input ports to said output ports; and
(b) means for interconnecting the switch nodes together in a multistage interconnect network to simplify the cabling therebetween, wherein a pattern of interconnections between different stages of switch nodes is specified by permuting the digits of a level number representing a port of a switch node.

25. The system of claim 24, wherein the means for interconnecting comprises means for connecting switch node ports identified by (S: $x_{n-1}$ ... $x_1x_0$) to switch node ports identified by (S+1: PERMUTE$^n{}_S$ {$x_{n-1}$ ... $x_1x_0$}), wherein S indicates a switch node in a specific stage, n refers to a total number of stages in the network, and x is a level number of a switch node port represented as ($x_{n-1}$ ... $x_1x_0$)$_b$ in a base b corresponding to a size of the switch nodes, wherein $0 \leq x_i < b$ and $0 \leq i < n$.

26. The network of claim 25, wherein PERMUTE$^n{}_S$ {$x_{n-1}$ ... $x_1x_0$} is equivalent to PERMUTE$^2{}_0$ {$x_1x_0$} = $x_0x_1$ for a network wherein n=2.

27. The network of claim 25, wherein PERMUTE$^n{}_S$ {$x_{n-1}$ ... $x_1x_0$} is equivalent to PERMUTE$^3{}_0$ {$x_2x_1x_0$} = $x_2x_0x_1$ and PERMUTE$^3{}_1$ {$x_2x_1x_0$} = $x_1x_0x_2$ for a network wherein n=3.

28. The network of claim 25, wherein PERMUTE$^n{}_S$ {$x_{n-1}$ ... $x_1x_0$} is equivalent to PERMUTE$^3{}_0$ {$x_2x_1x_0$} = $x_2x_0x_1$ and PERMUTE$^3{}_1$ {$x_2x_1x_0$} = $x_0x_1x_2$ for a network wherein n=3.

29. The network of claim 25, wherein PERMUTE$^n{}_S$ {$x_{n-1}$ ... $x_1x_0$} is equivalent to PERMUTE$^4{}_0$ {$x_3x_2x_1x_0$} = $x_3x_2x_0x_1$, PERMUTE$^4{}_1$ {$x_3x_2x_1x_0$} = $x_1x_0x_3x_2$, and PERMUTE$^4{}_2$ {$x_3x_2x_1x_0$} = $x_3x_2x_0x_1$ for a network wherein n=4.

30. The network of claim 29, wherein PERMUTE$^4{}_0$ and PERMUTE$^4{}_2$ leave the most significant two digits undisturbed, so that an interconnection length in stages 0 and 2 are minimized.

31. A communications apparatus, comprising:
(a) a plurality of switch nodes, each switch node comprising a first plurality of input ports, a second plurality of output ports, and means for selectively connecting said input ports to said output ports; and
(b) means for connecting the switch nodes together in a multistage interconnect network by connecting switch node ports identified by (S: $x_{n-1}$ ... $x_1x_0$) to switch node ports identified by (S+1: PERMUTE$^n{}_S$ {$x_{n-1}$ ... $x_1x_0$}), wherein S indicates a switch node in a specific stage, n refers to a total number of stages in the network and hence its size, and x is a level number of a switch node port represented as ($x_{n-1}$ ... $x_1x_0$)$_b$ in a base b corresponding to the size of the switch nodes, wherein $0 \leq x_i < b$, $0 \leq i < n$ and PERMUTE$^n{}_S$ {$x_{n-1}$ ... $x_1x_0$} is equivalent to PERMUTE$^2{}_0$ {$x_1x_0$} = $x_0x_1$ for a network wherein n=2.

32. A communications apparatus, comprising:
(a) a plurality of switch nodes, each switch node comprising a first plurality of input ports, a second plurality of output ports, and means for selectively connecting said input ports to said output ports; and
(b) means for connecting the switch nodes together in a multistage interconnect network by connecting switch node ports identified by (S: $x_{n-1}$ ... $x_1x_0$) to switch node ports identified by (S+1: PERMUTE$^n{}_S$ {$x_{n-1}$ ... $x_1x_0$}), wherein S indicates a switch node in a specific stage, n refers to a total number of stages in the network and hence its size, and x is a level number of a switch node port represented as ($x_{n-1}$ ... $x_1x_0$)$_b$ in a base b corresponding to the size of the switch nodes, wherein $0 \leq x_i < b$, $0 \leq i < n$ and PERMUTE$^n{}_S$ {$x_{n-1}$ ... $x_1x_0$} is equivalent to PERMUTE$^3{}_0$ {$x_2x_1x_0$} = $x_2x_0x_1$ and PERMUTE$^3{}_1$ {$x_2x_1x_0$} = $x_1x_0x_2$ for a network wherein n=3.

33. A communications apparatus, comprising:
(a) a plurality of switch nodes, each switch node comprising a first plurality of input ports, a second plurality of output ports, and means for selectively connecting said input ports to said output ports; and
(b) means for connecting the switch nodes together in a multistage interconnect network by connecting switch node ports identified by (S: $x_{n-1}$ ... $x_1x_0$) to switch node ports identified by (S+1: PERMUTE$^n{}_S$ {$x_{n-1}$ ... $x_1x_0$}), wherein S indicates a switch node in a specific stage, n refers to a total number of stages in the network and hence its size, and x is a level number of a switch node port represented as ($x_{n-1}$ ... $x_1x_0$)$_b$ in a base b corresponding to the size of the switch nodes, wherein $0 \leq x_i < b$, $0 \leq i < n$ and PERMUTE$^n{}_S$ {$x_{n-1}$ ... $x_1x_0$} is equivalent to PERMUTE$^3{}_0$ {$x_2x_1x_0$} = $x_2x_0x_1$ and PERMUTE$^3{}_1$ {$x_2x_1x_0$} = $x_0x_1x_2$ for a network wherein n=3.

34. A communications apparatus, comprising:
(a) a plurality of switch nodes, each switch node comprising a first plurality of input ports, a second plurality of output ports, and means for selectively connecting said input ports to said output ports; and
(b) means for connecting the switch nodes together in a multistage interconnect network by connecting switch node ports identified by (S: $x_{n-1}$ ... $x_1x_0$) to switch node ports identified by (S+1: PERMUTE$^n{}_S$ {$x_{n-1}$ ... $x_1x_0$}), wherein S indicates a switch node in a specific stage, n refers to a total number of stages in the network and hence its size, and x is a level number of a switch node port represented as ($x_{n-1}$ ... $x_1x_0$)$_b$ in a base b corresponding to the size of the switch nodes, wherein $0 \leq x_i < b$, $0 \leq i < n$ and PERMUTE$^n{}_S$ {$x_{n-1}$ ... $x_1x_0$} is equivalent to PERMUTE$^4{}_0$ {$x_3x_2x_1x_0$} = $x_3x_2x_0x_1$, PERMUTE$^4{}_1$ {$x_3x_2x_1x_0$} = $x_1x_0x_3x_2$, and PERMUTE$^4{}_2$ {$x_3x_2x_1x_0$} = $x_3x_2x_0x_1$ for a network wherein n=4.

35. A communications network, comprising:
(a) a plurality of switch nodes arranged into a multistage interconnect network having a plurality of input and output ports, each port being coupled to an agent to effect communication between agents through the network;
(b) the network having a multiple of $\log_b N$ stages of interconnected switch nodes, wherein b is a total number of switch node input/output ports, N is the number of network I/O ports, and $\log_b N$ indicates a ceiling function providing the smallest integer not less than $\log_b N$, thereby providing additional paths between any network input port and network output port to enhance fault tolerance and lessen contention; and
(c) the network having a loop-back point indicating where the stages of the network are physically folded together so that corresponding switch nodes in similarly numbered stages on either side of the loop-back point are located adjacent to each other, thereby simplifying packaging and minimizing signal path lengths.

36. An apparatus for concurrently transferring messages between different ports, comprising:
(a) multistage interconnect network means for interconnecting a plurality of switch nodes for communication therebetween, each switch node comprising a first plurality of input ports, a second plurality of output ports, and means for selectively connecting said input ports to said output ports; and (b) dynamic configuration means for determining how the switch nodes are interconnected and hence a topology of the multistage interconnect network means, so that messages can be routed correctly between the switch nodes.

37. The apparatus of claim 36, wherein the dynamic configuration means further comprises:
  (1) means for communicating addresses between switch nodes, wherein one switch node communicates its location to another switch node connected thereto; and
  (2) tag mapping table means, in each switch node, for storing routing information derived from the addresses of the switch nodes, so that messages can be routed correctly between the switch nodes.

38. The apparatus of claim 37, further comprising initializing means for querying the switch nodes at startup to determine how they are interconnected and for generating the tag mapping table means in response thereto.

39. A network, comprising:
  (a) a plurality of switch nodes, each having a first plurality of input ports, a second plurality of output ports, and path selector means for selectively connecting the switch node input ports to the switch node output ports;
  (b) means for interconnecting the switch nodes in a relatively arbitrary manner to effect a multistage interconnect network, the network having a first plurality of input ports, a second plurality of output ports, and means for routing messages through the network by transmitting a message from one switch node to another switch node; and
  (c) means for determining how the switch nodes have been interconnected and for constructing routing tables for each switch node in response thereto, so that the path selector means can connect an input port receiving a message to an output port for transferring the message in order to correctly transmit the message.

40. The network of claim 39, wherein the means for determining comprises:
  (1) topology determination means for communicating addresses between the switch nodes, so that a topology for the network can be determined; and
  (2) message routing means for storing routing information derived from the addresses of the switch nodes, so that messages can be routed correctly through the network.

41. A communications apparatus, comprising:
  (a) network means for providing bidirectional data transmission between agents, the network means comprising switch nodes connected together in a multistage interconnect network, each switch node comprising a first plurality of input ports, a second plurality of output ports, and means for selectively connecting said input ports to said output ports; and
  (b) tag mapping table means, in each switch node, for storing routing information derived from the addresses of the switch nodes, so that the data transmission can be routed correctly through the network means.

42. A method for communicating in a network comprising a plurality of switch nodes, each switch node having a first plurality of input ports, a second plurality of output ports, and path selector means for selectively connecting the switch node input ports to the switch node output ports, the method comprising:
  (a) interconnecting the switch nodes in a relatively arbitrary manner to effect a multistage interconnect network;
  (b) determining how the switch nodes have been interconnected;
  (c) constructing routing tables for each switch node according to how the switch nodes have been interconnected; and
  (d) transferring messages through the network according to the routing tables, wherein each switch node that receives the messages uses a routing table to determine which output port should receive the message.

43. The method of claim 42, wherein the determining step comprises:
  (1) communicating addresses between the switch nodes, so that a topology for the network can be determined; and
  (2) storing routing information derived from the addresses of the switch nodes, so that messages can be routed correctly through the network.

44. A communications system, comprising:
  (a) network means for providing bidirectional data transmission between agents connected thereto, the network means comprising switch nodes connected together in a multistage interconnect network, each switch node comprising a first plurality of input ports, a second plurality of output ports, and means for selectively connecting said input ports to said output ports; and
  (b) self-diagnosing means, integrated with the network, for detecting and reporting any errors that occur within the network.

45. The system of claim 44, wherein the self-diagnosing means comprises diagnostic processor means for monitoring the state of the network means, for performing self-tests on the components of the network means, and for initializing the network means.

46. The system of claim 45, wherein the diagnostic processor means comprises means for configuring routing tables and input and output enable vectors for the network means so that fault conditions in the network means can be bypassed.

47. A communications system, comprising:
  (a) a multistage interconnect network comprising a plurality of interconnected active logic switch nodes;
  (b) diagnostic means for detecting and reporting any errors that occur within the network, and for isolating the errors without propagating them, thereby improving diagnosability and serviceability;
  (c) reconfiguration means for reconfiguring the network when an error is detected, without interrupting communications in the system, so that any degradation in performance is minimized.

48. The system of claim 47, wherein the reconfiguration means further comprises means for reconfiguring routing tables and input and output enable vectors in the network, so that all communications are routed around a faulty section of the network.

49. The system of claim 47, wherein the network further comprises redundant networks for providing added bandwidth and fault tolerance to the system.

50. The system of claim 49, further comprising control means for load leveling message transmission through the redundant networks.

51. The system of claim 49, further comprising control means for switching between the redundant networks when a failure occurs, so that if one or more of the redundant networks is not available, the others can take over, thereby providing for graceful degradation in the presence of malfunctions.

52. A method for communicating in a multistage interconnect network comprising a plurality of interconnected active logic switch nodes, the method comprising the steps of:
(a) detecting and reporting any errors that occur within the network, and isolating the errors without propagating them, thereby improving serviceability; and
(b) reconfiguring the network when an error is detected, without interrupting communications in the system, so that any degradation in performance in the reconfigured network is minimized.

53. The method of claim 52, wherein the reconfiguring step further comprises reconfiguring routing tables and input and output enable vectors in the network, so that all communications are routed around a faulty section of the network.

54. The method of claim 52, further comprising load leveling message transmission through redundant networks.

55. The method of claim 52, further comprising switching between redundant networks when a failure occurs, so that if one or more of the redundant networks is not available, the others can take over, thereby providing for graceful degradation in the presence of malfunctions.

56. A communications system, comprising:
(a) a multistage interconnect network comprising a plurality of interconnected active logic switch nodes;
(b) each switch node comprising a first plurality of input ports, a second plurality of output ports, and means for selectively connecting said input ports to said output ports;
(c) the multistage interconnect network comprising more than $\log_b N$ stages of switch nodes, wherein b is a total number of switch node input/output ports, N is a total number of network input/output ports, and $\log_b N$ indicates a ceiling function providing the smallest integer not less than $\log_b N$, the stages thereby providing a plurality of paths between any network input port and network output port to enhance fault tolerance and lessen contention;
(d) diagnostic means for detecting and reporting any errors that occur within the network, thereby improving serviceability; and
(e) reconfiguration means for reconfiguring the network, without interrupting the communications in the system, when an error is detected, and for isolating the error without propagating it, so that any degradation in performance in the reconfigured network is minimized.

57. The system of claim 56, wherein the switch nodes further comprise tag mapping table means, associated with each input port of a switch node, for interpreting a routing tag to determine which output port of the switch node to select in order to route correctly a connect request through the network.

58. The system of claim 57, wherein the tag mapping table means comprises a memory array with a plurality of entries for translating the routing tag to an output port selection, wherein the array provides a one-to-one mapping between a logical port selection provided by the routing tag and a physical port selection.

59. The system of claim 58, wherein each entry in the array is derived from an appropriate field of the routing tag according to a stage of the switch node within the network.

60. The system of claim 56, wherein the switch nodes further comprise input enable vectors for indicating which input ports of the switch node are operational.

61. The system of claim 56, wherein the switch nodes further comprise output enable vectors for indicating which output ports of the switch node are operational.

62. The system of claim 59, wherein the tag mapping table means comprises a lookup table for mapping the routing tag to a physical output port based on the way in which the network is cabled.

63. The system of claim 59, wherein the tag mapping table means further comprises means for initializing each entry in the tag mapping table means to be numerically equivalent to its address offset, such that a physical port selection is equal to a logical port selection, thereby providing default values that are appropriate for fully configured networks.

64. The system of claim 63, wherein the tag mapping table means further comprises means for overlaying the default values when a configuring agent has determined an actual topology for the network.

65. A communications system, comprising:
(a) a network comprising at least two input ports and two output ports, and capable of simultaneous communications between a different pair of input and output ports;
(b) message routing means, within the network, for accepting a connect request containing a routing tag identifying an output port destination for the message, and for steering the connect request to the output port destination;
(c) back-off means, within the network, for cancelling the connect request when the output port destination is unavailable; and
(d) retry means, triggered by the back-off means, for delaying a retry of the connect request, and for trying a different connect request between the input port and a different output port destination, thereby reducing contention in the network.

66. The system of claim 65, wherein the network further comprises:
(1) a plurality of switch nodes, each comprising a first plurality of input ports, a second plurality of output ports, and means for selectively connecting said input ports to said output ports;
(2) tag mapping table means, associated with each input port of a switch node, for interpreting the routing tag to determine which output port of the switch node to select in order to route correctly the connect request through the network.

67. The system of claim 65, wherein the message routing means further comprises monocast blocking means for disabling the back-off means and for waiting until a desired path through the network becomes available.

68. The system of claim 65, wherein the message routing means further comprises monocast pipelining means for sending messages from sending agents to receiving agents without waiting for acknowledgments to connect requests from the receiving agents.

69. A communications method for a network comprising at least two input ports and two output ports, and capable of simultaneous communications between a different pair of input and output ports, the method comprising the steps of:
(a) accepting a connect request containing a routing tag identifying an output port destination for the message, and steering the connect request to the output port destination;
(b) cancelling the connect request when the output port destination is unavailable; and
(c) delaying a retry of the connect request, and for trying a different connect request from the input port, thereby reducing contention in the network.

70. The method of claim 69, further comprising interpreting the routing tag to determine which output port of the switch node to select in order to route correctly the connect request through the network.

71. The method of claim 69, wherein the accepting step further comprises preventing cancellation of connect requests and waiting until a desired path through the network becomes available.

72. The method of claim 69, wherein the accepting step further comprises transmitting messages from sending agents to receiving agents without waiting for acknowledgments to connect requests from the receiving agents.

73. A communications apparatus, comprising:
(a) a multistage interconnect network comprising a plurality of interconnected active logic switch nodes;
(b) each switch node comprising a first plurality of input ports, a second plurality of output ports, and means for selectively connecting said input ports to said output ports;
(c) the multistage interconnect network comprising more than $\log_b N$ stages of switch nodes, wherein b is a total number of switch node input/output ports, N is a total number of network input/output ports, and $\log_b N$ indicates a ceiling function providing the smallest integer not less than $\log_b N$, thereby providing a plurality of paths between any network input port and network output port to enhance fault tolerance and lessen contention; and
(d) load balancing means, in each switch node, for distributing messages among the plurality of output ports so that messages are evenly distributed throughout the network.

74. The apparatus of claim 73, wherein the load balancing means comprises:
(1) means, within each switch node, for choosing a switch node output port similarly numbered as a requesting switch node input port when the similarly numbered switch node output port is available; and
(2) means, within each switch node, for choosing a next available switch node output port when the similarly numbered switch node output port is not available.

75. The apparatus of claim 74, wherein the load balancing means further comprises means for selecting a second output port of a switch node having a next higher port number than the input port of the switch node that received the connect request when the first output port is unavailable.

76. A system for concurrently transferring messages between different ports, comprising:
(a) a plurality of switch nodes, each switch node comprising a first plurality of input ports, a second plurality of output ports, and means for selectively connecting the input ports to the output ports; and
(b) means for interconnecting the switch nodes in a multistage interconnect network having a first plurality of network input ports and a second plurality of network output ports;
(c) partitioning means for grouping the network ports into logically independent subsets, wherein each subset is a supercluster; and
(d) multicast means, operative within the network, for transmitting a message from a network input port to one or more network output ports grouped in a supercluster, wherein messages transmitted within any one supercluster are prevented from interfering with messages transmitted within any other supercluster.

77. The system of claim 76, wherein the partitioning means further comprises:
(1) means for grouping network ports into a supercluster of size $2^{m-p}$, wherein binary addresses for the grouped network ports are identical in p highest order bits thereof, thereby providing $2^p$ superclusters of size $2^{m-p}$ in the system, wherein $m = \log_2 N$, N is a total number of network input/output ports, and $\log_2 N$ indicates a ceiling function providing the smallest integer not less than $\log_2 N$; and
(2) means for addressing each supercluster as $\{y_{m-1}, y_{m-2}, \ldots, y_{m-p}\}$, wherein $y_i \in \{0,1\}$ and $m-1 \leq i \leq m-p$.

78. The system of claim 77, further comprising means for recursively subdividing superclusters into smaller superclusters, so that the system can contain a plurality of superclusters of different sizes, wherein each size is a power of two.

79. The system of claim 77, further comprising means for allocating network ports to address blocks that are a power of two when each supercluster size is not a power of two and/or N is not a power of two.

80. The system of claim 76, wherein the partitioning means further comprises:
(1) means for generating a list of supercluster sizes; and
(2) means for calculating a smallest power of two not less than each supercluster size;
(3) means for adding up the calculated powers of two to determine a size of a network needed;
(4) means for calculating the smallest power of two not less than the size of the network;
(5) means for dividing the network in half recursively as needed until there is a section which is the size of each power of two that was calculated for each supercluster; and
(6) means for assigning the network ports in each supercluster to addresses in the corresponding range.

81. A method for concurrently transferring messages between different ports of a multistage interconnect network having a plurality of interconnected switch nodes, the method comprising the steps of:
(a) grouping the network ports into logically independent subsets, wherein each subset is a supercluster; and (b) transmitting a message from a network input port to one or more network output ports grouped in a supercluster, wherein messages transmitted within any one supercluster are prevented from interfering with messages transmitted within any other supercluster.

82. The method of claim 81, wherein the grouping step further comprises:
   (1) grouping network ports into a supercluster of size $2^{m-p}$, wherein binary addresses for the grouped network ports are identical in p highest order bits thereof, thereby providing $2^p$ superclusters of size $2^{m-p}$ in the system, wherein $m = \lceil \log_2 N \rceil$, N is a total number of network input/output ports, and $\log_b N$ indicates a ceiling function providing the smallest integer not less than $\log_2 N$; and
   (2) addressing each supercluster as $\{y_{m-1}, y_{m-2}, \ldots, y_{m-p}\}$, wherein $y_i \in \{0,1\}$ and $m-1 \leq i \leq m-p$.

83. The method of claim 82, further comprising recursively subdividing superclusters into smaller superclusters, so that the network can contain a plurality of superclusters of different sizes, wherein each size is a power of two.

84. The method of claim 82, further comprising allocating network ports to address blocks that are a power of two when N is not a power of two.

85. The method of claim 81, wherein the grouping step further comprises:
   (1) generating a list of supercluster sizes; and
   (2) calculating a smallest power of two not less than each supercluster size;
   (3) adding up the calculated powers of two to determine a size of a network needed;
   (4) calculating the smallest power of two not less than the size of the network;
   (5) dividing the network in half recursively as needed until there is a section which is the size of each power of two that was calculated for each supercluster; and
   (6) assigning the network ports in each supercluster to addresses in the corresponding range.

86. A system for concurrently transferring messages between different ports, comprising:
   (a) a plurality of switch nodes, each switch node comprising a first plurality of input ports, a second plurality of output ports, and means for selectively connecting said input ports to said output ports; and
   (b) means for connecting the switch nodes together in a multistage interconnect network, the means for connecting comprising forward channel and back channel signal paths; and
   (c) multicast means, operative within the network, for transmitting forward channel messages from a source to one or more destinations; and
   (d) back channel merge means, within each switch node, for combining back channel replies received from the destinations into a single result, wherein the result is transmitted on the back channel to the source.

87. The system of claim 86, wherein the multicast means comprises means for steering a multicast request for a supercluster to a bounce back point within the network means, wherein all multicast requests to the supercluster use the same bounce back point.

88. The system of claim 87, wherein the means for steering comprises means for steering a multicast request from one supercluster to a destination supercluster through a bounce back point for the destination supercluster.

89. The system of claim 86, wherein the multicast means comprises means for permitting only one multicast message at a time within a supercluster thereby preventing deadlock between competing multicast requests.

90. A method for concurrently transferring messages between different ports of multistage interconnect network, the network comprising a plurality of switch nodes, each switch node comprising a first plurality of input ports, a second plurality of output ports, and means for selectively connecting said input ports to said output ports, the switch nodes connected together via forward channel and back channel signal paths connected to every input and output port, the method comprising the steps of:
   (a) transmitting forward channel messages from a source to one or more destinations; and
   (b) combining back channel replies received from the destinations into a single result, wherein the result is transmitted on the back channel to the source.

91. The method of claim 90, wherein the transmitting step comprises steering a multicast request for a supercluster to a bounce back point within the network means, wherein all multicast requests to the supercluster use the same bounce back point.

92. The method of claim 91, wherein the steering step comprises steering a multicast request from one supercluster to a destination supercluster through a bounce back point for the destination supercluster.

93. The method of claim 90, wherein the transmitting step comprises permitting only one multicast message at a time within a supercluster, thereby preventing deadlock between competing multicast requests.

94. A system for concurrently transferring messages, comprising:
   (a) a multistage interconnect network comprising a plurality of interconnected active logic switch nodes;
   (b) each switch node comprising a first plurality of input ports, a second plurality of output ports, and means for selectively connecting said input ports to said output ports;
   (c) the multistage interconnect network comprising more than $\lceil \log_b N \rceil$ stages of switch nodes, wherein b is a total number of switch node input/output ports, N is a total number of network input/output ports, and $\log_b N$ indicates a ceiling function providing the smallest integer not less than $\log_b N$, the multistage interconnect network providing a plurality of paths between any network input port and network output port to enhance fault tolerance and lessen contention; and
   (d) multicast steering means, within each switch node, for routing multicast requests to a specific input port of a specific switch node within the network, so that only one multicast request can occur at a time, thereby preventing deadlock between competing multicast requests.

95. The system of claim 94, further comprising:
   (1) means for storing a reply from each network output port in the back channel; and
   (2) means for collecting replies from the network output ports and for applying the replies to merge means for synchronously combining all of the replies, wherein the replies are sorted as they propagate through the merge means, so that only the reply having the highest priority is transmitted through the system.

96. The system of claim 95, wherein the merge means comprises low sort means for outputting a reply with a lowest key followed by an accompanying data word.

97. The system of claim 95, wherein the merge means further comprises add means for summing data words of all replies in a bit serial manner so that the result has the same number of bits as the operands.

98. An apparatus for concurrently transferring messages between different ports, comprising:
(a) a multistage interconnect network comprising a plurality of interconnected active logic switch nodes;
(b) each switch node comprising a first plurality of input ports, a second plurality of output ports, and means for selectively connecting said input ports to said output ports,
(c) the multistage interconnect network comprising more than $\log_b N$ stages of switch nodes, wherein b is a total number of switch node input/output ports, N is a total number of network input ports and network output ports, and $\log_b N$ indicates a ceiling function providing the smallest integer not less than $\log_b N$, the multistage interconnect network providing a plurality of paths between any network input port and network output port to enhance fault tolerance and lessen contention; and
(d) deadlock avoidance means, within each switch node, for allowing only one routing multicast request at a time, thereby preventing deadlock between requests.

99. The system of claim 98, wherein the deadlock avoidance means further comprises means for allowing only one multicast request within a supercluster at a time and for allowing a plurality of multicast requests within different superclusters to occur at the same time.

100. A communications system, comprising:
(a) a plurality of switch nodes arranged into a multistage interconnect network having a plurality of input and output ports, each port being coupled to an agent to effect communication between agents through the network;
(b) the network having more than $\log_b N$ stages of interconnected switch nodes, wherein b is a total number of switch node input/output ports, N is the number of network input/output ports, and $\log_b N$ indicates a ceiling function providing the smallest integer not less than $\log_b N$; and
(c) the network having a plurality of turnaround points at the highest stage of switch nodes, the turnaround points logically differentiating between switch nodes that load balance messages through the network from switch nodes that direct messages to receiving agents;
(d) means for depopulating switch nodes from the highest stage to reduce the number of turnaround points in the network, as long as at least one path exists between every network input port and every network output port; and
(e) the input and output ports of the switch nodes in stages adjacent the highest stage sensing when the switch nodes in the highest stage ar removed and disabling the input and output ports in response thereto, thereby lowering the bandwidth of the network and lowering the cost of the network without a loss of functionality.

101. A communications apparatus, comprising:
(a) multistage interconnect network means for interconnecting a plurality of switch nodes for communication therebetween;
(b) dynamic configuration means for determining how the switch nodes are interconnected by the multistage interconnect network means; and
(c) means for remapping connections between the switch nodes so that all connections in a backplane connecting the switch nodes are horizontal.

102. A network, comprising:
(a) a plurality of switch nodes, each switch node comprising a first plurality of input ports, a second plurality of output ports, and means for selectively connecting said input ports to said output ports;
(b) backplane means for interconnecting the input and output ports of different switch nodes of effect a multistage interconnect network; and
(c) tag mapping table means for remapping the interconnections between the switch nodes so that all connections in the backplane means are horizontal only.

103. A communications systems, comprising:
(a) a network comprising a plurality of interconnected switch nodes; and
(b) identification means for communicating a unique identifier to each agent attached to the network, so that an agent can be connected to any available port of the network and determine its address therein, thereby simplifying installation.

104. The system of claim 103, wherein the identification means comprises means for determining the agent's address within the network means using a level number associated with the port to which it is connected.

105. The system of claim 104, wherein the means for determining comprises means for transmitting a command to the network means, wherein a switch node that receives the command replies thereto with a port address.

106. The system of claim 104, wherein the means for determining comprises response means, within a switch node connected to the input port, for appending a port number of the switch node to the level number of the switch node to create the agent address in the network means.

107. A communications system, comprising:
(a) network means for providing bidirectional data transmission between a plurality of agents connected thereto, the network means comprising switch nodes connected together in a multistage interconnect network, each switch node comprising a first plurality of input ports, a second plurality of output ports, and means for selectively connecting said input ports to said output ports; and
(b) means for arranging components within the network means and interconnections between switch nodes, so that the number of agents can be increased with only a substantially linear increase in the size of the network means.

108. The system of claim 107, wherein the network is folded and the switch nodes are paired so that corresponding switch nodes in a specific stage are physically adjacent to one another on a board.

109. The system of claim 107, further comprising means for maintaining physical interconnections between switch nodes at a minimal length.

110. The system of claim 107, wherein the means for arranging comprises:

(1) first means for constructing the network means using only a first board type when the network means contains 8 or fewer network I/O ports;

(2) second means for constructing the network means using only a first board type and a second board type when the network means contains between 9 and 64 network I/O ports;

(3) third means for constructing the network means using only a first board type, a second board type, and a third board type when the network means contains between 65 and 512 network I/O ports; and (4) fourth means for constructing the network means using only a first board type, a second board type, and a fourth board type when the network means contains between 513 and 4096 network I/O ports.

111. A communications system, comprising:

(a) network means, coupled to the agents, for providing bidirectional data transmission between a plurality of agents connected thereto, the network means comprising switch nodes connected together in a multistage interconnect network, each switch node comprising a first plurality of input ports, a second plurality of output ports, and means for selectively connecting said input ports to said output ports; and (b) cabling means for wiring between different stages in the network means with one or more copies of a universal wiring pattern.

112. The system of claim 111, wherein the universal wiring pattern comprises a permutation of switch node ports that swaps the least significant two base b digits of a level number representation, where b is a total number of switch node input or output ports.

113. The system of claim 111, wherein the means for wiring comprises means for wiring every stage in a network means of size $N = x^n$, $n > 1$, with $x^{n-2}$ copies of the universal wiring pattern, wherein x is a number of output ports on a switch node.

114. A communications system, comprising:

(a) network means for providing bidirectional data transmission between a plurality of agents connected thereto, the network means comprising switch nodes connected together in a multistage interconnect network, each switch node comprising a first plurality of input ports, a second plurality of output ports, and means for selectively connecting said input ports to said output ports;

(b) master clock means for supplying a master clock signal to the switch nodes throughout the network means; and (c) controller means, coupled between the network means and the agents, for communicating messages between the agent and the network means, the controller means comprising clock extraction means for deriving the master clock signal transmitted throughout the network means, wherein the master clock signal increments a counter in the controller means to provide a synchronous date and time of day to each agent.

115. A system for communicating in a variety of modes between one or more transmitting agents and one or more receiving agents, comprising:

(a) a multistage interconnect network intercoupling all the agents with transmit and receive lines, the network comprising a plurality of switch nodes arranged in parallel groupings in a plurality of stages within the network;

(b) the transmitting agents including means for transmitting message routing packets containing destination data designating one or more receiving agents and means for transmitting variable length data messages; and (c) wherein the switch nodes each comprise means responsive to the message routing packets for selecting node-to-node paths to one or more receiving agents, wherein the switch nodes also comprise means for acknowledging receipt of a message routing packet and means for preserving the circuit connection for subsequent transmission of a variable length message.

116. An active logic network, comprising:

(a) a plurality of switch nodes, each having a plurality of "left-hand" ports and a plurality of "right-hand" ports, wherein within the switch node, any left hand port can be connected to any right hand port, and any right hand port can be connected to any left hand port;

(b) means, within each switch node, for accepting a routing tag at an input port identifying a destination in the network; and (c) routing determination means, within each switch node, for translating the routing tag into an output port selection of the switch node, thereby identifying a path to the destination.

117. The network of claim 116, wherein the switch node further comprises:

(1) means for accepting a connect request designating a desired destination to which a connection is requested;

(2) selector means, connected to the means for accepting, for selecting an output port of the switch node according to the desired destination; and (3) arbiter means, connected to the port selector means and associated with each output port, for transmitting the connect request to the selected output port, the arbiter means choosing between contending connect requests when more than one port selector means is trying to access the selected output port at the same time, wherein the connect request is transmitted to the selected output port when it has been granted priority over the contending connect requests.

118. The network of claim 117, wherein the selector means further comprises means for selecting an output port based on a table lookup.

119. The network of claim 117, wherein the selector means further comprises means for evenly distributing connect requests between a plurality of arbiter means.

120. The network of claim 117, wherein the arbiter means further comprises:

(1) means for servicing contending point-to-point connect requests on a "round robin" basis; and (2) means for providing priority to multicast connect requests over point-to-point connect requests.

121. The network of claim 116, wherein the switch nodes further comprises:

(1) means for transmitting messages through a forward channel; and (2) means for receiving responses through a back channel, wherein the back channel has a narrower bandwidth than the forward channel.

122. The network of claim 121, wherein the switch nodes further comprise:

(3) means for collecting responses in the back channel;

(4) means for synchronously combining the collected responses so that the collected responses are sorted as they propagate through the switch nodes, wherein only a response having a highest priority is transmitted through the back channel.

123. A communications system, comprising:
(a) network means, coupled to the agents, for providing bidirectional data transmission between network ports, the network means comprising switch nodes connected together in a multistage interconnect network; and
(b) arbiter means, in each switch node, for choosing between contending connect requests accepted concurrently from a plurality of switch node ports, wherein the contending connect requests are all trying to access a selected output port at the same time, so that a connect request is transmitted to the selected output port when it has been granted priority over the contending connect requests.

124. The system of claim 123, wherein the arbiter means further comprises means for evenly distributing requests between a plurality of arbiter means.

125. The system of claim 124, wherein the arbiter means further comprises:
(1) means for providing a "round robin" priority to the contending point-to-point connect requests; and
(2) means for providing priority to multicast connect requests over point-to-point connect requests.

126. A system for transmitting messages between agents in (1) an arbitrary interconnection mode or (2) a multicast mode, comprising:
(a) a multistage interconnect network comprising a plurality of multiple terminal bidirectional switch nodes arrayed in a plurality of stages;
(b) the agents each including means for generating addressing messages containing destination data, including alternative descriptors for individual and multicast group designations, and each being coupled to the switch nodes; and
(c) wherein the switch nodes further include means responsive to the descriptors in the addressing messages for selecting routing paths through the network and means responsive to path selection for establishing path commitments linking agents for communication of variable length messages.

127. A network for communicating between agents connected thereto, comprising:
(a) packet switching means for establishing a communication path between sending and receiving agents in response to a connect request;
(b) circuit switching means for transferring messages of arbitrary length between the sending and receiving processors once the communication path has been established;
(c) pipelining means for transferring messages between sending agents and the receiving agents without waiting for the communication path to be established; and
(d) back-off means for cancelling the connect request when the communication path to the receiving agent is unavailable; and
(e) retry means, triggered by the back-off means, for delaying a retry of the connect request, and for trying a different connect request from the sending agent, thereby reducing contention in the network.

128. The network of claim 127, wherein the packet switching means further comprises means for transferring a connect command between switch nodes in the communication path.

129. The network of claim 128, wherein links between switch nodes comprising the communication path are reserved until released by the sending and receiving agents.

130. A communications apparatus, comprising:
(a) a plurality of switch nodes arranged and interconnected into a multistage interconnect network; and
(b) error testing means for generating test patterns during data transmission through the network, the error testing means comprising means, within each switch node, for inverting parity on the data transmission so that a receiving switch node reports an error.

131. The apparatus of claim 130, wherein the error testing means further comprises means for forwarding a test command to the receiving switch node and means for inverting parity on data which follows the test command.

132. The apparatus of claim 130, wherein the error testing means further comprises means for forwarding a test reply to the receiving switch node with its parity inverted.

133. The apparatus of claim 130, wherein the error testing means further comprises means for inverting parity continuously on the data transmission to the receiving switch node.

134. A switch node providing for the simultaneous interconnection of multiple messages, comprising:
(a) means defining a plurality of input and output ports;
(b) means for selectively connecting any input port to (1) any one output port, (2) a predetermined number of the output ports, or (3) all of the output ports; and
(c) error testing means for generating test patterns to test data transmission on the input and output ports, the error testing means comprising means for inverting parity on the data transmission so that a switch node receiving the data transmission reports an error.

135. The switch node of claim 134, wherein the error testing means further comprises means for forwarding a test command to the receiving switch node and means for inverting parity on data which follows the test command.

136. The switch node of claim 134, wherein the error testing means further comprises means for forwarding a test reply to the receiving switch node with its parity inverted.

137. The switch node of claim 134, wherein the error testing means further comprises means for inverting parity continuously on the data transmission to the receiving switch node.

138. A switch node for use in a network having a plurality of similar nodes interconnected by cabling, for simultaneous interconnection of multiple messages of different types, including message routing packets, comprising:
(a) means defining a plurality of input and output terminals;
(b) means for storing reconfigurable mapping data which identifies available interconnection paths using the input and output terminals; and
(c) means, coupled to the means for storing, for arbitrarily interconnecting any input with (1) any one output, (2) a predetermined number of the outputs or (3) all the outputs.

139. A switch node as set forth in claim 138 above, wherein means for storing reconfigurable mapping data further comprises means for storing input and output enable vectors indicating which terminals are operational.

140. A switch node as set forth in claim 138 above, wherein the switch nodes each include forward channel and back channel signal paths coupled to each of the input and output ports in each of the switch nodes, wherein the back channel signal paths have a narrower bandwidth relative to the forward channel signal paths to simplify packaging.

141. A switch node as set forth in claim 140 above, further comprising means for combining signals on the different back channel signal paths within the switch node.

142. A switch node as set forth in claim 140 above, further comprising means for synchronously combining replies from the back channels so that replies are sorted as they propagate through the switch node, wherein only the reply having a highest priority is transmitted to the next switch node on the back channel.

143. A switch node as set forth in claim 138 above, wherein the means interconnecting the inputs and outputs include means for arbitrating between competing message routing packets to determine priority in accordance with predetermined rules.

144. A switch node as set forth in claim 143 above, wherein the means for arbitrating affords priority to messages whose routing packets indicate more than one receiving destination.

145. A switch node as set forth in claim 138 above, wherein said switch node includes means for leveling the load of messages through the switch node.

146. A switch node as set forth in claim 138 above, wherein the switch node includes means for returning a signal back to an input as to the unavailability of an interconnection.

147. A switch node as set forth in claim 138 above, wherein the switch node includes means for rerouting a message between different input and output terminals when a given path is unavailable.

148. A computer system, comprising:
(a) a plurality of processors comprising (1) application processors (AP) for connecting external devices to the system, and (2) access module processors (AMP) for managing access to a relational database; and
(b) network means, coupled to the processors, for providing bidirectional data transmission between the processors, the network means comprising switch nodes connected together in a multistage interconnect network, each switch node comprising a first plurality of input ports, a second plurality of output ports, and means for selectively connecting said input ports to said output ports, the network having more than $\log_b N$ stages of interconnected switch nodes, wherein b is a total number of switch node input/output ports, N is the number of network input/output ports, and $\log_b N$ indicates a ceiling function providing the smallest integer not less than $\log_b N$.

149. The computer system of claim 148, wherein the AP further comprises one or more microprocessors, including memory and at least two connections to the network, for executing an independent copy of the operating system and maintaining an independent address space.

150. The computer system of claim 149, wherein the AP further comprises a plurality of tightly-coupled microprocessors sharing a single copy of the operating system and sharing a common address space.

151. The computer system of claim 148, where the AMP further comprises one or more microprocessors having disk I/O capabilities and at least two connections to the network, and executing an independent copy of the operating system that is specifically designed for executing database software.

152. The computer system of claim 151, wherein the AMP further comprises a plurality of tightly-coupled microprocessors sharing a single copy of the operating system and sharing a common address space.

153. The computer system of claim 148, where the system further comprises means for allocating a portion of the relational database to each AMP.

* * * * *